United States Patent [19]

Sasaki et al.

[11] Patent Number: 5,637,705
[45] Date of Patent: Jun. 10, 1997

[54] BISAZO COMPOUNDS AND USE THEREOF AS FIBER REACTIVE DYES

[75] Inventors: Sigeru Sasaki, Osaka; Kingo Akahori; Takeshi Washimi, both of Toyonaka; Takashi Omura, Kobe; Toshiyuki Araki, Kyoto; Atsushi Inoue, Ibaraki, all of Japan

[73] Assignee: Sumitomo Chemical Company, Limited, Osaka, Japan

[21] Appl. No.: 532,510

[22] Filed: Sep. 22, 1995

Related U.S. Application Data

[62] Division of Ser. No. 188,755, Jan. 31, 1994, Pat. No. 5,478,927.

[30] Foreign Application Priority Data

Feb. 4, 1993 [JP] Japan .................. 5-017695
Feb. 17, 1993 [JP] Japan .................. 5-027974

[51] Int. Cl.⁶ ............................ C07D 251/52; C07D 251/54
[52] U.S. Cl. ............................ 544/197; 544/208
[58] Field of Search .................. 544/197, 208; 534/642

[56] References Cited

U.S. PATENT DOCUMENTS

| | | | |
|---|---|---|---|
| 4,701,524 | 10/1987 | Kayne et al. | 534/642 |
| 4,908,436 | 3/1990 | Scheibli | 534/642 X |
| 4,912,244 | 3/1990 | Tzikas | 534/642 X |
| 5,112,959 | 5/1992 | Miyamoto et al. | 534/642 |
| 5,138,041 | 8/1992 | Buch et al. | 534/642 |
| 5,243,034 | 9/1993 | Tappe et al. | 534/637 |

FOREIGN PATENT DOCUMENTS

| | | |
|---|---|---|
| 266774 | 5/1988 | European Pat. Off. |
| 374758 | 6/1990 | European Pat. Off. |
| 400648 | 12/1990 | European Pat. Off. |
| 489692 | 6/1992 | European Pat. Off. |
| 0489692 | 6/1992 | European Pat. Off. |
| 499588 | 8/1992 | European Pat. Off. |
| 0499588 | 8/1992 | European Pat. Off. |
| 535644 | 4/1993 | European Pat. Off. |
| 0535644 | 4/1993 | European Pat. Off. |

OTHER PUBLICATIONS

Washimi et al, Chemical Abstracts, 117: 152728r (1992).

*Primary Examiner*—Fiona T. Powers
*Attorney, Agent, or Firm*—Watson Cole Stevens Davis, P.L.L.C.

[57] ABSTRACT

A bisazo compound of the following formula:

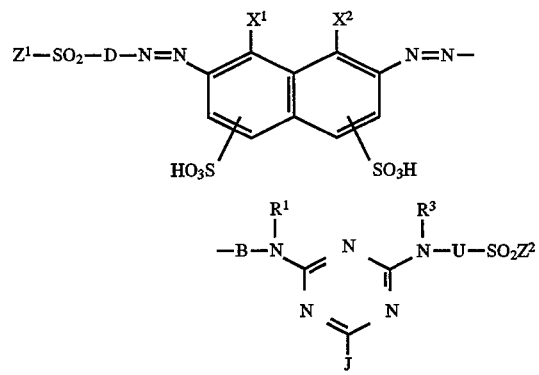

wherein $R^1$ and $R^3$ are each hydrogen or alkyl; D is phenylene or naphthylene; one of $X^1$ and $X^2$ is $NH_2$ and the other is OH; $Z^1$ and $Z^2$ are each $-CH=CH_2$ or $-CH=CH_2Z'$ in which $Z'$ is a splittable group; B is monosulfophenylene, monosulfophenylene-methylene or mono- or di-sulfonaphthylene-methylene; U is phenylene or an aliphatic bridging group; and J is an amono-derivative group or, J may be alkoxy when $X^1$ is OH and U is phenylene, and J may be alkoxy or phenoxy when $X^1$ is OH and U is the aliphatic bridging group. This compound is useful for dyeing or printing fiber materials and gives a dyed or printed product having a color superior in various fastness properties with superior build-up property.

8 Claims, No Drawings

BISAZO COMPOUNDS AND USE THEREOF AS FIBER REACTIVE DYES

This is a division of application Ser. No. 08/188,755, filed Jan. 31, 1994, now U.S. Pat. No. 5,478,927.

The present invention relates to improved compounds useful for dyeing or printing hydroxy group-and/or amide group-containing materials such as cellulose fiber, natural or synthetic polyamide fiber, polyurethane fiber, leather and mixed fibers thereof to give navy blue-colored dyed products superior in light fastness, perspiration-light fastness and wet fastness, and to application of said compounds.

Bisazo compounds having a triazinyl group and a plurality of vinylsulfone type reactive groups in the molecule are disclosed in U.S. Pat. No. 5,053,494 and U.S. Pat. No. 5,112,959. However, they are still insufficient in the dye performance and await for improvement particularly with respect to dyeing power, build-up property and fastness properties.

A variety of reactive dyes have widely been used for dyeing and printing fiber materials. The actual level of technology, however, is not yet satisfactory for meeting high demands with respect to applicability to specific dyeing technology and fastness properties of dyed or printed products.

The known reactive dyes mentioned above are insufficient in dye performance such as dyeing power or build-up property and in fastness properties such as light fastness, perspiration-sunlight fastness and wet fastness, so that the development of a further improved dye is intensely desired.

Excellence in build-up property is very important today when the requirement for an economical dyeing method has reached a high level, and excellence in fastness properties is also very important today when a high level of quality has become required in the field of clothes, etc.

The present inventors have undertaken extensive studies to improve the above-mentioned known dyes to find a novel compound satisfying the needs for dyes. As a result, the present invention has been accomplished.

The present invention provides a bisazo compound represented by the following formula (I) or a salt thereof:

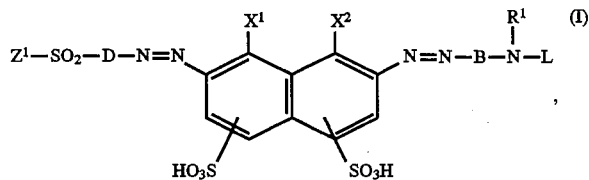

(I)

wherein $R^1$ is hydrogen or unsubstituted or substituted alkyl;

D is phenylene unsubstituted or substituted with one or two substituents selected from sulfo, alkoxy, alkyl, halogeno and carboxy, or naphthylene unsubstituted or substituted once or twice by sulfo;

one of $X^1$ and $X^2$ is $NH_2$ and the other is OH;

$Z^1$ is —CH=$CH_2$ or —$CH_2CH_2Z'$ in which Z' is a group capable of being split by the action of an alkali;

B is a group represented by the following formula (1) or (2):

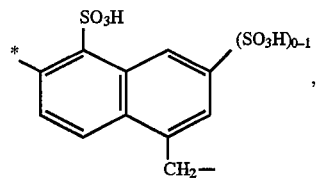

(1)

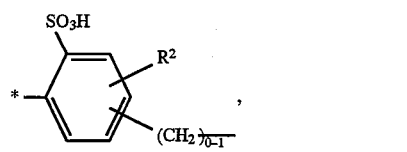

(2)

wherein the mark * means a bond linking to an azo group, and $R^2$ is hydrogen, methyl or methoxy; and when $X^1$ is OH, L is a triazinyl group represented by any one of the following formulas (II) to (V):

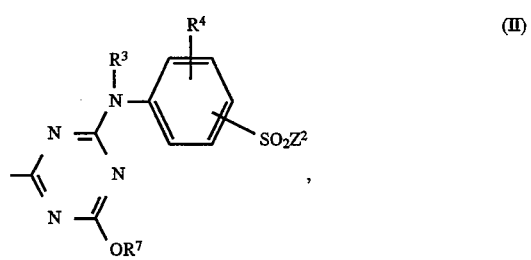

(II)

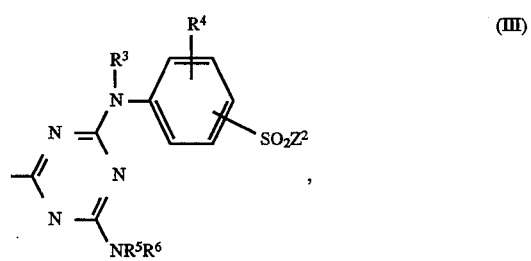

(III)

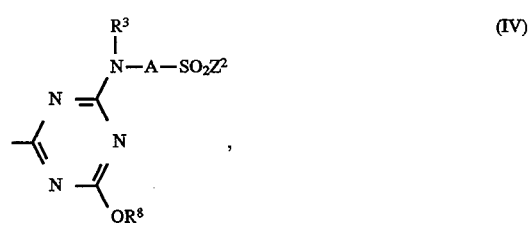

(IV)

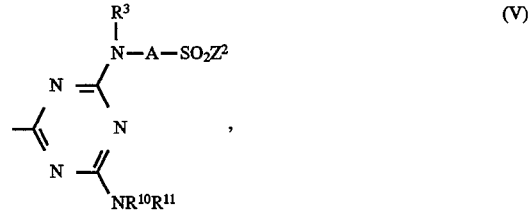

(V)

wherein $R^3$ is hydrogen or unsubstituted or substituted alkyl;

$R^4$ is hydrogen, alkyl, alkoxy or halogeno;

$R^5$ and $R^6$ independently of one another are each hydrogen or unsubstituted alkyl, or $R^5$ and $R^6$ conjointly form a heterocyclic ring which may contain nitrogen, oxygen or sulfur as a ring atom;

$R^7$ is straight or branched alkyl unsubstituted or substituted with one or two substituents selected from alkoxy, sulfo, carboxy, carboxylic ester, hydroxy, cyano, sulfato, halogeno, carbamoyl and sulfamoyl;

$R^8$ is straight or branched alkyl unsubstituted or substituted with one or two substituents selected from alkoxy, sulfo, carboxy, carboxylic ester, hydroxy, cyano, sulfato, halogeno, phenyl, substituted phenyl, carbamoyl and sulfamoyl, or phenyl unsubstituted or substituted with one or two substituents selected from alkyl, substituted alkyl, alkoxy, substituted alkoxy, hydroxy, sulfo, cyano, carboxy, carboxylic ester, sulfamoyl, carbamoyl, substituted amino and halogeno;

$R^{10}$ is hydrogen or straight or branched alkyl unsubstituted or substituted with one or two substituents selected from hydroxy, halogeno, alkoxy, cyano, sulfo, sulfato, carboxy, carboxylic ester, carbamoyl, sulfamoyl, amino and substituted amino;

$R^{11}$ is hydrogen, straight or branched alkyl unsubstituted or substituted with one or two substituents selected from hydroxy, halogeno, alkoxy, cyano, sulfo, sulfato, carboxy, carboxylic ester, carbamoyl, sulfamoyl, amino and substituted amino, or phenyl unsubstituted or substituted with one or two substituents selected from sulfo, alkyl, substituted alkyl, alkoxy, substituted alkoxy, hydroxy, halogeno, cyano, carboxy, carboxylic ester, carbamoyl, sulfamoyl, amino, substituted amino, $-SO_2CH_2CH_2OH$ and $SO_2Z^3$, in which $Z^3$ is $-CH=CH_2$ or $-CH_2CH_2Z'$ in which $Z'$ is as defined above; or $R^{10}$ and $R^{11}$ conjointly form a heterocyclic ring which may contain nitrogen, oxygen or sulfur as a ring atom;

$Z^2$ is $-CH=CH_2$ or $-CH_2CH_2Z'$ in which $Z'$ is as defined above; and

A is a divalent aliphatic group represented by the following formula (3), (4) or (5):

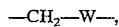 (3)

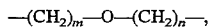 (4)

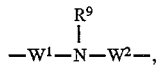 (5)

in which W is straight or branched chain $C_1$-$C_6$ alkylene unsubstituted or substituted by chloro, bromo, fluoro, hydroxy, sulfato, cyano, $C_1$-$C_4$ alkylcarbonyloxy, $C_1$-$C_5$ alkoxycarbonyl, carboxy or carbamoyl; $W^1$ and $W^2$ independently of one another are each straight or branched chain $C_2$-$C_6$ alkylene; $R^9$ is hydrogen, unsubstituted lower alkyl or phenyl; and m and n independently of one another are each an integer of 2 to 6; and when $X^1$ is $NH_2$, L is a triazinyl group represented by the formula (III) or (V) described above.

The present invention also provides a method for dyeing or printing fiber materials by using a bisazo compound of the formula (I) or a salt thereof.

In the formula (I), examples of $R^1$ are hydrogen, straight or branched chain $C_1$-$C_6$ alkyl unsubstituted, straight or branched chain $C_1$-$C_6$ alkyl substituted by hydroxy, halogeno, cyano, carboxy or sulfo, and the like. Of these, preferred $R^1$ is hydrogen or straight or branched chain $C_1$-$C_4$ alkyl unsubstituted, and especially preferred is hydrogen or methyl.

The groups preferred as D include, for example, unsubstituted phenylene, phenylene substituted with one or two substituents selected from $C_1$-$C_4$ alkyl such as methyl or ethyl, $C_1$-$C_4$ alkoxy such as methoxy or ethoxy, halogeno such as chloro or bromo, sulfo and carboxy, unsubstituted naphthylene, and naphthylene substituted once or twice by sulfo. Specific examples of D are as follows:

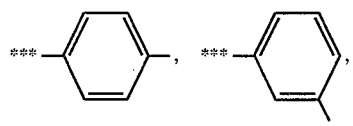

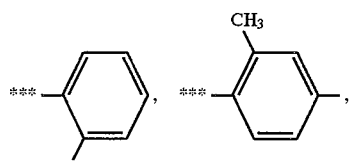

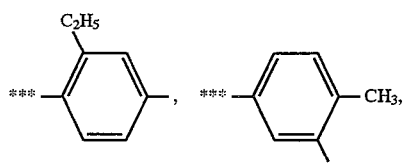

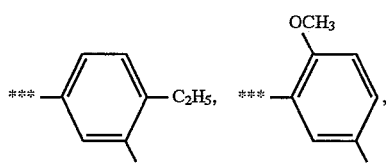

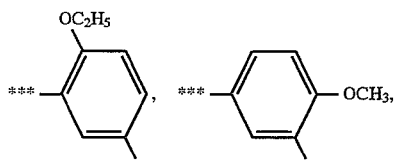

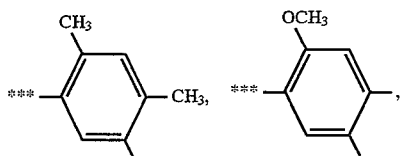

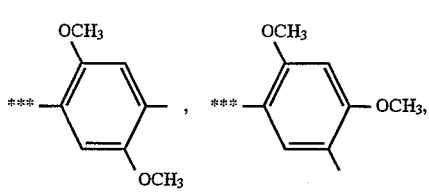

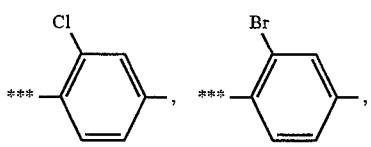

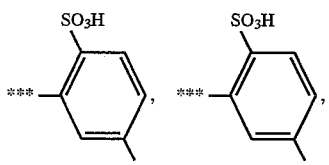

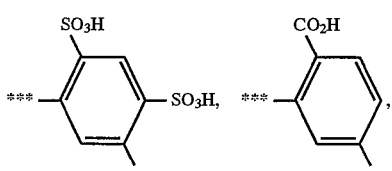

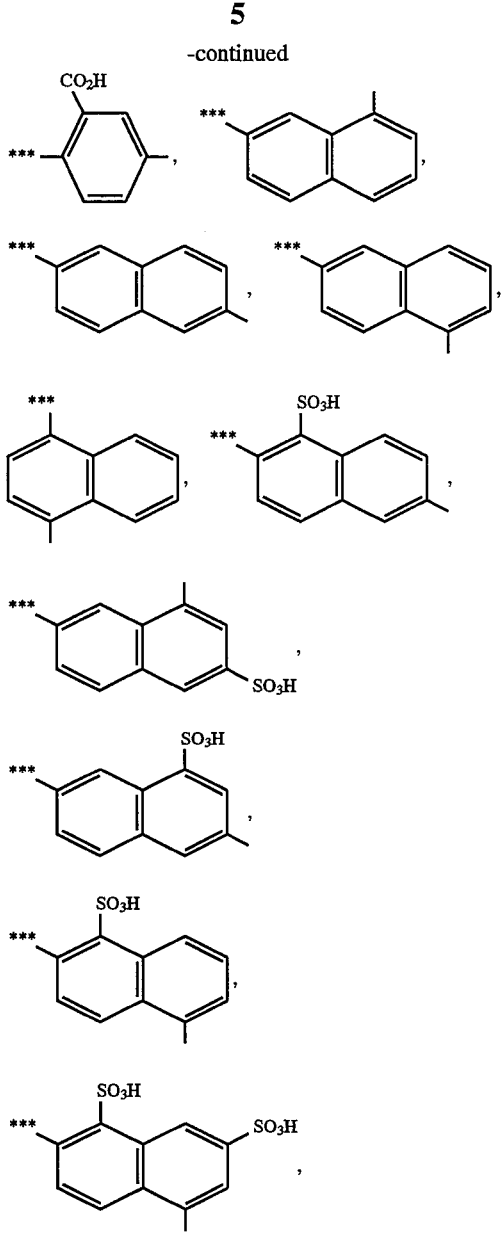

wherein the mark *** means a bond linking to an azo group. Of these, particularly preferred are those having a sulfo group in the ortho position relative to the azo group. Examples of particularly preferred D include the following:

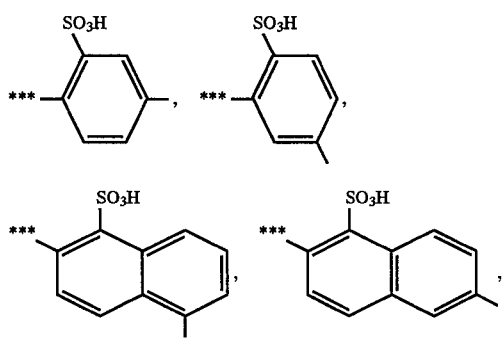

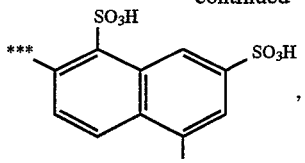

wherein the mark *** is as defined above.

The group capable of being split by the action of an alkali represented by Z' include, for example, sulfuric acid ester group, thiosulfuric acid ester group, phosphoric acid ester group, acetic acid ester group and halogen. Of these, sulfuric acid ester group and halogen are preferred. Preferred $Z^1$, $Z^2$ and $Z^3$ are each independently vinyl, β-sulfatoethyl or β-chloroethyl.

Examples of the group B include the following:

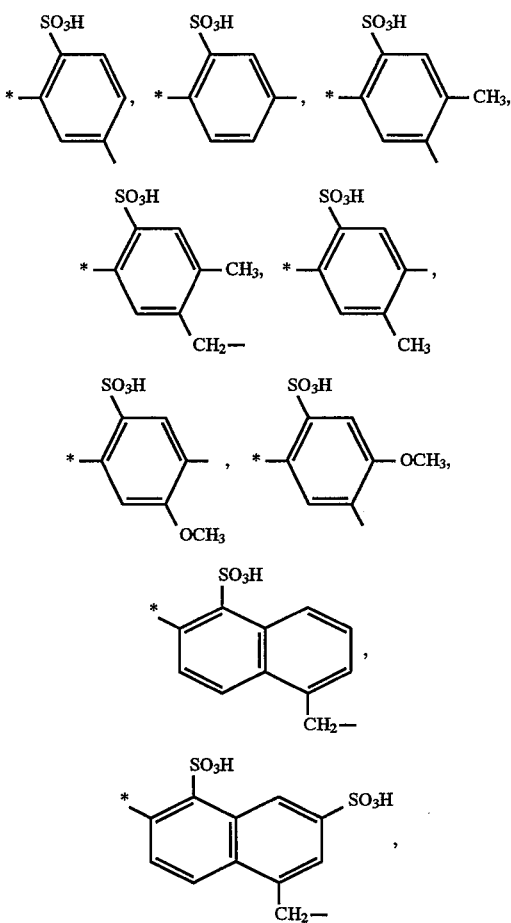

wherein the mark * is as defined above. Of these, preferred are:

wherein the mark * is as defined above, and the like.

In the formulas (II), (III), (IV) and (V), examples of $R^3$ include the same groups as $R^1$. Of these, preferred are hydrogen and unsubstituted, straight or branched chain $C_1$-$C_4$ alkyl, and particularly preferred are hydrogen, methyl and ethyl.

In the formulas (II) and (III), examples of $R^4$ include hydrogen, lower alkyl, lower alkoxy, chloro, bromo and fluoro. Of these, preferred are hydrogen, methyl and methoxy.

In the formula (III), $R^5$ and $R^6$ can be hydrogen or unsubstituted, straight or branched chain $C_1$-$C_4$ alkyl. Of these, preferred are hydrogen, methyl and ethyl.

In the formula (III), when $R^5$ and $R^6$ conjointly form a heterocyclic ring, the group —$NR^5R^6$ may be a heterocyclic residue which is usually 5- or 6-membered one. Examples of said heterocyclic residue include those containing only one nitrogen atom as a hetero atom, those containing a nitrogen atom and one or two hetero atoms selected from nitrogen, oxygen and sulfur, and the like. Specific examples of the heterocyclic residue include the residues derived from pyrrolidine, piperidine, piperazine, N-alkylpiperazine, morpholine, pyrrole, imidazole and the like. Of these, preferred is a residue derived from morpholine, namely morpholino.

In the combination of $R^5$ and $R^6$, preferred are a case where —$NR^5R^6$ is morpholino and cases where at least one of $R^5$ and $R^6$ is hydrogen and the other is hydrogen, methyl or ethyl.

In the formula (III), the compounds represented by H—$NR^5R^6$ which can be used for forming the residue —$NR^5R^6$ are, for example, ammonia, methylamine, ethylamine, n-propylamine, isopropylamine, n-butylamine, isobutylamine, sec-butylamine, dimethylamine, diethylamine, methylethylamine, pyrrolidine, piperazine, morpholine, piperidine, pyrrole, imidazole and the like. Of these, particularly preferred are ammonia, methylamine, ethylamine and morpholine.

In the formula (II), $R^7$ is straight or branched chain alkyl unsubstituted or substituted by alkoxy, sulfo, carboxy, carboxylic ester, hydroxy, cyano, sulfato, halogeno, carbamoyl or sulfamoyl. Examples of the alkyl include methyl, ethyl, propyol, isopropyl, butyl, isobutyl, sec-butyl, 2-hydroxyethyl, 2-sulfatoethyl, 2-sulfoethyl, 2-methoxyethyl, 2-chloroethyl, 2-carboxyethyl and the like. Of these, preferred are unsubstituted $C_1$-$C_4$ alkyl such as methyl, ethyl, propyl, isopropyl, butyl, isobutyl, sec-butyl and the like, and particularly preferred are methyl and ethyl.

In the formula (II), the compounds represented by $R^7OH$ which can be used for forming a group —$OR^7$ substituting the triazine ring include, for example, methanol, ethanol, n-propanol, isopropanol, n-butanol, isobutanol, sec-butanol, 2-chloroethanol, 2-methoxyethanol, 2-ethoxyethanol, 3-methoxypropanol, 3-ethoxypropanol, 2-hydroxyethanesulfonic acid, 3-hydroxy-1-propanesulfonic acid, 2-cyanoethanol, 2-sulfatoethanol, glycolic acid, 3-hydroxypropionic acid and the like.

Of these, preferred —$OR^7$ are the residues derived from methanol, ethanol, n-propanol and isopropanol, namely methoxy, ethoxy, n-propoxy and isopropoxy, and particularly preferred are methoxy and ethoxy.

In the formulas (IV) and (V), A is a divalent aliphatic group represented by any one of the above formulas (3), (4) and (5). Any of the free bonds in these groups may link to —$SO_2Z^2$.

In the formula (5), $R^9$ can be hydrogen, $C_1$-$C_4$alkyl or phenyl. Of these, preferred are hydrogen, methyl and ethyl.

Particularly preferred as A are the residues of the following formulas (6), (7) and (8):

—$CH_2CH_2$—, (6)

—$CH_2CH_2CH_2$—, (7)

—$CH_2CH_2OCH_2CH_2$—. (8)

In the formula (IV), as the unsubstituted or substituted alkyl represented by $R^8$, straight or branched chain $C_1$-$C_4$ lower alkyl groups are preferred. As the substituent which may be present in said alkyl, preferred are $C_1$-$C_4$ alkoxy, sulfo, carboxy, carboxylic ester, hydroxy, cyano, sulfato, halogeno, phenyl, sulfophenyl, carbamoyl and sulfamoyl. When a plurality of substituents are present, they may be identical or different from one another preferred $R^8$ are, for example, methyl, ethyl, propyl, isopropyl, butyl, isobutyl, sec-butyl, benzyl, 2-hydroxyethyl, 2-sulfatoethyl, 2-sulfoethyl, 2-methoxyethyl, 2-chloroethyl, 2-carboxyethyl and the like. Of these, particularly preferred are unsubstituted $C_1$-$C_4$ alkyl such as methyl, ethyl, propyl, isopropyl, butyl, isobutyl, sec-butyl and the like, and most preferred are methyl and ethyl. The unsubstituted or substituted phenyl represented by $R^8$ is preferably phenyl unsubstituted or substituted by one or two substituents selected from the group consisting of, for example, $C_1$-$C_4$ alkyl, $C_1$-$C_4$ alkoxy, hydroxy, sulfo, carboxy, sulfamoyl, carbamoyl, chloro and bromo. Of these, particularly preferred are phenyl, 2-, 3- or 4-sulfophenyl, 2,4- or 2,5-disulfophenyl, 2-, 3- or 4-chlorophenyl, 2-, 3- or 4-methylphenyl, 2-, 3- or 4-methoxyphenyl and the like. Among the alkyl and phenyl groups mentioned above, the unsubstituted or substituted phenyl groups are more preferable as $R^8$.

The compounds represented by $R^8OH$ which can be used for forming a group —$OR^8$ substituting the triazine ring in the formula (IV) include, for example, the following:

aromatic compounds such as phenol, 1-hydroxy-2-, -3- or -4-methylbenzene, 1-hydroxy-3,4- or -3,5-dimethylbenzene, 1-hydroxy-2-, -3- or -4-ethylbenzene, 1-hydroxy-2-, -3- or -4-methoxybenzene, 1-hydroxy-2-, -3- or -4-ethoxybenzene, 1-hydroxy-2-, -3- or -4-chlorobenzene, 3- or 4-hydroxyphenylmethanesulfonic acid, 3-hydroxybenzenesulfonic acid, 4-hydroxybenzenesulfonic acid, 5-hydroxybenzene-1,3-disulfonic acid, 6-hydroxybenzene-1,4-disulfonic acid, 4-hydroxybenzene-1,2-disulfonic acid, 3- or 4-hydroxybenzoic acid, 5-hydroxybenzene-1,3-dicarboxylic acid, 5-hydroxy-2-ethoxybenzenesulfonic acid and the like, and aliphatic compounds such as methanol, ethanol, n-propanol, isopropanol, n-butanol, isobutanol, sec-butanol, 2-chloroethanol, 2-methoxyethanol, 2-ethoxyethanol, 3-methoxypropanol, 3-ethoxypropanol, 2-hydroxyethanesulfonic acid, 3-hydroxy-1-propanesulfonic acid, 2-cyanoethanol, 2-sulfatoethanol, glycolic acid, 3-hydroxypropionic acid, benzyl alcohol, 2-, 3- or 4-chlorobenzyl alcohol, 4-methylbenzyl alcohol, 2-, 3- or 4-sulfobenzyl alcohol, 2-phenylethanol, 1-phenyl-2-propanol and the like.

Of these, preferred are groups —$OR^8$ derived from phenols unsubstituted or substituted by methyl, methoxy or sulfo or from methanol, ethanol, n-propanol and isopropanol, namely phenoxy, 2-, 3- or 4-methylphenoxy, 2-, 3- or 4-methoxyphenoxy, 2-, 3-or 4-sulfophenoxy, methoxy, ethoxy, n-propoxy and isopropoxy, and particularly preferred are phenoxy, methylphenoxy, methoxyphenoxy and sulfophenoxy.

In the formula (V), $R^{10}$ is hydrogen or straight or branched chain alkyl unsubstituted or substituted by hydroxy, halogeno, alkoxy, cyano, sulfo, sulfato, carboxy, carboxylic ester, carbamoyl, sulfamoyl, amino or substituted amino. Preferred examples of such alkyl are methyl, ethyl, n-propyl, isopropyl, n-butyl, isobutyl, sec-butyl, 2-hydroxyethyl, 3-hydroxypropyl, 2-methoxyethyl, 2-ethoxyethyl, 2-chloroethyl, 2-bromoethyl, 2-sulfoethyl, 2-carboxyethyl, 2-carbamoylethyl, 2-sulfatoethyl, 2-sulfamoylethyl and the like. Of these, preferred are methyl, ethyl, 2-hydroxyethyl, 2-sulfoethyl and 2-carboxyethyl.

In the formula (V), $R^{11}$ is hydrogen, alkyl unsubstituted or substituted by one or two substituents selected from hydroxy, halogeno, alkoxy, cyano, sulfo, sulfato, carboxy, carboxylic ester, carbamoyl, sulfamoyl, amino and substituted amino such as dimethylamino, or phenyl unsubstituted or substituted by one or two substituents selected from sulfo, alkyl, alkoxy (said alkyl and alkoxy may be further substituted), hydroxy, halogeno, cyano, carboxy, carboxylic ester, sulfamoyl, carbamoyl, amino, substituted amino such as dimethylamino, $-SO_2CH_2CH_2OH$ and $-SO_2Z^3$, wherein $Z^3$ is the same as the above-defined $Z^1$. As such alkyl, the alkyl groups enumerated as examples for $R^{10}$ are applicable. Of these, preferred are methyl, ethyl, 2-hydroxyethyl, 2-sulfoethyl and 2-carboxyethyl. As such phenyl, preferred are phenyl, 2-, 3- or 4-methylphenyl, 2-, 3- or 4-methoxyphenyl, 2-, 3- or 4-chlorophenyl, 2-, 3- or 4-bromophenyl, 2-, 3- or 4-carboxyphenyl, 2-, 3- or 4-hydroxyphenyl, 2-, 3- or 4-ethylphenyl, 2-, 3- or 4-ethoxyphenyl, 2-, 3- or 4-sulfophenyl, 2,4- or 2,5-disulfophenyl, 2-methoxy-5-methylphenyl, 2,5-dimethoxyphenyl, 2,5-dimethylphenyl,

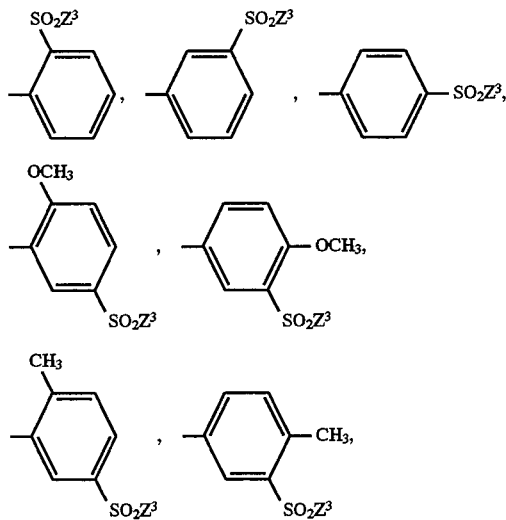

and the like.

As the group represented by $-NR^{10}R^{11}$, preferred are the same groups as exemplified for $H-NR^5R^6$ as well as the groups derived from the following amines represented by $H-NR^{10}R^{11}$:

aniline, N-methylaniline, N-ethylaniline, o-, m- or p-toluidine, o-, m- or p-anisidine, 2-, 3- or 4-anilinesulfonic acid, 2,4- or 2,5-anilinedisulfonic acid, 2-, 3- or 4-chloroaniline, 2-, 3- or 4-bromoaniline, 2-, 3- or 4-fluoroaniline, 2-, 3- or 4-anilinecarboxylic acid, N-methyltoluidine (o-, m- or p-isomer), N-ethyltoluidine (o-, m- or p-isomer), N-methylchloroaniline (2-, 3- or 4-isomer), N-ethylchloro-aniline (2-, 3- or 4-isomer), aminophenol (o-, m- or p-isomer), and

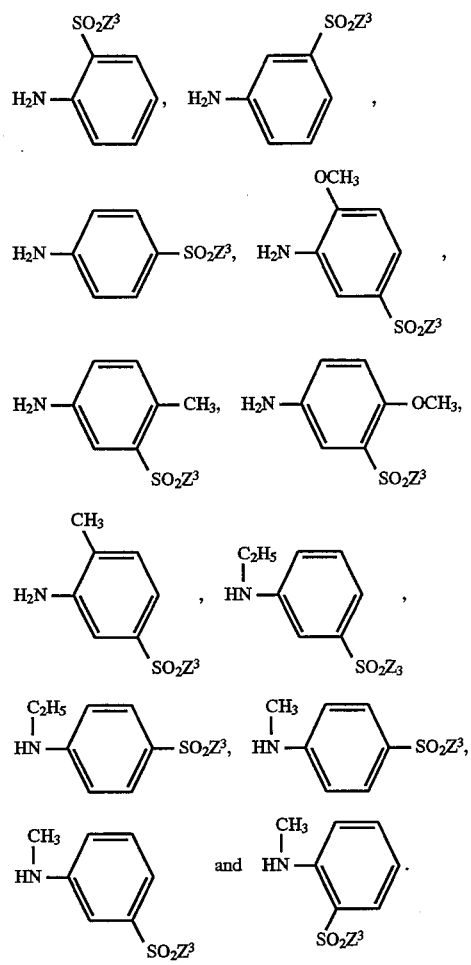

Of these, preferred groups $-NR^{10}R^{11}$ are those derived from ammonia, methylamine, ethylamine, 2-hydroxyethylamine, 2-sulfoethylamine, 2-carboxyethylamine, aniline, N-methylaniline, N-ethylaniline, 2-, 3- or 4-anilinesulfonic acid,

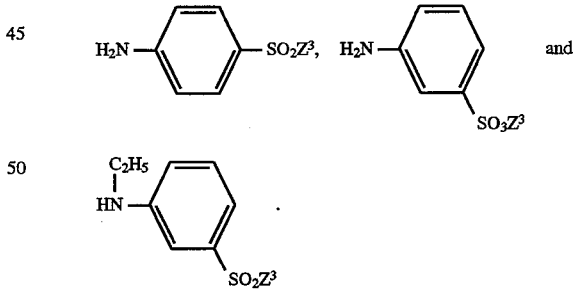

When $R^{10}$ and $R^{11}$ conjointly form a ring, the ring may be the same one as exemplified for $-NR^5R^6$.

Among the amines represented by $H-NR^{10}R^{11}$ for forming the group $-NR^{10}R^{11}$ and exemplified above, the aromatic amines (i.e. aniline and its derivatives) are particularly preferred.

The compounds of the invention exist in the form of a free acid or a salt thereof. Of the salts, preferred are alkali metal salts and alkaline earth metal salts, and particularly preferred are sodium salt, potassium salt and lithium salt.

The compounds of the invention can be produced, for example, in the following manner. Thus, a compound of the formula (I) can be produced by subjecting 2,4,6-trihalogeno-s-triazine of the formula (XII):

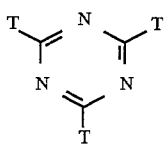

wherein T is halogen, to a successive condensation with a bisazo compound represented by the following formula (VI) in the free acid form:

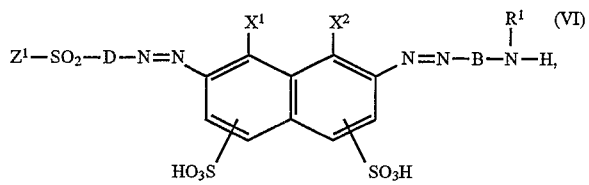

wherein B, D, R¹, X¹, X² and Z¹ are as defined above, a compound selected from the compounds of the formulas (VIIa) and (VIIb):

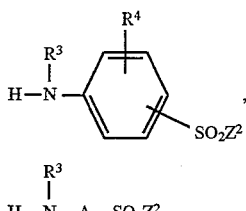

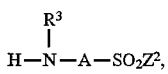

wherein R³, R⁴, A and Z² are as defined above, and a compound selected from the compounds of the formulas (VIII) to (XI):

H—OR⁷ (VIII), H—OR⁸, (IX)

H—NR⁵R⁶ (X), H—NR¹⁰R¹¹, (XI)

wherein R⁵, R⁶, R⁷, R⁸, R¹⁰ and R¹¹ are as defined above, in an arbitrary order.

As the 2,4,6-trihalogeno-s-triazine, preferred are cyanuric chloride and cyanuric fluoride.

Preferable orders of condensation with 2,4,6-trihalogeno-s-triazine are as follows. Thus, when a compound of the formula (I) in which L is a group of the formula (II) or (IV) is synthesized from a compound of the formula (VIII) or (IX), it is preferable to carry out the condensation of the compound of the formula (VIII) or (IX) primarily or secondarily, and particularly preferably primarily. When a compound of the formula (I) in which L is a group of the formula (III) is synthesized from a compound of the formula (X), it is preferable to carry out the condensation of the compound of the formula (X) primarily or secondarily.

When a compound of the formula (I) in which L is a group of the formula (II) or (III) is synthesized from a compound of the formula (VIIa), the condensation of the compound of the formula (VIIa) can be carried out primarily, secondarily or tertiarily with excellent results, and it is preferably carried out secondarily or tertiarily.

When a compound of the formula (I) in which L is a group of the formula (IV) is synthesized from a compound of the formula (VIIb), it is preferable to carry out the condensation of the compound of the formula (VIIb) primarily or secondarily.

When a compound of the formula (I) in which L is a group of the formula (V) is synthesized from a compound of the formula (VIIb), it is preferable to carry out the condensation of the compound of the formula (VIIb) primarily or secondarily, and particularly primarily.

When a compound of the formula (I) in which L is a group of the formula (V) is synthesized from a compound of the formula (XI), it is preferable to carry out the condensation of the compound of the formula (XI) primarily or secondarily in case that R¹¹ is an aliphatic group, and secondarily or tertiarily in case that R¹¹ is an aromatic group.

In all the case mentioned above, however, the order of condensation reactions is not limited and the reaction conditions are also not limited. Generally speaking, the primarily reaction is carried out at a temperature of from −10° C. to +40° C. at a pH value of from 1 to 10, the secondary reaction is carried out at a temperature of from 0° C. to 70° C. at a pH value of from 2 to 10, and the tertiary reaction is carried out at a temperature of from 10° C. to 100° C. at a pH value of from 2 to 9, by which a compound of the formula (I) or a salt thereof can be obtained.

Alternatively, the compounds of the invention can be synthesized in the following manner, too. Thus, by using a diamine compound of the following formula (XIII):

wherein B and R¹ are as defined above, as a component of condensation in place of the bisazo intermediate compound of the formula (VI) used in the production process mentioned above, the same synthesis procedure as above is carried out to obtain an amine compound of the following formula (XIV):

wherein B, R¹ and L are as defined above. Apart from it, an amine compound of the following formula (XV):

wherein Z¹ and D are as defined above, is prepared. Both the amine compounds are separately diazotized in a usual manner and coupled with a compound represented by the following formula (XVI) in the free acid form:

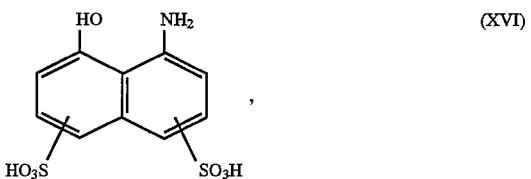

in an arbitrary order, whereby a compound of the formula (I) can be obtained. The coupling reaction can be made to progress primarily at a temperature of from −10° C. to +30° C. at a pH value of from 0 to 4, and secondarily at a temperature of from 0° C. to 40° C. at a pH value of from 2 to 8.

As the compound of the formula (XVI), preferred are H acid represented by the formula (9) and K acid represented by the formula (10):

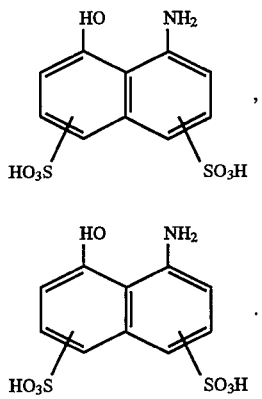

(9)

(10)

Of these, further preferred is H acid of the formula (9).

As a third alternative, a compound of the formula (I) can be synthesized also by coupling a compound of the above-mentioned formula (XVI) in an arbitrary order with diazo components constituted of an amine compound of the above-mentioned formula (XV) and one of the following compounds (XVII) to (XXIII) as diazo components:

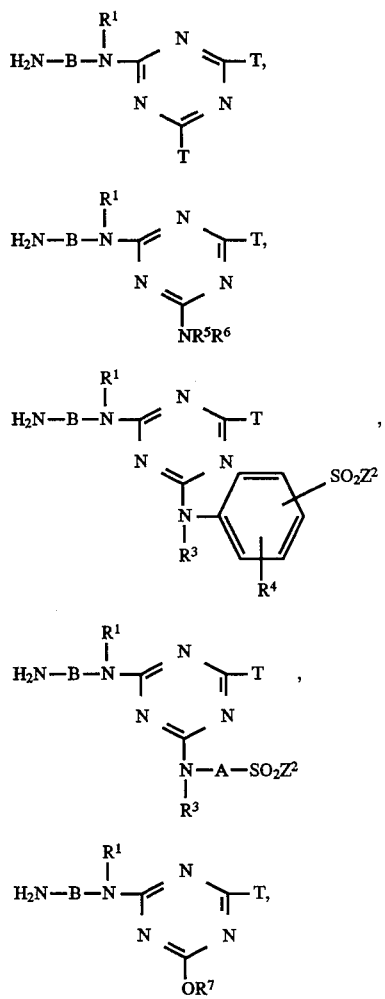

(XVII)

(XVIII)

(XIX)

(XX)

(XXI)

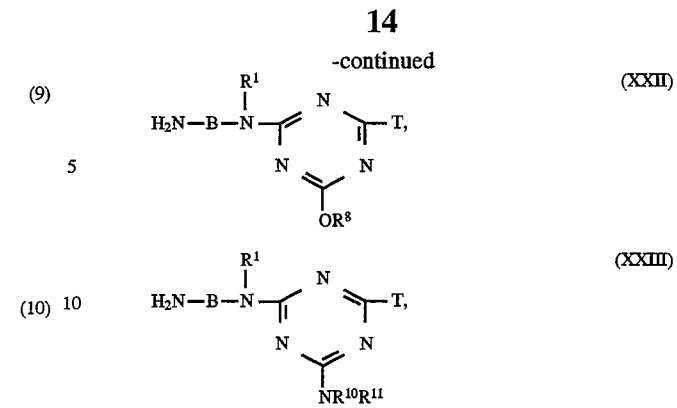

(XXII)

(XXIII)

wherein T, $R^1$, B, $R^5$, $R^6$, $R^3$, $R^4$, $Z^2$, A, $R^7$, $R^8$, $R^{10}$ and $R^{11}$ are as defined above, followed by secondary and/or tertiary condensation reaction. In this method, if a diazo compound selected from the compounds of the formulas (XVII) to (XXIII) is primarily coupled with a compound of the formula (XVI), the secondary and/or tertiary condensation reaction may be carried out at a stage of monoazo intermediate compound before preparing the bisazo compound.

When the groups represented by $Z^1$ and $Z^2$ are each —$CH_2CH_2Z'$ wherein $Z'$, namely a group capable of being split by the action of an alkali, is an ester group such as sulfuric acid ester group, phosphoric acid ester group or the like, the ester group may be formed after the condensation or the coupling reaction. That is to say, a compound of the formula (I) can be obtained by carrying out the same reaction procedure as above by using the following compounds (XXIV), (XXV), (XXVI) and (XXVII) in place of the compounds of (VIIa), (VIIb), (VI) and (XV), respectively, used in the above-mentioned production:

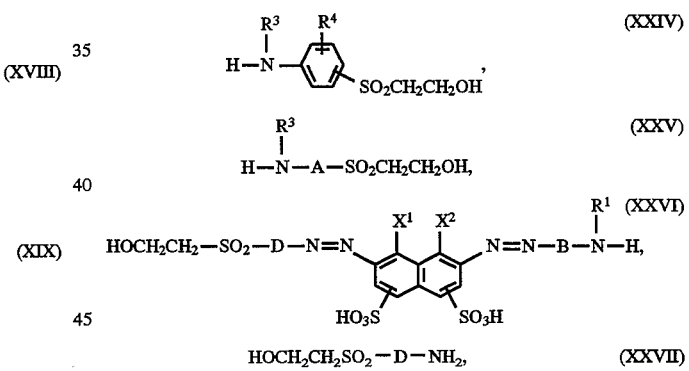

(XXIV)

(XXV)

(XXVI)

(XXVII)

wherein $R^3$, $R^4$, A, $X^1$, $X^2$, B, $R^1$ and D are as defined above, and, at an arbitrary stage, esterifying the precursor of ester compound thus obtained in the conventional manner and treating the product in the same manner as above.

Examples of the chromophore usable in the invention, namely the compound of the formula (VI) in which $SO_2Z^1$ is hydrogen, include the following:

1-hydroxy-2-(1'-sulfonaphth-2'-ylazo)-7-(5"-amino-2"-sulfophenylazo)-8-aminonaphthalene-3,6-disulfonic acid, 1-hydroxy-2-(1'-sulfonaphth-2'-ylazo)-7-(5"-amino-2"-sulfophenylazo)-8-aminonaphthalene-3,5-disulfonic acid, 1-hydroxy-2-(5'-amino-2'-sulfophenylazo)-7-(1"-sulfonaphth-2"-ylazo)-8-aminonaphthalene-3,6-disulfonic acid, 1-hydroxy-2-(5'-amino-2'-sulfophenylazo)-7-(1"-sulfonaphth-2"-ylazo)-8-aminonaphthalene-3,5-disulfonic acid, 1-hydroxy-2-(1', 7'-disulfonaphth-2'-ylazo)-7-(5"-amino-2"-sulfophenylazo)-8-aminonaphthalene-3,6-disulfonic acid, 1-hydroxy-2-(5'-amino-2'-sulfophenylazo)-7-(1", 7"-disulfophenylnaphth-2"-ylazo)-8-aminonaphthalene-3,6-disulfonic acid, 1-hydroxy-2-(5'-amino-2'-sulfophenylazo)-7-(6"-sulfonaphth-2"-ylazo)-8-aminonaphthalene-3,6-disulfonic acid, 1-hydroxy-2-(5'-amino-2'-sulfophenylazo)-7-(8"-sulfonaphth-2"-ylazo)-8-aminonaphthalene-3,6-disulfonic acid, 1-hydroxy-2-(5'-amino-2'-sulfophenylazo)-7-(6"-sulfonaphth-2"-ylazo)-8-aminonaphthalene-3,5-disulfonic acid, 1-hydroxy-2-(1'-sulfonaphth-2'-ylazo)-7-(4"-amino-2"-sulfophenylazo)-8-aminonaphthalene-3,6-disulfonic acid, 1-hydroxy-2-(1'-sulfo-5'-aminomethylnaphth-2'-ylazo)-7-(2"-sulfophenylazo)-8-aminonaphthalene-3,6-disulfonic acid, 1-hydroxy-2-(2'-sulfophenylazo)-7-(1"-sulfo-5"-aminomethylnaphth-2"-ylazo)-8-aminonaphthalene-3,6-disulfonic acid, 1-hydroxy-2-(1'-sulfo-5'-aminomethylnaphth-2'-ylazo)-7-(1"-sulfonaphth-2"-ylazo)-8-aminonaphthalene-3,6-disulfonic acid, 1-hydroxy-2-(1'-sulfonaphth-2'-ylazo)-7-(1"-sulfo-5"-aminomethylnaphth-2"-ylazo)-8-aminonaphthalene-3,6-disulfonic acid, 1-hydroxy-2-(1', 7'-disulfo-5'-aminomethyl-naphth-2'-ylazo)-7-(2"-sulfophenylazo)-8-amino-naphthalene-3,6-disulfonic acid, 1-hydroxy-2-(2'-sulfophenylazo)-7-(1", 7"-disulfo-5"-aminomethylnaphth-2"-ylazo)-8-amino-naphthalene-3,6-disulfonic acid, 1-hydroxy-2-(5'-aminomethyl-4'-methyl-2'-sulfophenylazo)-7-(1"-sulfonaphth-2"-ylazo)-8-aminonaphthalene-3,6-disulfonic acid, 1-hydroxy-2-(1'-sulfonaphth-2'-ylazo)-7-(5"-aminomethyl-4"-methyl-2"-sulfophenylazo)-8-aminonaphthalene-3,6-disulfonic acid, 1-hydroxy-2-(2'-sulfophenylazo)-7-(5"-amino-2"-sulfophenylazo)-8-aminonaphthalene-3,6-disulfonic acid, 1-hydroxy-2-(5'-amino-2'-sulfophenylazo)-7-(2"-sulfophenylazo)-8-aminonaphthalene-3,6-disulfonic acid, 1-hydroxy-2-(1'-sulfonaphth-2'-ylazo)-7-(1", 7"-disulfo-5"-aminomethylnaphth-2"-ylazo)-8-aminonaphthalene-3,6-disulfonic acid, 1-hydroxy-2-(1'-sulfonaphth-2'-ylazo)-7-(5"-amino-4"-methyl-2"-sulfophenylazo)-8-aminonaphthalene-3,6-disulfonic acid, 1-hydroxy-2-(5'-amino-2'-sulfophenylazo)-7-phenylazo-8-aminonaphthalene-3,6-disulfonic acid, 1-hydroxy-2-(1-sulfonaphth-2'-ylazo)-7-(4"-amino-5"-methoxy-2"-sulfophenylazo)-8-aminonaphthalene-3,6-disulfonic acid, 1-hydroxy-2-(1-sulfonaphth-2'-ylazo)-7-(5"-amino-4"-methoxy-2"-sulfophenylazo)-8-aminonaphthalene-3,6-disulfonic acid, 1-hydroxy-2-(2'-sulfophenylazo)-7-(4"-amino-5"-methoxy-2"-sulfophenylazo)-8-aminonaphthalene-3,6-disulfonic acid, 1-hydroxy-2-(4'-amino-5'-methoxy-2'-sulfophenylazo)-7-(1"-sulfonaphth-2"-ylazo )-8-amino-naphthalene-3,6-disulfonic acid, 1-hydroxy-2-(5'-amino-4'-methoxy-2'-sulfophenylazo)-7-(1"-sulfonaphth-2"-ylazo)-8-amino-naphthalene-3,6-disulfonic acid and 1-hydroxy-2-(4'-amino-5'-methoxy-2'-sulfophenylazo)-7-(2"-sulfophenylazo)-8-aminonaphthalene-3,6-disulfonic acid.

Of the compounds represented by the formula (I) according to the present invention, preferred are those represented by the following formulas (E) and (F) each in the free acid form:

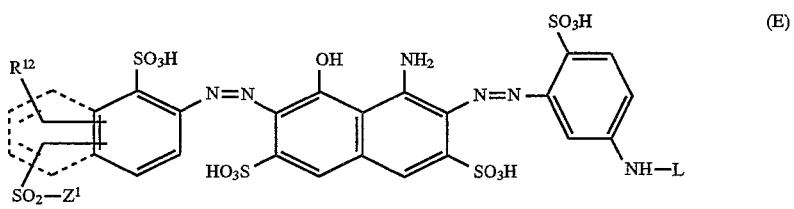

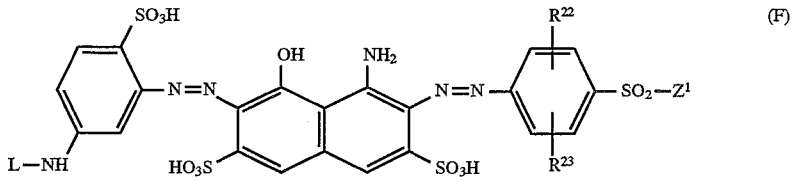

wherein $Z^1$ and L are as defined above, $R^{12}$ is hydrogen or sulfo, and $R^{22}$ and $R^{23}$ independently of one another are each hydrogen, methyl, methoxy or sulfo.

Preferred compounds of the formula (E) include, for example, those represented by the following formulas (E-1) to (E-4) each in the free acid form:

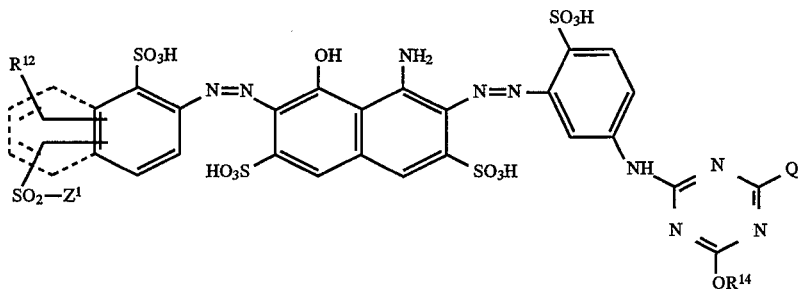

(E-1)

wherein $Z^1$ and $R^{12}$ are as defined above, $R^{14}$ is methyl or ethyl, and Q is a group represented by the following formula (K-1) or (K-2):

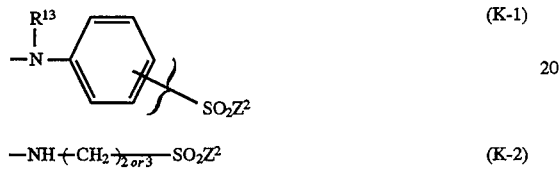

in which $R^{13}$ is hydrogen, methyl or ethyl, and $Z^2$ is as defined above;

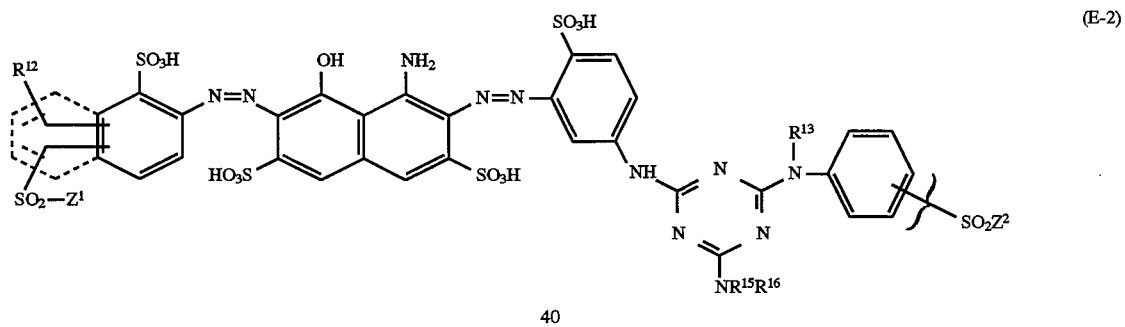

(E-2)

wherein $Z^1$, $Z^2$, $R^{12}$ and $R^{13}$ are as defined above, $R^{15}$ is hydrogen and $R^{16}$ is hydrogen, methyl or ethyl or $NR^{15}R^{16}$ is morpholino;

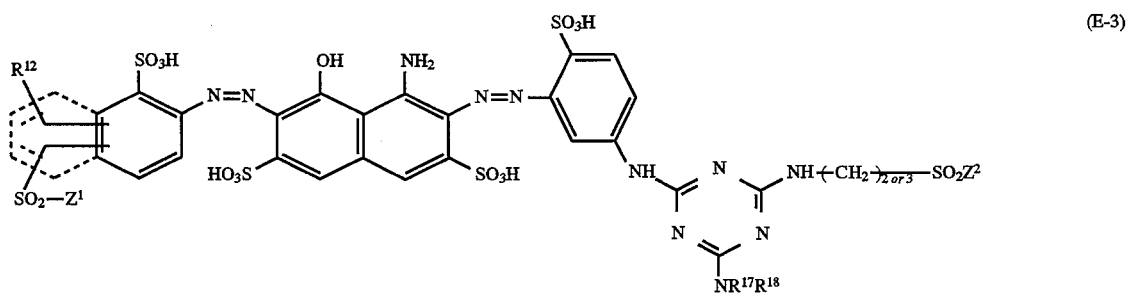

(E-3)

wherein $Z^1$, $Z^2$ and $R^{12}$ are as defined above, $R^{17}$ is hydrogen and $R^{18}$ is hydrogen, methyl, ethyl, 2-hydroxyethyl, phenyl, sulfophenyl, methylphenyl, methoxyphenyl, hydroxyphenyl or carboxyphenyl, or $NR^{17}R^{18}$ is morpholino. $R^{18}$ is particularly preferably unsubstituted or substituted phenyl mentioned above;

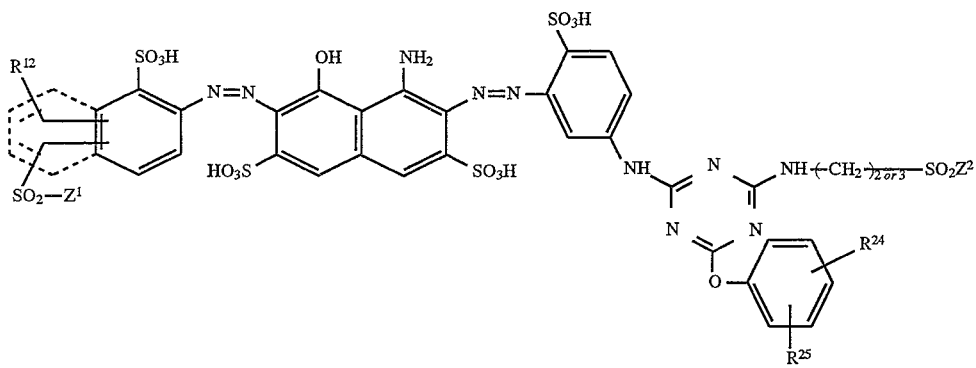

wherein $Z^1$, $Z^2$ and $R^{12}$ are as defined above, and $R^{24}$ and $R^{25}$ independently of one another are each hydrogen, sulfo, methyl, ethyl, methoxy, ethoxy, chloro or carboxy.

wherein $R^{13}$, $R^{15}$ and $R^{16}$ are as defined above;

Other preferred compounds encompassed within the formula (E) are, for example, represented by the following formulas (E-5) to (E-12) each in the free acid form:

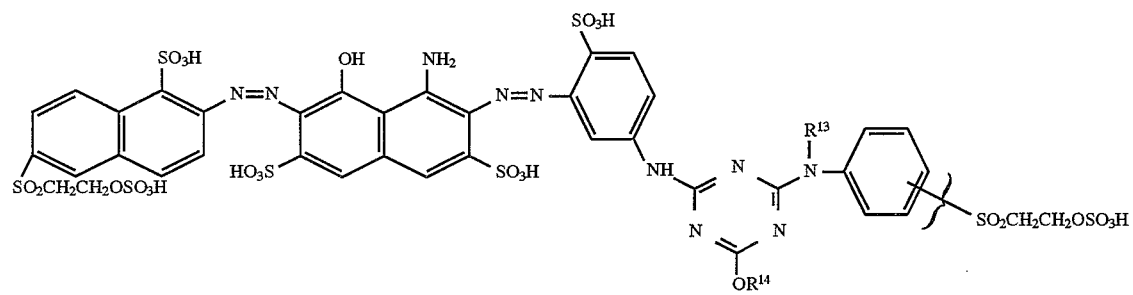

wherein $R^{13}$ and $R^{14}$ are as defined above;

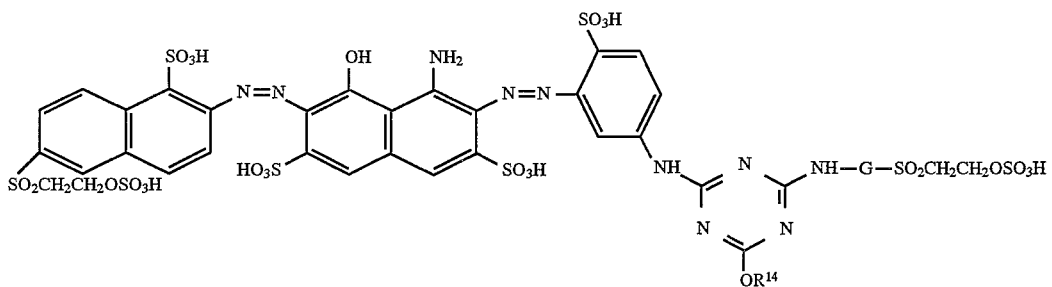

wherein $R^{14}$ is as defined above, and G is a divalent aliphatic group represented by the earlier mentioned formula (6), (7) or (8);

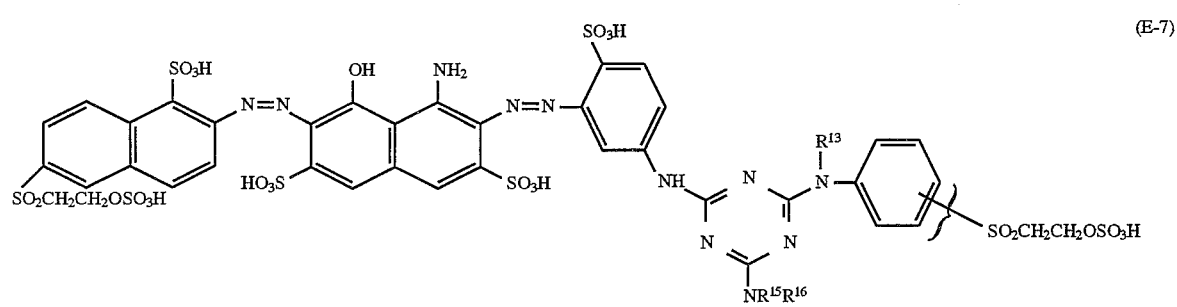

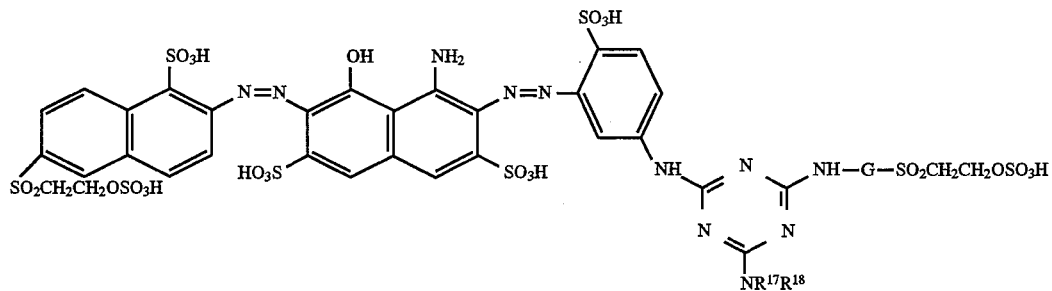
(E-8)
wherein G, $R^{17}$ and $R^{18}$ are as defined above;
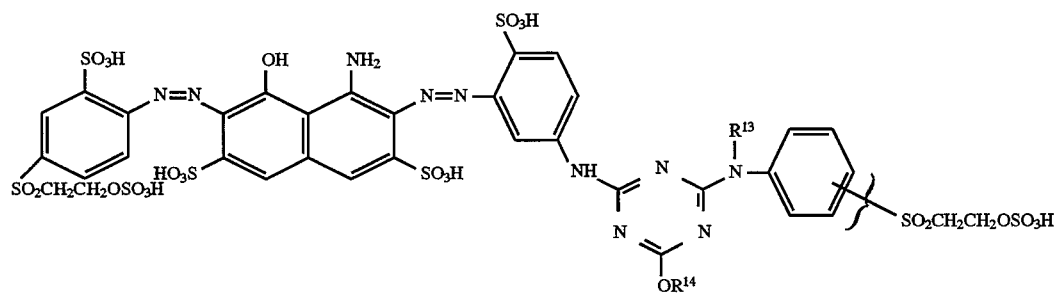
(E-9)
wherein $R^{13}$ and $R^{14}$ are as defined above;
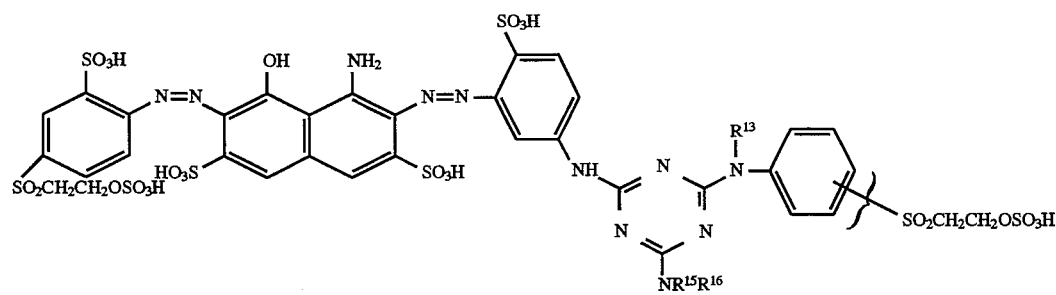
(E-10)
wherein $R^{13}$, $R^{15}$ and $R^{16}$ are as defined above;
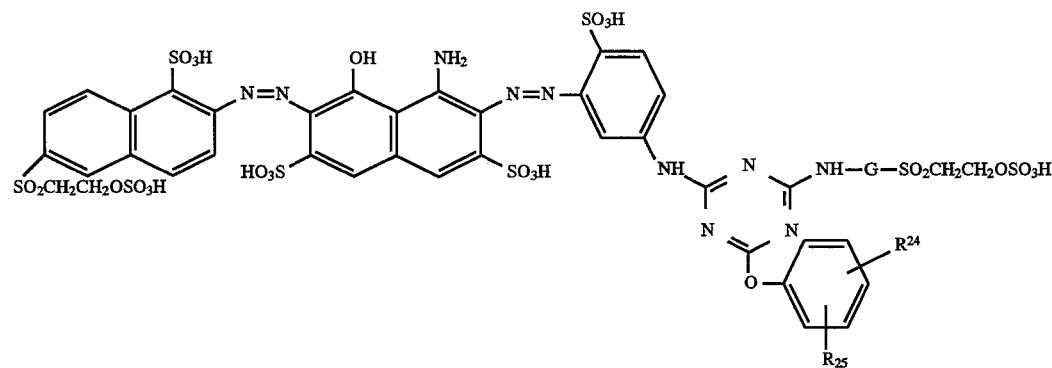
(E-11)
wherein G, $R^{24}$ and $R^{25}$ are as defined above; and

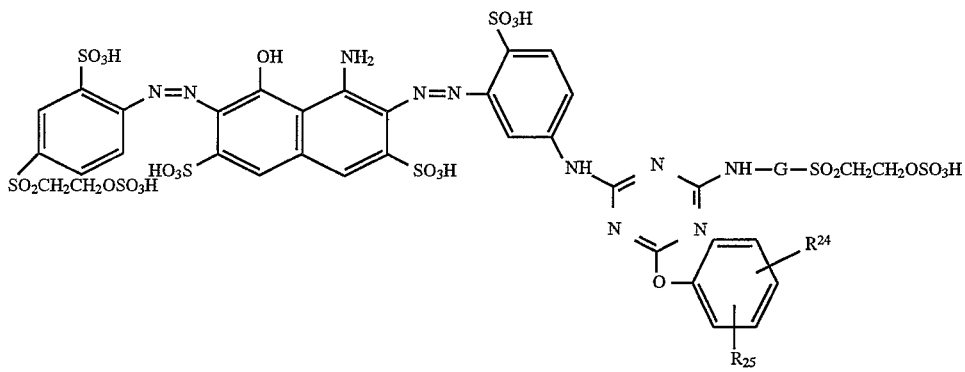

(E-12)

wherein G, $R^{24}$ and $R^{25}$ are as defined above.

Preferred compounds of the formula (F) include, for example, those represented by the following formula (F-1) in the free acid form:

are cotton and other vegetable fibers such as linen, hemp, jute and ramie fibers. Examples of the regenerated cellulose fibers are viscose staple and filament viscose.

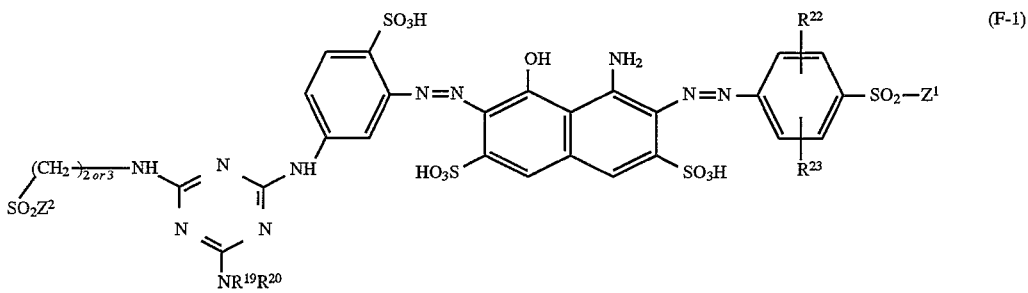

(F-1)

wherein $Z^1$, $Z^2$, $R^{22}$ and $R^{23}$ are as defined above, $R^{19}$ is hydrogen, methyl or ethyl, and $R^{20}$ is hydrogen, methyl, ethyl, 2-hydroxyethyl, phenyl, methylphenyl, methoxyphenyl, sulfophenyl, carboxyphenyl, chlorophenyl, hydroxyphenyl or 3- or 4-(β-sulfatoethylsulfonyl)phenyl, or $NR^{19}R^{20}$ is morpholino.

Other preferred compounds encompassed within the formula (F) are, for example, represented by the following formula (F-2) in the free acid form:

The amide group-containing materials include synthetic or natural polyamide and polyurethane. Examples of the materials, particularly in the fibrous forms, are wool and other animal furs, silk, leather, polyamide-6,6, polyamide-6, polyamide-11 and polyamide-4.

The dyeing may be carried out in a suitable manner, which can be selected from conventional manners depending on the physical and chemical properties of said fiber materials.

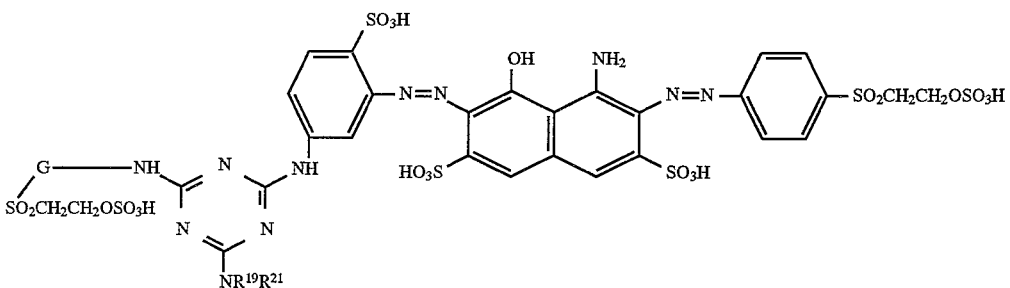

(F-2)

wherein G and $R^{19}$ are as defined above, and $R^{21}$ is phenyl, methylphenyl, methoxyphenyl, chlorophenyl, sulfophenyl, carboxyphenyl or 3- or 4-(β-sulfatoethylsulfonyl)phenyl.

The compound of the present invention is fiber-reactive and useful for dyeing or printing hydroxyl group-containing and amide group-containing materials in a fibrous form including unmixed or mixed fibers.

The hydroxyl group-containing materials include natural or synthetic hydroxyl group-containing materials such as cellulose fiber materials, regenerated products thereof and polyvinyl alcohol. Examples of the cellulose fiber materials For example, cellulose fiber materials can be dyed using the compound by an exhaustion dyeing, padding including cold batch-up dyeing or printing method.

The exhaustion dyeing can be carried out at a relatively low temperature in the presence of an acid binding agent such as sodium carbonate, trisodium phosphate, sodium hydroxide and the like, if desired, using a neutral salt such as sodium sulfate, sodium chloride and the like, together with a hydrotropic agent, a penetrant or a level dyeing agent. The neutral salt suitable for promoting the exhaustion may be added to a dye bath before or after temperature reaching a desired level for the dyeing, if desired, dividedly.

The padding can be carried out by padding the fiber materials at ambient temperature or an elevated temperature, and after drying, steaming or dry-heating the materials to perform the dye-fixation.

The printing can be carried out in a one-phase or two-phase manner. The one-phase printing may be conducted by printing the fiber materials with a printing paste containing an acid binding agent such as sodium hydrogencarbonate and the like, followed by steaming at a temperature of 95° to 160° C. The two-phase printing may be conducted by printing the fiber materials with a neutral or weakly acidic printing paste, and passing the materials through a hot alkaline bath containing an electrolyte or over-padding the materials with an alkaline padding liquor containing an electrolyte, followed by a steaming or dry-heating treatment.

For the preparation of the printing paste, a thickener or emulsifier such as sodium alginate, starch ether and the like may be used, if desired, together with a conventional auxiliary agent such as urea and/or dispersing agent.

The acid binding agent useful for fixing the compound of the present invention on the cellulose fiber materials includes water-soluble basic salts consisting of alkali or alkaline earth metals and inorganic or organic acids or compounds capable of liberating alkali under heating conditions. Preferred are alkali metal hydroxides and alkali metal salts of inorganic or organic acids having a weak or medium strength. Particularly preferred are sodium salts and potassium salts. Examples thereof are sodium hydroxide, potassium hydroxide, sodium hydrogencarbonate, sodium carbonate, sodium formate, potassium carbonate, sodium dihydrogenphosphate, disodium hydrogenphosphate, trisodium phosphate, sodium silicate, sodium trichloroacetate and the like.

The dyeing of natural or synthetic polyamide and polyurethane fiber materials can be carried out by performing exhaustion in an acid or weak acid bath, while controlling the pH value, and then making the bath neutral, or in some cases alkaline to perform the fixation. The dyeing temperature ranges usually from 60° to 120° C. In order to achieve a level dyeing, there may be used a conventional level dyeing agent such as condensation product between cyanuric chloride and 3 times by mole of aminobenzenesulfonic acid or aminonaphthalene-sulfonic acid, or an addition product between stearylamine and ethylene oxide, and the like.

The compound of the invention is characterized by excellent dye performance in the dyeing and printing of fiber materials, particularly cellulose fiber materials. For example, the compound can give a dyed product excellent in light fastness, perspiration-light fastness, wet fastness such as washing resistance, peroxide-washing resistance, chlorine resistance, perspiration resistance and acid-hydrolysis resistance, and alkali resistance, abrasion fastness and iron fastness.

Further, the compound of the invention can exhibit excellent dyeing power, build-up property and washing off property, and high solubility as well as exhaustion and fixation percentages. Moreover, the compound of the invention can hardly be affected by dyeing temperature, quantities of dyeing assistants such as salt and alkali, and bath ratios, and therefore can give dyed products of constant quality.

Furthermore, the dyed products obtained according to the invention are hard to be changed in color on a fix-treatment or resin-finishing, or in contact with a basic material during storage.

The compound of the invention can give good results also when used in the form of a compounded mixture with any of the fiber-reactive dyes mentioned in, for example, JP-A-61-155469 (=EP-A-184071), JP-A-59-161463, JP-A-56-15481 (=EP-A-21105), JP-A-57-89679 (=EP-A-52985), JP-A-60-6754, JP-A-50-178, JP-A-56-118976 (=EP-A-35171), JP-A-63-77974 (=EP-239847), JP-A-57-2365 (=EP-A-42108), JP-A-59-15451 (=EP-A-99721), JP-A-56-9483 (=EP-A-22265), JP-A-60-123559 and JP-A-56-128380. Further, the compound of the invention can give good results when used in the form of a compounded mixture with any of the dyes marketed under the commercial names of Sumifix Supra, Sumifix, Levafix, Remazol and the like.

The present invention is illustrated in more detail with reference to the following examples, which are only illustrative but not limitative to the scope of the invention. In the examples, parts are by weight.

Example 1

In a usual manner, 2,4-diaminobenzenesulfonic acid (3.76 parts) and cyanuric chloride (3.69 parts) were subjected to a condensation reaction with each other at a pH value of 2–4 at a temperature of 0°–15° C., followed by a condensation reaction with 2-(β-hydroxyethylsulfonyl)ethylamine (3.06 parts) at pH 6–9 at a temperature of 15°–40° C. The resulting condensate was diazotized in a usual manner and the diazotized product was coupled with 1-amino-8-hydroxynaphthalene-3,6-disulfonic acid (6.39 parts) at pH 1–3.5 at a temperature of 0°–15° C., and further a diazotized product of 2-aminonaphthalene-6-β-sulfatoethylsulfone-1-sulfonic acid (8.23 parts) was coupled therewith at pH 4–8 at a temperature of 0°–30° C. Then, the thus obtained product was condensed with 3-aminobenzenesulfonic acid (3.47 parts) at pH 2–5 at a temperature of 50°–80° C. The product thus obtained was converted to a sulfuric ester in a usual manner and salted out to obtain a bisazo compound represented by the following formula in the free acid form:

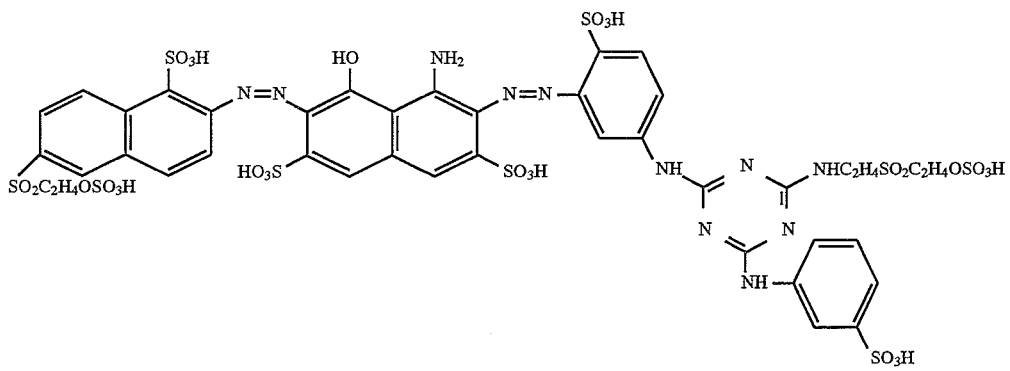

(λmax = 610 nm, in aqueous medium).

Example 2

The synthesis of Example 1 was repeated, except that 2-aminonaphthalene-6-β-sulfatoethylsulfone-1-sulfonic acid, 1-amino-8-hydroxynaphthalene-3,6-disulfonic acid, 2,4-diaminobenzenesulfonic acid, 3-aminobenzenesulfonic acid and 2-(β-hydroxyethylsulfonyl)ethylamine were replaced with the compounds shown in column 2, column 3, column 4, column 5 and column 6 of the following table, respectively, to obtain the corresponding bisazo compounds. When used for dyeing, the bisazo compounds gave dyed products of which hues were as shown in column 7 of the table. Similar results were obtained when the above-mentioned synthesis was repeated while changing the order of primary and secondary condensation reactions with cyanuric chloride. Further, similar results were obtained also when the cyanuric chloride was replaced with cyanuric fluoride. Further, similar results were obtained also when the compound of column 6 was replaced with the corresponding sulfuric ester derivative and the final step, namely conversion to a sulfuric ester, was omitted.

TABLE 1

| 1 | 2 | 3 | 4 | 5 | 6 | 7 |
|---|---|---|---|---|---|---|
| 1 | 2-amino-1,6-naphthalenedisulfonic acid derivative (SO₃H, NH₂, SO₂C₂H₄OSO₃H) | 8-amino-1-hydroxy-naphthalene-3,6-disulfonic acid | 2,4-diaminobenzenesulfonic acid (SO₃H, NH₂, NH₂) | 4-aminobenzenesulfonic acid | $H_2NC_2H_4SO_2C_2H_4OH$ | Navy blue |
| 2 | 5-amino-benzene-1,3-disulfonic acid derivative | " | 2-amino-5-methoxy-4-sulfobenzene (OCH₃, NH₂, SO₃H) | 2-aminobenzoic acid (CO₂H, NH₂) | " | Navy blue |
| 3 | " | " | 2,4-diaminobenzenesulfonic acid (SO₃H, NH₂, NH₂) | 3-aminobenzenesulfonic acid | " | Navy blue |
| 4 | " | 4-amino-5-hydroxy-naphthalene-1,7-disulfonic acid | " | aniline | $H_2NC_2H_4OC_2H_4-SO_2C_2H_4OH$ | Navy blue |
| 5 | " | 8-amino-1-hydroxy-naphthalene-3,6-disulfonic acid | " | 3-aminobenzenesulfonic acid | $H_2NC_3H_6SO_2C_2H_4OH$ | Navy blue |

TABLE 1-continued

| 1 | 2 | 3 | 4 | 5 | 6 | 7 |
|---|---|---|---|---|---|---|
| 6 | 2-amino-1-sulfo-6-(2-sulfatoethylsulfonyl)naphthalene | 8-amino-1-hydroxy-3,6-disulfonaphthalene | 2,4-diamino-1-sulfobenzene | 3-methoxyaniline | H$_2$NC$_2$H$_4$NH—C$_2$H$_4$SO$_2$C$_2$H$_4$OH | Navy blue |
| 7 | 2-amino-1,6-disulfo-5-(2-sulfatoethylsulfonyl)naphthalene (with CH$_3$) | " | 2,5-diamino-4-methyl-1-sulfobenzene | 2-aminobenzoic acid | H$_2$NC$_2$H$_4$SO$_2$C$_2$H$_4$OH | Navy blue |
| 8 | 2-amino-1-sulfo-5-(2-sulfatoethylsulfonyl)benzene | " | 2,4-diamino-1-sulfobenzene | 4-aminobenzenesulfonic acid | H$_2$NC$_4$H$_8$SO$_2$C$_2$H$_4$OH | Navy blue |
| 9 | 3-amino-4-sulfo-1-(2-sulfatoethylsulfonyl)benzene | " | 2,5-diamino-4-methyl-1-sulfobenzene (CH$_3$) | aniline | H$_2$NC$_2$H$_4$OC$_2$H$_2$—SO$_2$C$_2$H$_4$OH | Navy blue |
| 10 | 3-amino-4-sulfo-1-(2-sulfatoethylsulfonyl)benzene | 8-amino-1-hydroxy-3,6-disulfonaphthalene | 2,4-diamino-1-sulfobenzene | 4-chloroaniline | CH$_3$—HNC$_2$H$_4$SO$_2$C$_2$H$_4$OH | Navy blue |
| 11 | " | " | 2,4-diamino-1-sulfobenzene | 2-methylaniline | H$_2$NC$_3$H$_6$SO$_2$C$_2$H$_4$OH | Navy blue |

TABLE 1-continued

| 1 | 2 | 3 | 4 | 5 | 6 | 7 |
|---|---|---|---|---|---|---|
| 12 | " | " | SO₃H / H₂N– benzene –NH₂ | CH₃–HN– benzene | H₂NC₃H₆OC₂H₄–SO₂C₂H₄OH | Navy blue |
| 13 | HO₃S–benzene(SO₃H, NH₂, SO₂C₂H₄OSO₃H) | " | SO₃H / H₂N– benzene(OCH₃) –NH₂ | H₂N– benzene | H₂NC₃H₆SO₂C₂H₄OH | Navy blue |
| 14 | SO₃H / NH₂ naphthalene / SO₂C₂H₄OSO₃H | NH₂ / HO– naphthalene –SO₃H / SO₃H | SO₃H / H₂N– benzene –NH₂ | H₂N– benzene(OCH₃) | H₂NC₂H₄SO₂C₂H₄OH | Navy blue |
| 15 | " | " | " | H₂N– benzene | " | Navy blue |
| 16 | " | " | " | H₂N– benzene(CO₂H) | " | Navy blue |
| 17 | SO₃H / NH₂– benzene –SO₂C₂H₄OSO₃H | " | " | H₂N– benzene(OCH₃) | H₂C₃H₆SO₂C₂H₄OH | Navy blue |

TABLE 1-continued

| 1 | 2 | 3 | 4 | 5 | 6 | 7 |
|---|---|---|---|---|---|---|
| 18 | " | " | " | ![aniline: H2N-C6H5] | " | Navy blue |
| 19 | ![naphthalene with SO3H, NH2, SO2C2H4OSO3H substituents] | ![naphthalene with NH2, OH, 2×SO3H substituents] | ![benzene with SO3H, NH2, NH2 substituents] | ![N-ethylaniline: C2H5-HN-C6H5] | H2NC2H4SO2C2H4OH | Navy blue |
| 20 | " | " | " | ![o-toluidine: CH3, H2N on benzene] | " | Navy blue |
| 21 | " | " | ![benzene with SO3H, NH2, NH2 substituents] | ![p-aminophenol: H2N-C6H4-OH] | " | Navy blue |
| 22 | " | " | " | ![m-chloroaniline: Cl, H2N on benzene] | " | Navy blue |
| 23 | " | " | " | ![o-anisidine: OCH3, H2N on benzene] | " | Navy blue |
| 24 | " | " | " | ![benzene with SO3H, OCH3, H2N substituents] | " | Navy blue |

TABLE 1-continued

| 1 | 2 | 3 | 4 | 5 | 6 | 7 |
|---|---|---|---|---|---|---|
| 25 | 2-amino-1-naphthol with SO$_3$H and SO$_2$C$_2$H$_4$OSO$_3$H | 8-amino-1-naphthol-3,6-disulfonic acid (NH$_2$, OH, SO$_3$H, SO$_3$H) | 2,4-diaminobenzenesulfonic acid (SO$_3$H, NH$_2$, H$_2$N) | 4-chloro-N-ethylaniline (C$_2$H$_5$-HN-C$_6$H$_4$-Cl) | H$_2$NC$_2$H$_4$SO$_2$C$_2$H$_4$OH | Navy blue |
| 26 | " | " | " | 4-methoxyaniline (H$_2$N-C$_6$H$_4$-OCH$_3$) | " | Navy blue |
| 27 | " | " | " | 4-aminobenzoic acid (H$_2$N-C$_6$H$_4$-CO$_2$H) | " | Navy blue |
| 28 | " | " | " | 2-amino-ethylbenzene (H$_2$N-C$_6$H$_4$-C$_2$H$_5$) | " | Navy blue |
| 29 | " | " | " | 3-methoxyaniline (H$_2$N-C$_6$H$_4$-OCH$_3$) | " | Navy blue |
| 30 | 2-amino-benzenedisulfonic derivative (NH$_2$, SO$_3$H, SO$_2$C$_2$H$_4$OSO$_3$H) | 8-amino-1-naphthol-3,6-disulfonic acid | 2,4-diaminobenzenesulfonic acid | N-methylaniline (CH$_3$-HN-C$_6$H$_5$) | H$_2$NC$_2$H$_4$SO$_2$C$_2$H$_4$OH | Navy blue |
| 31 | " | " | " | N-ethylaniline (C$_2$H$_5$-HN-C$_6$H$_5$) | H$_2$NC$_2$H$_4$SO$_2$C$_2$H$_4$OH | Navy blue |

TABLE 1-continued

| 1 | 2 | 3 | 4 | 5 | 6 | 7 |
|---|---|---|---|---|---|---|
| 32 | " | " | " | 4-chloro-N-ethylaniline | " | Navy blue |
| 33 | " | " | " | 4-aminophenol | " | Navy blue |
| 34 | " | " | " | 4-amino-methoxybenzene | $H_2NC_2H_4OC_2H_4$—$SO_2C_2H_4OH$ | Navy blue |
| 35 | " | " | " | 2-amino-methylbenzene | $H_2NC_2H_4OC_2H_4$—$SO_2C_2H_4OH$ | Navy blue |
| 36 | " | " | " | 4-chloroaniline | $H_2NC_2H_4OC_2H_4$—$SO_2C_2H_4OH$ | Navy blue |
| 37 | " | " | " | " | $H_2NC_2H_4SO_2C_2H_4OH$ | Navy blue |
| 38 | " | 8-amino-1-hydroxy-naphthalene-3,6-disulfonic acid | 2,4-diamino-benzenesulfonic acid | 2-aminobenzoic acid | $H_2NC_2H_4SO_2C_2H_4OH$ | Navy blue |
| 39 | " | 2-amino-1-sulfo-6-(β-sulfatoethylsulfonyl)naphthalene | " | 3-(N-ethylamino)-phenyl-β-sulfatoethylsulfone | $H_2NC_3H_6SO_2C_2H_4OH$ | Navy blue |

5,637,705

TABLE 1-continued

| 1 | 2 | 3 | 4 | 5 | 6 | 7 |
|---|---|---|---|---|---|---|
| 40 | " | " | 2-amino-4-(methylamino)benzenesulfonic acid | 3-aminophenyl β-sulfatoethyl sulfone | " | Navy blue |
| 41 | 1-amino-2-sulfo-6-(β-sulfatoethylsulfonyl)naphthalene | | 4-amino-5-methylbenzenesulfonic acid (2-amino-4-methyl-1-sulfonic acid) | " | $H_2NC_2H_4SO_2C_2H_4OH$ | Navy blue |
| 42 | " | " | 2,4-diaminobenzenesulfonic acid | " | $H_2NC_3H_6SO_2C_2H_4OH$ | Navy blue |
| 43 | " | " | 2,4-diaminobenzenesulfonic acid | 3-aminophenyl β-sulfatoethyl sulfone | $H_2NC_2H_4SO_2C_2H_4OH$ | Navy blue |
| 44 | 5-amino-2-(β-sulfatoethylsulfonyl)benzenesulfonic acid | 8-amino-1-hydroxynaphthalene-3,6-disulfonic acid | 2-amino-4-methoxybenzene-5-sulfonic acid | " | $H_2NC_2H_4SO_2C_2H_4OH$ | Navy blue |
| 45 | " | 8-amino-1-hydroxynaphthalene-3,6-disulfonic acid | 2,4-diaminobenzenesulfonic acid | 4-amino-2-methoxyphenyl β-sulfatoethyl sulfone | $H_2NC_3H_6SO_2C_2H_4OH$ | Navy blue |

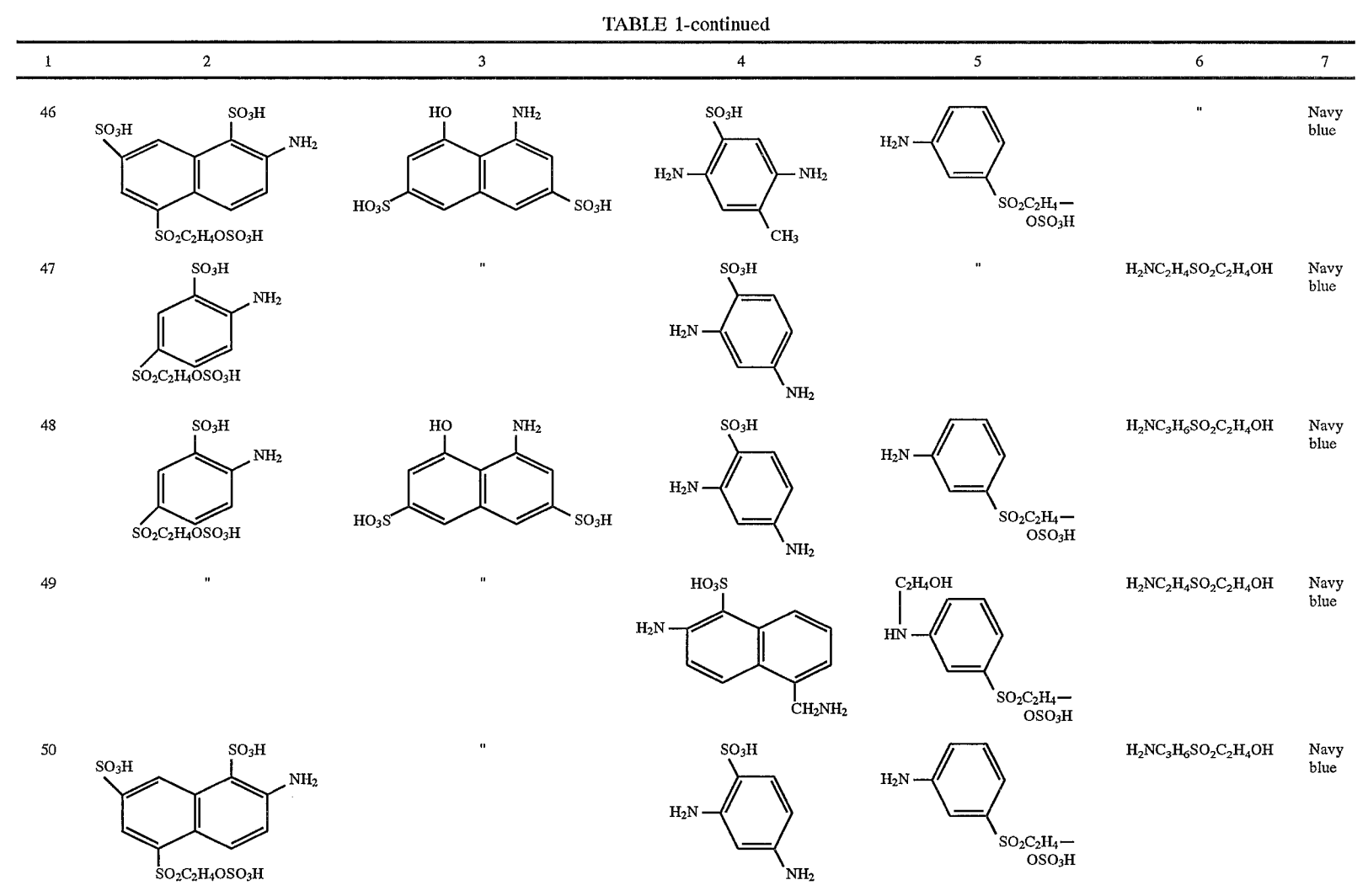

TABLE 1-continued

| 1 | 2 | 3 | 4 | 5 | 6 | 7 |
|---|---|---|---|---|---|---|
| 46 | 2-amino-1,6-disulfo-5-(β-sulfatoethylsulfonyl)naphthalene | 1-amino-8-hydroxy-3,6-disulfonaphthalene | 2,5-diamino-4-methylbenzenesulfonic acid | 3-amino-(β-sulfatoethylsulfonyl)benzene | " | Navy blue |
| 47 | 3-amino-4-(β-sulfatoethylsulfonyl)benzenesulfonic acid | " | 2-amino-4-sulfoaniline | " | $H_2NC_2H_4SO_2C_2H_4OH$ | Navy blue |
| 48 | 3-amino-4-(β-sulfatoethylsulfonyl)benzenesulfonic acid | 1-amino-8-hydroxy-3,6-disulfonaphthalene | 2-amino-4-sulfoaniline | 3-amino-(β-sulfatoethylsulfonyl)benzene | $H_2NC_3H_6SO_2C_2H_4OH$ | Navy blue |
| 49 | " | " | 5-amino-8-sulfo-1-aminomethylnaphthalene | 3-(N-hydroxyethyl)amino-(β-sulfatoethylsulfonyl)benzene | $H_2NC_2H_4SO_2C_2H_4OH$ | Navy blue |
| 50 | 2-amino-1,6-disulfo-5-(β-sulfatoethylsulfonyl)naphthalene | " | 2-amino-4-sulfoaniline | 3-amino-(β-sulfatoethylsulfonyl)benzene | $H_2NC_3H_6SO_2C_2H_4OH$ | Navy blue |

Note: Column 2-5 contain chemical structure diagrams. The structures shown are:

Row 46:
- Col 2: Naphthalene with SO₃H, NH₂, SO₃H, SO₂C₂H₄OSO₃H substituents
- Col 3: Naphthalene with NH₂, SO₃H, HO, HO₃S substituents
- Col 4: Benzene with SO₃H, CH₃, NH₂, H₂N substituents
- Col 5: Benzene with H₂N, SO₂C₂H₄—OSO₃H substituents Row 47:
- Col 2: Benzene with NH₂, SO₃H, SO₂C₂H₄OSO₃H
- Col 4: Benzene with SO₃H, NH₂, H₂N Row 48:
- Col 2: Benzene with NH₂, SO₃H, SO₂C₂H₄OSO₃H
- Col 3: Naphthalene with NH₂, SO₃H, HO, HO₃S
- Col 4: Benzene with SO₃H, NH₂, H₂N
- Col 5: Benzene with H₂N, SO₂C₂H₄—OSO₃H Row 49:
- Col 4: Naphthalene with CH₂NH₂, HO₃S, H₂N
- Col 5: Benzene with C₂H₄OH, HN, SO₂C₂H₄—OSO₃H Row 50:
- Col 2: Naphthalene with SO₃H, NH₂, SO₃H, SO₂C₂H₄OSO₃H
- Col 4: Benzene with SO₃H, NH₂, H₂N
- Col 5: Benzene with H₂N, SO₂C₂H₄—OSO₃H TABLE 1-continued

| 1 | 2 | 3 | 4 | 5 | 6 | 7 |
|---|---|---|---|---|---|---|
| 51 | 8-amino-5-(aminomethyl)naphthalene-1-sulfonic acid (H$_3$OS–/–H$_2$N, CH$_2$NH$_2$) | 8-amino-1-hydroxynaphthalene-3,6-disulfonic acid (H-acid) | 2,4-diaminobenzenesulfonic acid | 3-aminophenyl-β-sulfatoethylsulfone | H$_2$NC$_2$H$_4$SO$_2$C$_2$H$_4$OH | Navy blue |
| 52 | 2-amino-4-(β-sulfatoethylsulfonyl)bromobenzene (Br, NH$_2$, SO$_2$C$_2$H$_4$OSO$_3$H) | 8-amino-1-hydroxynaphthalene-3,6-disulfonic acid (H-acid) | 2,4-diaminobenzenesulfonic acid | 2-methoxy-5-(β-sulfatoethylsulfonyl)aniline (CH$_3$O, H$_2$N, SO$_2$C$_2$H$_4$–OSO$_3$H) | H$_2$NC$_2$H$_4$SO$_2$C$_2$H$_4$OH | Navy blue |

Example 3

In a usual manner, 2-aminobenzenesulfonic acid (3.47 parts) and cyanuric chloride (3.69 parts) were subjected to a condensation reaction with each other at pH 2–5 at a temperature of 0°–15° C., and then with 2-(β-hydroxyethylsulfonyl)ethylamine (3.06 parts) at pH 6–9 at a temperature of 15°–40° C., and further with 2,4-diaminobenzenesulfonic acid (3.76 parts) at pH 2–5 at a temperature of 50°–80° C. The resulting condensate was diazotized in a usual manner, and the diazotized product was coupled with 1-amino-8-hydroxynaphthalene-3,6-disulfonic acid (6.39 parts) at pH 1–3.5 at a temperature of 0°–15° C., and then a diazotized product of 2-aminonaphthalene-6-β-sulfatoethylsulfone-1-sulfonic acid (8.23 parts) was coupled therewith at pH 4–8 at a temperature of 0°–30° C. The product of coupling reaction thus obtained was converted to a sulfuric ester in a usual manner and salted out to obtain a bisazo compound represented by the following formula in the free acid form:

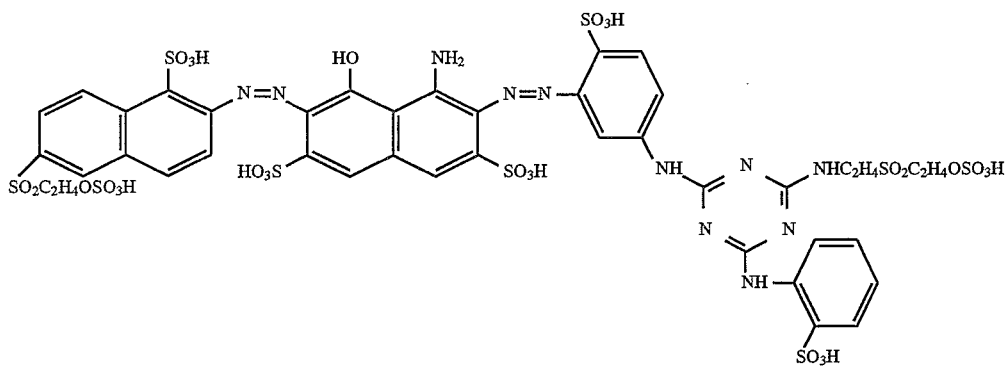

(λmax = 610 nm, in aqueous medium).

Example 4

The same procedure as in Example 3 was repeated, except that 2-aminonaphthalene-6-β-sulfatoethylsulfone-1-sulfonic acid, 1-amino-8-hydroxynaphthalene-3,6-disulfonic acid, 2,4-diaminobenzenesulfonic acid, 2-aminobenzenesulfonic acid and 2-(β-hydroxyethylsulfonyl)ethylamine used in Example 3 were replaced with the compounds of columns 2, 3, 4, 5 and 6 of the following table, respectively, to obtain the corresponding bisazo compounds. When used for dyeing, the bisazo compounds gave dyed products of which hues were as shown in column 7 of the table. When the above-mentioned synthesis was repeated while changing the order of primary and secondary condensation reactions with cyanuric chloride, the results obtained were similar to those obtained above. When the cyanuric chloride was replaced with cyanuric fluoride, the results were similar to those obtained above. When the compound of column 6 (and/or the compound(s) of column 5 and column 2 in case of having —SO$_2$C$_2$H$_4$OH) was replaced with the corresponding sulfuric ester derivative and the final step, namely conversion to a sulfuric ester, was omitted, the results were similar to those obtained above.

TABLE 2

| 1 | 2 | 3 | 4 | 5 | 6 | 7 |
|---|---|---|---|---|---|---|
| 1 | ![benzene with SO₃H, NH₂, SO₂C₂H₄OSO₃H] | ![naphthalene with HO, NH₂, 2×SO₃H] | ![benzene with SO₃H, NH₂, NH₂] | ![benzene with SO₃H, NH₂] | H₂NC₃H₆SO₂C₂H₄OH | Navy blue |
| 2 | ![naphthalene with SO₃H, NH₂, SO₂C₂H₄OSO₃H] | " | " | ![benzene with SO₃H, NH₂, SO₃H] | H₂NC₂H₄SO₂C₂H₄OH | Navy blue |
| 3 | " | " | ![benzene with SO₃H, CH₃, NH₂] | ![benzene with SO₃H, NH₂] | H₂NC₂H₄OC₂H₄SO₂C₂H₄OH | Navy blue |
| 4 | ![naphthalene with SO₃H, NH₂, SO₂C₂H₄OH] | " | ![benzene with SO₃H, NH₂, NH₂] | " | H₂NC₂H₄SO₂C₂H₄OH | Navy blue |
| 5 | ![naphthalene with SO₃H, NH₂, SO₂C₂H₄OSO₃H] | ![naphthalene with HO, NH₂, 2×SO₃H] | ![benzene with SO₃H, NH₂, NH₂] | NH₃ | H₂NC₂H₄SO₂C₂H₄OH | Navy blue |
| 6 | " | " | " | H₂NCH₃ | " | Navy blue |
| 7 | " | " | " | H₂NC₂H₄SO₃H | " | Navy blue |

TABLE 2-continued

| 1 | 2 | 3 | 4 | 5 | 6 | 7 |
|---|---|---|---|---|---|---|
| 8 | 3-aminobenzene with SO$_3$H and SO$_2$C$_2$H$_4$OSO$_3$H | " | " | H$_2$NC$_2$H$_4$CO$_2$H | H$_2$NC$_3$H$_6$SO$_2$C$_2$H$_4$OH | Navy blue |
| 9 | 2-amino-1,6-naphthalene with SO$_3$H and SO$_2$C$_2$H$_4$OSO$_3$H | " | " | H$_2$NC$_2$H$_4$OH | H$_2$NC$_2$H$_4$SO$_2$C$_2$H$_4$OH | Navy blue |
| 10 | 2-amino-1,6-naphthalene with SO$_3$H and SO$_2$C$_2$H$_4$OSO$_3$H | 1-amino-5-hydroxy-naphthalene-3,7-disulfonic acid | 2,4-diaminobenzenesulfonic acid | CH$_3$–HNC$_2$H$_4$SO$_3$H | H$_2$NC$_2$H$_4$OC$_2$H$_4$SO$_2$–C$_2$H$_4$OH | Navy blue |
| 11 | " | 4-amino-5-hydroxy-naphthalene-2,7-disulfonic acid | 4-methyl-2,5-diaminobenzenesulfonic acid | HN(CH$_3$)$_2$ | CH$_3$ \| H$_2$NC$_2$H$_4$NC$_2$H$_4$SO$_2$–C$_2$H$_4$OH | Navy blue |
| 12 | 3-aminobenzene with SO$_3$H and SO$_2$CH=CH$_2$ | 1-amino-5-hydroxy-naphthalene-3,7-disulfonic acid | 4-methyl-2,5-diaminobenzenesulfonic acid | H$_2$NCH$_3$ | CH$_3$ \| H$_2$NCH–CH$_2$SO$_2$C$_2$H$_4$OH | Navy blue |

TABLE 2-continued

| 1 | 2 | 3 | 4 | 5 | 6 | 7 |
|---|---|---|---|---|---|---|
| 13 | ![naphthalene with SO3H, NH2, SO3H, SO2C2H4OSO3H] | " | ![benzene with SO3H, H2N, NH2] | H2NC2H4OH | H2NC3H6SO2C2H4OH | Navy blue |
| 14 | ![benzene with SO3H, NH2, SO2C2H4OSO3H] | " | " | " | H2NC2H4SO2C2H4OH | Navy blue |
| 15 | ![naphthalene with SO3H, NH2, SO2C2H4OSO3H] | ![naphthalene with NH2, OH, SO3H, SO3H] | ![benzene with SO3H, H2N, NH2] | ![morpholine] | H2NC2H4SO2C2H4OH | Navy blue |
| 16 | " | " | " | ![2-aminobenzoic acid: H2N, CO2H] | H2NC3H6SO2C2H4OH | Navy blue |
| 17 | " | " | " | H2NC2H5 | " | Navy blue |
| 18 | " | " | " | ![4-chloro-N-ethylaniline: Cl, HN-C2H5] | " | Navy blue |
| 19 | " | " | " | ![2-chloroaniline: Cl, H2N] | " | Navy blue |

TABLE 2-continued

| 1 | 2 | 3 | 4 | 5 | 6 | 7 |
|---|---|---|---|---|---|---|
| 20 | (naphthalene: SO₃H, NH₂, SO₂C₂H₄OSO₃H) | (naphthalene: HO, NH₂, SO₃H, SO₃H) | (benzene: SO₃H, H₂N, NH₂) | (benzene: OCH₃, H₂N) | H₂NC₂H₄OC₂H₄—SO₂C₂H₄OH | Navy blue |
| 21 | " | " | " | NH₃ | H₂NC₂H₄OC₂H₄—SO₂C₂H₄OH | Navy blue |
| 22 | " | " | " | H₂NC₂H₄OH | H₂NC₃H₆SO₂C₂H₄OH | Navy blue |
| 23 | " | " | " | H₂NC₂H₄Cl | H₂NC₂H₄SO₂C₂H₄OH | Navy blue |
| 24 | " | " | " | HN(CH₃)₂ | H₂NC₂H₄SO₂C₂H₄OH | Navy blue |
| 25 | (benzene: SO₃H, NH₂, SO₂C₂H₄OSO₃H) | " | " | NH₃ | | Navy blue |
| 26 | " | " | (benzene: SO₃H, H₂N, NH₂) | H₂NC₂H₅ | H₂NC₂H₄SO₂C₂H₄OH | Navy blue |
| 27 | (benzene: SO₃H, NH₂, SO₂C₂H₄OSO₃H) | (naphthalene: HO, NH₂, SO₃H, SO₃H) | " | H₂NCH(CH₃)₂ | H₂NC₂H₄SO₂C₂H₄OH | Navy blue |
| 28 | " | " | " | (cyclohexyl-NH₂) | | Navy blue |
| 29 | " | " | " | (4-aminophenol: OH, H₂N) | H₂NC₃H₆SO₂C₂H₄OH | Navy blue |

TABLE 2-continued
| 1 | 2 | 3 | 4 | 5 | 6 | 7 |
|---|---|---|---|---|---|---|
| 30 | 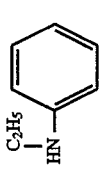 | " | " | $H_2NC_2H_4CO_2H$ | $H_2NC_2H_4OC_2H_4$—$SO_2C_2H_4OH$ | Navy blue |
| 31 | " | " | " | $H_2NC_2H_5$ | $H_2NC_2H_4OC_2H_4$—$SO_2C_2H_4OH$ | Navy blue |
| 32 | " | " | " | 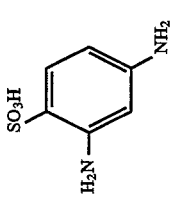 | $H_2NC_2H_4OC_2H_4$—$SO_2C_2H_4OH$ | Navy blue |
| 33 | 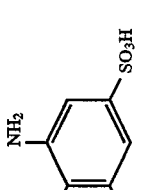 | " | " | 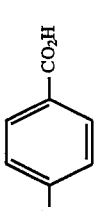 | $H_2NC_2H_4OC_2H_4$—$SO_2C_2H_4OH$ | Navy blue |
| 34 | 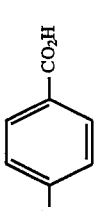 | " | 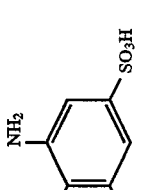 | 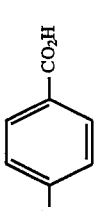 | $H_2NC_2H_4OC_2H_4$—$SO_2C_2H_4OH$ | Navy blue |
| 35 | " | " | " | 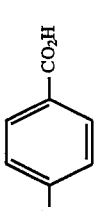 | $H_2NC_3H_6SO_2C_2H_4OH$ | Navy blue |
| 36 | " | " | " | 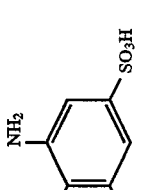 | $H_2NC_2H_4SO_2C_2H_4OH$ | Navy blue |
| 37 | 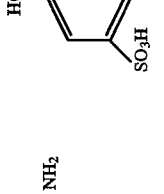 | " | 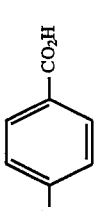 | | $H_2NC_2H_4SO_2C_2H_4OH$ | Navy blue |

TABLE 2-continued

| 1 | 2 | 3 | 4 | 5 | 6 | 7 |
|---|---|---|---|---|---|---|
| 38 | " | naphthalene with NH₂, OH, SO₃H, HO₃S substituents | benzene with SO₃H, H₂N, C₂H₅HN, NHCH₃ substituents | benzene with H₂N, SO₂C₂H₄—OSO₃H substituents | H₂NC₃H₆SO₂C₂H₄OH | Navy blue |
| 39 | " | naphthalene with NH₂, OH, SO₃H, HO₃C substituents | benzene with SO₃H, H₂N, CH₃, NH₂ substituents | benzene with H₂N, SO₂C₂H₄—OSO₃H substituents | H₂NC₂H₄SO₂C₂H₄OH | Navy blue |
| 40 | " | " | benzene with SO₃H, H₂N, NH₂, CH₃ substituents | benzene with H₂N, SO₂C₂H₄OH substituents | H₂NC₃H₆SO₂C₂H₄OH | Navy blue |
| 41 | " | naphthalene with NH₂, OH, HO₃S substituents | benzene with SO₃H, H₂N, NH₂ substituents | benzene with C₂H₅HN, SO₂C₂H₄OH substituents | H₂NC₂H₄N(CH₃)—C₂H₄SO₂CH=CH₂ | Navy blue |
| 42 | " | " | " | " | " | Navy blue |
| 43 | " | " | " | benzene with H₂N, SO₂C₂H₄OH substituents | — | Navy blue |

TABLE 2-continued

| 1 | 2 | 3 | 4 | 5 | 6 | 7 |
|---|---|---|---|---|---|---|
| 44 | ![structure: benzene with SO₃H, NH₂, SO₂C₂H₄OSO₃H] | " | ![structure: benzene with SO₃H, OCH₃, NH₂, H₂N] | " | H₂NC₂H₄SO₂C₂H₄OH | Navy blue |
| 45 | ![structure: benzene with SO₃H, NH₂, SO₂C₂H₄OSO₃H] | ![structure: naphthalene with NH₂, SO₃H, HO, HO₃S] | ![structure: benzene with SO₃H, NH₂, H₂N] | ![structure: benzene with H₂N, SO₂C₂H₄OH] | H₂NC₂H₄OC₂H₄—SO₂CH=CH₂ | Navy blue |
| 46 | " | ![structure: naphthalene with NH₂, SO₃H, HO, HO₃S] | " | " | H₂NC₃H₆SO₂C₂H₄OH | Navy blue |
| 47 | ![structure: naphthalene with SO₃H, NH₂, SO₂C₂H₄OSO₃H] | ![structure: naphthalene with NH₂, SO₃H, HO, HO₃S] | " | ![structure: benzene with H₂N, SO₂C₂H₄OH (meta)] | " | Navy blue |
| 48 | " | " | " | ![structure: benzene with H₂N, SO₂C₂H₄OH] | H₂NC₂H₄OC₂H₄—SO₂C₂H₄OH | Navy blue |
| 49 | ![structure: naphthalene with SO₃H, NH₂, SO₂C₂H₄OH] | ![structure: naphthalene with NH₂, SO₃H, HO, HO₃S] | ![structure: benzene with SO₃H, NHCH₃, H₂N] | ![structure: benzene with C₂H₅HN, SO₂C₂H₄SO₂C₂H₄OH] | H₂NC₂H₄SO₂C₂H₄OH | Navy blue |

TABLE 2-continued

| 1 | 2 | 3 | 4 | 5 | 6 | 7 |
|---|---|---|---|---|---|---|
| 50 | [aniline with SO₃H, NH₂, SO₂C₂H₄OH substituents] | " | [aniline with SO₃H, NH₂, NH₂ substituents] | [phenyl with HN-CH(CH₃)₂ and SO₂C₂H₄OH] | " | Navy blue |
| 51 | [aniline with SO₃H, NH₂, SO₂C₂H₄OSO₃H] | " | " | [aniline with H₂N and SO₂C₂H₄OSO₃H] | H₂NC₃H₆SO₂C₂H₄OH | Navy blue |
| 52 | [aniline with SO₃H, NH₂, SO₂C₂H₄OSO₃H] | " | [toluidine with SO₃H, CH₃, NH₂, H₂N] | " | H₂NC₂H₄SO₂C₂H₄OH | Navy blue |
| 53 | " | [naphthalene with NH₂, HO, SO₃H, HO₃S] | [aniline with SO₃H, H₂N, NH₂] | [aniline with H₂N and SO₂C₂H₄OSO₃H] | H₂NCH₂CH(CN)—CH₂SO₂CH₂CH₂OH | Navy blue |
| 54 | " | [naphthalene with NH₂, HO, SO₃H, HO₃S] | " | [aniline with C₂H₅—HN and SO₂C₂H₄OSO₃H] | H₂NC₃H₆SO₂C₂H₄OH | Navy blue |

Example 5

In a usual manner, 2,4-diaminobenzenesulfonic acid (3.76 parts) and cyanuric chloride (3.69 parts) were subjected to a condensation reaction with each other at pH 2–4 at a temperature of 0°–15° C., and then with 3-(β-chloroethylsulfonyl)propylamine (3.72 parts) at pH 6–9 at a temperature of 15°–40° C., and further with 4-aminobenzenesulfonic acid (3.47 parts) at pH 2–5 at a temperature of 50°–80° C. The resulting condensate was diazotized in a usual manner, and the diazotized product was coupled with 1-amino-8-hydroxynaphthalene-3,6-disulfonic acid (6.39 parts) at pH 1–3.5 at a temperature of 0°–15° C., and then a diazotized product of 2-aminonaphthalene-6-β-sulfatoethylsulfone-1-sulfonic acid (8.23 parts) was coupled therewith at pH 4–8 at a temperature of 0°–30° C. The product of coupling reaction thus obtained was salted out to obtain a bisazo compound represented by the following formula in the free acid form:

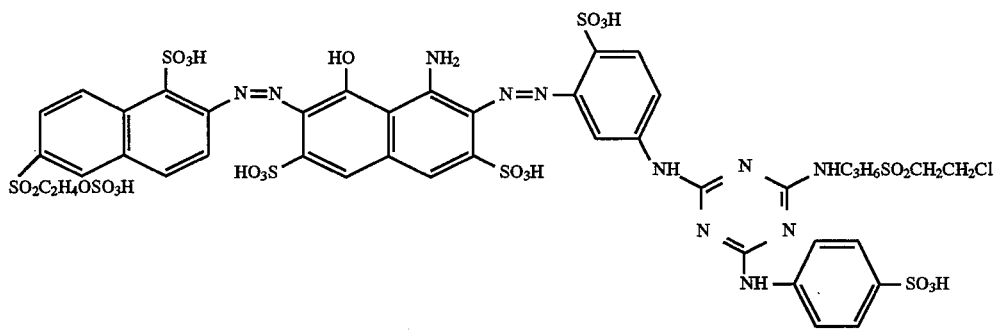

(λmax = 612 nm, in aqueous medium).

Example 6

The same procedure as in Example 5 was repeated, except that 2-aminonaphthalene-6-β-sulfatoethylsulfone-1-sulfonic acid, 1-amino-8-hydroxynaphthalene-3,6-disulfonic acid, 2,4-diaminobenzenesulfonic acid, 4-aminobenzenesulfonic acid and 3-(β-chloroethylsulfonyl)propylamine used in Example 5 were replaced with the compounds of columns 2, 3, 4, 5 and 6 of the following table, respectively, to obtain the corresponding bisazo compounds. When used for dyeing, the bisazo compounds gave dyed products of which hues were as shown in column 7 of the table. When the above-mentioned synthesis was repeated while changing the order of primary, secondary and tertiary condensation reactions with cyanuric chloride, the results obtained were similar to those obtained above. When the cyanuric chloride was replaced with cyanuric fluoride, the results were similar to those obtained above.

TABLE 3

| 1 | 2 | 3 | 4 | 5 | 6 | 7 |
|---|---|---|---|---|---|---|
| 1 | [naphthalene with SO₃H, NH₂, SO₂C₂H₄OSO₃H] | [naphthalene with HO, NH₂, SO₃H, SO₃H] | [benzene with SO₃H, NH₂, H₂N] | H₂NC₂H₄CONH₂ | H₂NC₂H₄SO₂CH=CH₂ | Navy blue |
| 2 | " | " | [naphthalene with SO₃H, H₂N, SO₃H, CH₂NH₂] | H₂NC₂H₅ | H₂NC₂H₄SO₂CH=CH₂ | Navy blue |
| 3 | [benzene with SO₃H, NH₂, SO₂C₂H₄OSO₃H] | " | " | NH₃ | H₂NC₂H₄OC₂H₄—SO₂CH=CH₂ | Navy blue |
| 4 | " | [naphthalene with HO, NH₂, SO₃H, SO₃H] | [benzene with OCH₃, NH₂, SO₃H, H₂N] | [cyclohexylamine] | H₂NC₂H₄SO₂CH=CH₂ | Navy blue |
| 5 | " | [naphthalene with HO, NH₂, SO₃H, SO₃H] | [benzene with SO₃H, NH₂, H₂N] | [morpholine] | H₂NC₂H₆SO₂C₂H₄Cl | Navy blue |
| 6 | [naphthalene with SO₃H, NH₂, SO₂C₂H₄OSO₃H] | [naphthalene with HO, NH₂, SO₃H, SO₃H] | [benzene with SO₃H, NH₂, HN] | NH₂CH₃ | H₂NC₂H₄OC₂H₄—SO₂CH=CH₂ | Navy blue |

TABLE 3-continued
| 1 | 2 | 3 | 4 | 5 | 6 | 7 |
|---|---|---|---|---|---|---|
| 7 | " | " | " | 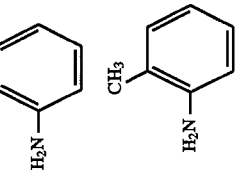 | H₂NC₂H₄OC₂H₄—SO₂CH=CH₂ | Navy blue |
| 8 | " | " | " | 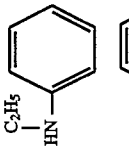 | H₂NC₂H₄OC₂H₄—SO₂CH=CH₂ | Navy blue |
| 9 | " | " | " | 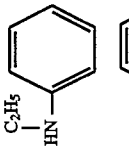 | H₂NC₂H₄OC₂H₄—SO₂CH=CH₂ | Navy blue |
| 10 | " | " | " | 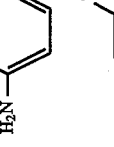 | H₂NC₃H₆SO₂C₂H₄Cl | Navy blue |
| 11 | 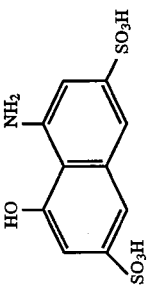 | 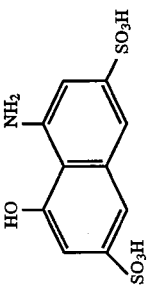 | 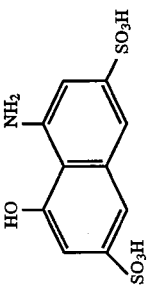 |  | H₂NC₃H₆SO₂C₂H₄Cl | Navy blue |
| 12 | " | " | " |  | " | Navy blue |
| 13 |  | | | | H₂NC₂H₄SO₂CH=CH₂ | Navy blue |

TABLE 3-continued

| 1 | 2 | 3 | 4 | 5 | 6 | 7 |
|---|---|---|---|---|---|---|
| 14 | " | " | " | o-toluidine (H₃N-C₆H₄-CH₃) | " | Navy blue |
| 15 | " | " | " | morpholine (HN(CH₂CH₂)₂O) | " | Navy blue |
| 16 | " | " | " | aniline (H₂N-C₆H₅) | H₂NC₂H₄SO₂C₂H₄Cl | Navy blue |
| 17 | " | " | 2,4-diaminobenzenesulfonic acid derivative | p-phenetidine (H₂N-C₆H₄-OC₂H₅) | H₂NC₂H₄OC₂H₄—SO₂CH=CH₂ | Navy blue |
| 18 | " | " | " | NH₃ | H₂NC₂H₄OC₂H₄—SO₂CH=CH₂ | Navy blue |
| 19 | " | " | " | H₂NC₄H₉ | " | Navy blue |
| 20 | " | " | " | anthranilic acid (H₂N-C₆H₄-CO₂H) | H₂NC₃H₆SO₂CH=CH₂ | Navy blue |

Column 2 (row 16): 2-amino-substituted benzene with SO₃H and SO₂C₂H₄OSO₃H groups Column 3 (row 16): 1-amino-8-hydroxynaphthalene-3,6-disulfonic acid (H-acid)

Example 7

The same procedure as in Example 1 was repeated, except that the coupling reactions of 1-amino-8-hydroxynaphthalene-3, 6-disulfonic acid with the two diazo compounds were carried out in a reverse order, to obtain a bisazo compound represented by the following formula in the free acid form:

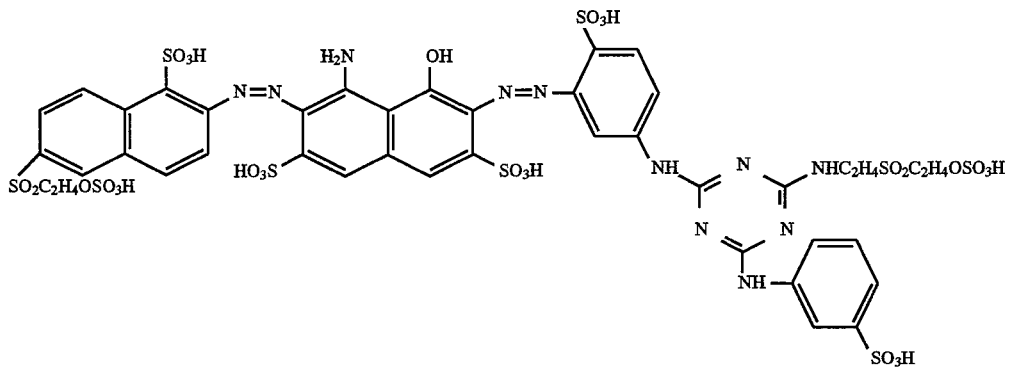

($\lambda_{max}$ = 615 nm, in aqueous medium).

Example 8

The same procedure as in Example 7 was repeated, using the same compounds of columns 2–6 as used in Example 2, to obtain the corresponding bisazo compounds. When used for dyeing, the compounds gave navy blue-colored dyed products. Similar results were obtained when the above-mentioned synthesis was repeated while changing the order of primary and secondary condensation reactions with cyanuric chloride. Further, similar results were obtained also when cyanuric chloride was replaced with cyanuric fluoride. Further, similar results were obtained also when the compound of column 6 was replaced with the corresponding sulfuric ester derivative and the final step, namely conversion to a sulfuric ester, was omitted.

Example 9

The same procedure as in Example 7 was repeated, except that 2-aminonaphthalene-6-β-sulfatoethylsulfone-1-sulfonic acid, 1-amino-8-hydroxynaphthalene-3,6-disulfonic acid, 2,4-diaminobenzenesulfonic acid, 3-aminobenzenesulfonic acid and 2-(β-hydroxyethylsulfonyl)ethylamine used in Example 7 were replaced with the compounds of columns 2, 3, 4, 5 and 6 of the following table, respectively, to obtain the corresponding bisazo compounds. When used for dyeing, the bisazo compounds gave dyed products of which hues were as shown in column 7 of the table. When the above-mentioned synthesis was repeated while changing the order of primary and secondary condensation reactions with cyanuric chloride, the results obtained were similar to those obtained above. When the cyanuric chloride was replaced with cyanuric fluoride, the results were similar to those obtained above. Further, similar results were obtained also when the compound of column 6 (and the compound of column 2 in case of having —SO$_2$C$_2$H$_4$OH) was replaced with the corresponding sulfuric ester derivative and the final step, namely conversion to a sulfuric ester, was omitted.

TABLE 4

| 1 | 2 | 3 | 4 | 5 | 6 | 7 |
|---|---|---|---|---|---|---|
| 1 | 4-aminophenyl with SO$_2$C$_2$H$_4$OSO$_3$H | 8-amino-1-hydroxynaphthalene-3,6-disulfonic acid | 2,4-diaminobenzenesulfonic acid (SO$_3$H, H$_2$N, NH$_2$) | N-ethylaniline (C$_6$H$_5$-NH-C$_2$H$_5$) | H$_2$NC$_2$H$_4$OC$_2$H$_4$SO$_2$C$_2$H$_4$OH | Navy blue |
| 2 | " | " | " | 4-aminophenol | H$_2$NC$_2$H$_4$SO$_2$C$_2$H$_4$OH | Navy blue |
| 3 | 2-methoxy-4-amino-5-methyl-phenyl-SO$_2$C$_2$H$_4$OH | " | " | 4-chloro-N-ethylaniline | H$_2$NC$_3$H$_6$SO$_2$C$_2$H$_4$OH | Navy blue |
| 4 | " | " | " | 3-aminobenzenesulfonic acid | H$_2$NC$_2$H$_4$SO$_2$C$_2$H$_4$OH | Navy blue |
| 5 | 3-aminophenyl-SO$_2$C$_2$H$_4$OH | 8-amino-1-hydroxynaphthalene-3,6-disulfonic acid | " | " | H$_2$NC$_3$H$_6$SO$_2$C$_2$H$_4$OH | Navy blue |

TABLE 4-continued

| 1 | 2 | 3 | 4 | 5 | 6 | 7 |
|---|---|---|---|---|---|---|
| 6 | 4-OCH₃, 3-NH₂, 1-SO₂C₂H₄OH phenyl | 1-NH₂, 5-OH, 3,7-di-SO₃H naphthyl | 1-SO₃H, 2-NH₂, 4-NH₂ phenyl | 3-CH₃, 1-NH, 1-SO₃H phenyl | H₂NC₄H₈SO₂C₂H₄OH | Navy blue |
| 7 | 2-NH₂, 6-SO₂C₂H₄OH naphthyl | 1-NH₂, 5-OH, 3,7-di-SO₃H naphthyl | " | 1-NH₂, 4-SO₃H phenyl | H₂NC₂H₄OC₂H₄SO₂—C₂H₄OH | Navy blue |
| 8 | 1-NH₂, 3-SO₂CH=CH₂ phenyl | " | 1-SO₃H, 2-NH₂, 4-OCH₃, 5-NH₂ phenyl | 1-CO₂H, 2-NH₂ phenyl | H₂NC₃H₆SO₂C₂H₄OH | Navy blue |
| 9 | 1-NH₂, 4-SO₂C₂H₄OSO₃H phenyl | 1-NH₂, 5-OH, 3,7-di-SO₃H naphthyl | 1-SO₃H, 2-NH₂, 4-NH₂ phenyl | aniline | H₂NC₂H₄SO₂C₂H₄OH | Navy blue |
| 10 | " | " | " | 4-OCH₃ aniline | " | Navy blue |

TABLE 4-continued

| 1 | 2 | 3 | 4 | 5 | 6 | 7 |
|---|---|---|---|---|---|---|
| 11 | " | " | " | 2-aminobenzoic acid (H₂N, CO₂H) | " | Navy blue |
| 12 | " | " | " | 2-methylaniline (H₃N, CH₃) | " | Navy blue |
| 13 | " | " | " | 3-methoxyaniline (H₂N, OCH₃) | " | Navy blue |
| 14 | " | " | " | 3-aminophenyl SO₂C₂H₄OSO₃H (H₂N, SO₂C₂H₄OSO₃H) | H₂NC₂H₄SO₂C₂H₄OH | Navy blue |
| 15 | 4-aminophenyl-SO₂C₂H₄OSO₃H (NH₂, SO₂C₂H₄OSO₃H) | 8-amino-1-naphthol-3,6-disulfonic-like (NH₂, OH, SO₃H, HO₃S) | 2,4-diaminobenzenesulfonic acid (SO₃H, H₂N, NH₂) | 3-methylaniline (H₂N, CH₃) | H₂NC₂H₄SO₂C₂H₄OH | Navy blue |
| 16 | " | " | " | 3-aminobenzenesulfonic acid (H₂N, SO₃H) | " | Navy blue |

TABLE 4-continued

| 1 | 2 | 3 | 4 | 5 | 6 | 7 |
|---|---|---|---|---|---|---|
| 17 | " | " | " | 4-chloroaniline | " | Navy blue |
| 18 | " | " | " | aniline | $H_2NC_3H_6SO_2C_2H_4OH$ | Navy blue |
| 19 | " | " | " | 4-methoxyaniline | " | Navy blue |
| 20 | " | " | " | N-ethylaniline | $H_2NC_2H_4SO_2C_2H_4OH$ | Navy blue |
| 21 | " | " | " | 3-aminophenol | " | Navy blue |
| 22 | 4-amino-2-($SO_2C_2H_4OSO_3H$)aniline | 1-amino-8-hydroxy-naphthalene-3,6-disulfonic acid | 2,4-diaminobenzenesulfonic acid | aniline | $H_2NC_2H_4OC_2H_4\text{—}SO_2C_2H_4OH$ | Navy blue |
| 23 | " | " | " | N-methylaniline | $H_2NC_2H_4SO_2C_2H_4OH$ | Navy blue |

TABLE 4-continued

| 1 | 2 | 3 | 4 | 5 | 6 | 7 |
|---|---|---|---|---|---|---|
| 24 | " | " | " | C₆H₅-NH-C₂H₅ | H₂NC₃H₆SO₂C₂H₄OH | Navy blue |
| 25 | " | " | " | 2-OCH₃, 1-NH₂ phenyl | H₂NC₂H₄SO₂C₂H₄OH | Navy blue |
| 26 | " | " | " | 4-OC₂H₅, 1-NH₂ phenyl | " | Navy blue |
| 27 | " | " | " | 4-NHCOCH₃, 1-NH₂ phenyl | " | Navy blue |
| 28 | 4-NH₂, 1-SO₂C₂H₄OSO₃H phenyl | 1-NH₂, 4,8-diOH-naphthalene-2,6-disulfonic acid (4-NH₂, 5-OH, 2,6-(SO₃H)₂ naphthyl) | 1-SO₃H, 2-NH₂, 4-NH₂ phenyl | 4-CH₃, 1-NH₂ phenyl | H₂NC₂H₄SO₂C₂H₄OH | Navy blue |
| 29 | " | " | " | 2-CH₃, 1-NH₂ phenyl | H₂NC₃H₆SO₂C₂H₄OH | Navy blue |

TABLE 4-continued
| 1 | 2 | 3 | 4 | 5 | 6 | 7 |
|---|---|---|---|---|---|---|
| 30 | " | " | " | 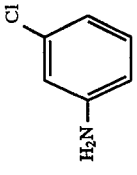 | H₂NC₂H₄SO₂C₂H₄OH | Navy blue |
| 31 | " | " | " | 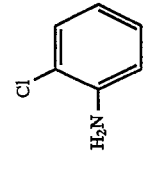 | H₂NC₂H₄OC₂H₄—SO₂C₂H₄OH | Navy blue |
| 32 | " | " | " | 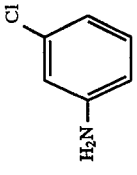 | H₂NC₂H₄SO₂C₂H₄OH | Navy blue |
| 33 | " | " | " | 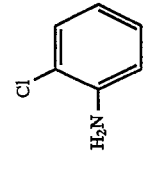 | " | Navy blue |
| 34 | 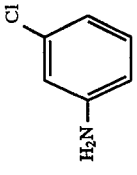 | " | 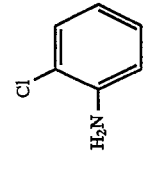 | 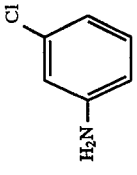 | H₂NC₃H₆SO₂C₂H₄OH | Navy blue |
| 35 | " | " | " | 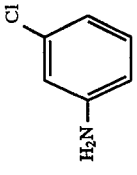 | " | Navy blue |

TABLE 4-continued

| 1 | 2 | 3 | 4 | 5 | 6 | 7 |
|---|---|---|---|---|---|---|
| 36 | " | " | | 2-aminophenol (OH, NH$_2$) | H$_2$NC$_2$H$_4$SO$_2$C$_2$H$_4$OH | Navy blue |
| 37 | " | " | | 2,4-dimethylaniline | " | Navy blue |
| 38 | " | " | | 4-aminobenzoic acid | " | Navy blue |
| 39 | " | " | | 4-aminobenzenesulfonic acid | " | Navy blue |
| 40 | 4-amino-phenyl-SO$_2$C$_2$H$_4$OSO$_3$H | 8-amino-1-hydroxy-naphthalene-3,6-disulfonic acid | 2,4-diaminobenzenesulfonic acid | 3-aminobenzenesulfonic acid | H$_2$NC$_3$H$_6$SO$_2$C$_2$H$_4$OH | Navy blue |
| 41 | " | " | | 3-(ethylamino)phenyl-SO$_2$C$_2$H$_4$—OSO$_3$H | " | Navy blue |

TABLE 4-continued

| 1 | 2 | 3 | 4 | 5 | 6 | 7 |
|---|---|---|---|---|---|---|
| 42 | " | " | ![SO3H, NHCH3, H2N benzene] | ![H2N-C6H4-SO2C2H4-OSO3H] | " | Navy blue |
| 43 | " | " | ![CH3, NH2, SO3H, H2N benzene] | | $H_2NC_2H_4SO_2C_2H_4OH$ | Navy blue |
| 44 | ![NH2, p-aminophenyl-SO2C2H4OSO3H] | ![amino-naphthol-disulfonic acid] | ![NH2, SO3H, H2N benzene] | ![H2N-C6H4-SO2C2H4-OSO3H] | $H_2NC_3H_6SO_2C_2H_4OH$ | Navy blue |
| 45 | ![NH2, naphthyl-SO2C2H4OSO3H] | ![amino-naphthol-disulfonic acid] | ![SO3H, NH2, H2N benzene] | " | " | Navy blue |
| 46 | ![OCH3, NH2, SO2C2H4OSO3H benzene] | " | ![OCH3, NH2, SO3H, H2N benzene] | " | $H_2NC_2H_4SO_2C_2H_4OH$ | Navy blue |

TABLE 4-continued

| 1 | 2 | 3 | 4 | 5 | 6 | 7 |
|---|---|---|---|---|---|---|
| 47 | OCH₃, NH₂, CH₃, SO₂C₂H₄OSO₃H (benzene) | " | H₂N, SO₃H, NH₂ (benzene) | " | H₂NC₂H₄OC₂H₄—SO₂C₂H₄OH | Navy blue |
| 48 | OCH₃, NH₂, CH₃, SO₂C₂H₄OSO₃H (benzene) | NH₂, HO, HO₃S, SO₃H (naphthalene) | H₂N, SO₃H, NH₂ (benzene) | OCH₃, H₂N, SO₂C₂H₄—OSO₃H (benzene) | H₂NC₂H₄SO₂C₂H₄OH | Navy blue |

EXAMPLE 10

The same procedure as in Example 3 was repeated, except that the coupling reactions of 1-amino-8-hydroxynaphthalene-3,6-disulfonic acid with the two diazo compounds were carried out in a reverse order, to obtain a bisazo compound represented by the following formula in the free acid form:

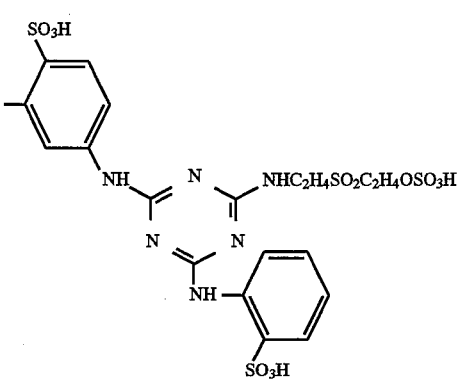

($\lambda$max = 614 nm, in aqueous medium).

EXAMPLE 11

The same procedure as in Example 10 was repeated, using the same compounds of columns 2–6 as used in Example 4, to obtain the corresponding bisazo compounds. When used for dyeing, the compounds gave navy blue-colored dyed products. Similar results were obtained when the above-mentioned synthesis was repeated while changing the order of primary and secondary condensation reactions with cyanuric chloride. Further, similar results were obtained also when the cyanuric chloride was replaced with cyanuric fluoride. Further, similar results were obtained also when the compound of column 6 (and/or the compound(s) of column 5 and column 2 in case of having —$SO_2C_2H_4OH$) was replaced with the corresponding sulfuric ester derivative and the final step, namely conversion to a sulfuric ester, was omitted.

EXAMPLE 12

The same procedure as in Example 10 was repeated, except that 2-aminonaphthalene-6-$\beta$-sulfatoethylsulfone-1-sulfonic acid, 1-amino-8-hydroxynaphthalene-3,6-disulfonic acid, 2,4-diaminobenzenesulfonic acid, 2-aminobenzenesulfonic acid and 2-($\beta$-hydroxyethylsulfonyl)ethylamine used in Example 10 were replaced with the compounds of columns 2, 3, 4, 5 and 6 of the following table, respectively, to obtain the corresponding bisazo compounds. When used for dyeing, the bisazo compounds gave dyed products of which hues were as shown in column 7 of the table. When the above-mentioned synthesis was repeated while changing the order of primary and secondary condensation reactions with cyanuric chloride, the results obtained were similar to those obtained above. When the cyanuric chloride was replaced with cyanuric fluoride, the results were similar to those obtained above. Further, similar results were obtained also when the compound of column 6 (and/or the compound(s) of column 5 and column 2 in case of having —$SO_2C_2H_4OH$) was replaced with the corresponding sulfuric ester derivative and the final step, namely conversion to a sulfuric ester, was omitted.

TABLE 5

| 1 | 2 | 3 | 4 | 5 | 6 | 7 |
|---|---|---|---|---|---|---|
| 1 | 4-(NH₂)-C₆H₄-SO₂C₂H₄OSO₃H | 1-OH-8-NH₂-naphthalene-3,6-disulfonic acid | 2,4-diaminobenzenesulfonic acid (SO₃H, NH₂, H₂N) | H₂NC₂H₄OH | H₂NC₂H₄SO₂C₂H₄OH | Navy blue |
| 2 | 3-OCH₃-5-CH₃-4-NH₂-C₆H₂-SO₂C₂H₄OH | " | " | H₂NC₂H₄CO₂H | H₂NC₂H₄OC₂H₄SO₂—C₂H₄OH | Navy blue |
| 3 | 2-OCH₃-3-NH₂-4-SO₂C₂H₄OH-C₆H₃ | " | " | morpholine (O-containing ring with NH) | H₂NC₂H₄SO₂C₂H₄OH | Navy blue |
| 4 | 4-(NH₂)-C₆H₄-SO₂C₂H₄OH | 1-OH-5-SO₃H-8-NH₂-naphthalene (NH₂, SO₃H, HO) | " | NH₃ | C₂H₅—N(H₂NC₂H₄—)—SO₂C₂H₄OH | Navy blue |
| 5 | " | 1-OH-8-NH₂-naphthalene-3,6-disulfonic acid | 5-CH₃-4-NH₂-2-(SO₃H)-aniline (CH₃, NH₂, SO₃H, H₂N) | H₂NCH₃ | H₂NC₃H₆SO₂C₂H₄OH | Navy blue |

TABLE 5-continued

| 1 | 2 | 3 | 4 | 5 | 6 | 7 |
|---|---|---|---|---|---|---|
| 6 | 4-aminophenyl-SO$_2$C$_2$H$_4$OH | 8-amino-1-hydroxy-naphthalene-3,6-disulfonic acid derivative | 2,4-diaminobenzenesulfonic acid | 2-aminobenzenesulfonic acid | H$_2$NC$_2$H$_4$SO$_2$C$_2$H$_4$OH | Navy blue |
| 7 | 2-methoxy-4-amino-6-methylphenyl-SO$_2$C$_2$H$_4$OH | 4-amino-5-hydroxy-naphthalene-1,7-disulfonic acid derivative | 4-amino-5-methylbenzene-sulfonic acid | NH$_3$ | " | Navy blue |
| 8 | 6-amino-2-naphthyl-SO$_2$C$_2$H$_4$OH | 4-amino-5-hydroxy-naphthalene-2,7-disulfonic acid derivative | 2,4-diaminobenzenesulfonic acid | H$_2$NCH$_3$ | " | Navy blue |
| 9 | 3-aminophenyl-SO$_2$C$_2$H$_4$OSO$_3$H | " | 2,4-diaminobenzenesulfonic acid | H$_2$NC$_2$H$_4$OH | H$_2$NC$_3$H$_6$SO$_2$C$_2$H$_4$OH | Navy blue |
| 10 | 4-aminophenyl-SO$_2$C$_2$H$_4$OSO$_3$H | " | 2,4-diaminobenzenesulfonic acid | H$_2$NC$_2$H$_5$ | H$_2$NC$_2$H$_4$SO$_2$C$_2$H$_4$Cl | Navy blue |
| 11 | " | " | " | morpholine | " | Navy blue |

TABLE 5-continued

| 1 | 2 | 3 | 4 | 5 | 6 | 7 |
|---|---|---|---|---|---|---|
| 12 | " | " | " | HN(CH$_3$)$_2$ | " | Navy blue |
| 13 | " | " | " | H$_2$NC$_2$H$_4$CO$_2$H | " | Navy blue |
| 14 | " | " | " | H$_2$NC$_2$H$_4$SO$_3$H | " | Navy blue |
| 15 | " | " | " | 2-amino-1-methoxy-4-methylbenzene (H$_2$N, OCH$_3$, CH$_3$) | " | Navy blue |
| 16 | 4-amino-phenyl-β-sulfatoethylsulfone (H$_2$N—C$_6$H$_4$—SO$_2$C$_2$H$_4$OSO$_3$H) | 1-amino-8-hydroxynaphthalene-3,6-disulfonic acid (H-acid) | 2,4-diaminobenzene-sulfonic acid (H$_2$N, SO$_3$H, NH$_2$) | 2-amino-1,4-dimethoxybenzene (H$_2$N, OCH$_3$, OCH$_3$) | H$_2$NC$_2$H$_4$SO$_2$C$_2$H$_4$Cl | Navy blue |
| 17 | " | " | " | 2-amino-1,4-benzenedisulfonic acid (H$_2$N, SO$_3$H, SO$_3$H) | " | Navy blue |
| 18 | " | " | " | 2-aminobenzoic acid (H$_2$N, CO$_3$H) | H$_2$NC$_2$H$_4$OC$_2$H$_4$—SO$_2$C$_2$H$_4$OH | Navy blue |
| 19 | " | " | " | 2-aminobenzenesulfonic acid (H$_2$N, SO$_3$H) | H$_2$NC$_2$H$_4$OC$_2$H$_4$—SO$_2$C$_2$H$_4$OH | Navy blue |

TABLE 5-continued

| 1 | 2 | 3 | 4 | 5 | 6 | 7 |
|---|---|---|---|---|---|---|
| 20 | " | " | " | Cl-C6H4-NH2 (2-chloroaniline) | H2NC3H6SO2C2H4OH | Navy blue |
| 21 | 4-(2-sulfatoethylsulfonyl)aniline | 1-amino-8-hydroxynaphthalene-3,6-disulfonic acid | 2,4-diaminobenzenesulfonic acid | HO-C6H4-NH2 (2-aminophenol) | H2NC3H6SO2C2H4OH | Navy blue |
| 22 | " | " | " | 4-ethoxyaniline | H2NC2H4OC2H4—SO2C2H4OH | Navy blue |
| 23 | " | " | " | sulfanilic acid | H2NC2H4OC2H4—SO2C2H4OH | Navy blue |
| 24 | " | " | " | 2-aminobenzene-1,4-disulfonic acid | H2NC2H4OC2H4—SO2C2H4OH | Navy blue |
| 25 | " | " | " | " | H2NC2H4SO2C2H4OH | Navy blue |
| 26 | " | " | " | 2-aminobenzene-1,4-disulfonic acid | H2NC2H4OC2H4—SO2C2H4OH | Navy blue |
| 27 | 4-(2-sulfatoethylsulfonyl)aniline | 1-amino-8-hydroxynaphthalene-3,6-disulfonic acid | 2,4-diaminobenzenesulfonic acid | | | |

TABLE 5-continued

| 1 | 2 | 3 | 4 | 5 | 6 | 7 |
|---|---|---|---|---|---|---|
| 28 | " | " | " | 4-Cl-C₆H₄-N(C₂H₅)H | H₂NC₂H₄SO₂C₂H₄OH | Navy blue |
| 29 | " | " | " | 2-OCH₃-C₆H₄-NH₂ | H₂NC₂H₄OC₂H₄—SO₂C₂H₄OH | Navy blue |
| 30 | " | " | " | H₂NC₂H₄Cl | H₂NC₂H₄SO₂C₂H₄OH | Navy blue |
| 31 | " | " | " | NH₃ | " | Navy blue |
| 32 | " | " | " | cyclohexyl-NH₂ | " | Navy blue |
| 33 | " | " | " | H₂NCH₃ | " | Navy blue |
| 34 | " | 1-amino-8-hydroxynaphthalene-3,6-disulfonic acid | 2,4-diamino-benzenesulfonic acid | imidazole | H₂NC₂H₄SO₂C₂H₄OH | Navy blue |
| 35 | " | " | " | piperidine | " | Navy blue |
| 36 | " | " | " | pyrrolidine | " | Navy blue |

TABLE 5-continued

| 1 | 2 | 3 | 4 | 5 | 6 | 7 |
|---|---|---|---|---|---|---|
| 37 | " | " | " | indoline (NH) | " | Navy blue |
| 38 | " | " | " | H₂NC₂H₄OCH₃ | | Navy blue |
| 39 | " | " | " | 4-amino-3-methylbenzenesulfonic acid (CH₃, H₂N, SO₃H) | | Navy blue |
| 40 | 4-amino-phenyl SO₂C₂H₄OSO₃H (NH₂) | " | 2,4-diamino-benzenesulfonic acid (SO₃H, NH₂, H₂N) | 4-amino-benzene (NH₂)—SO₂C₂H₄OH | H₂NC₂H₄OC₂H₄—SO₂C₂H₄OH | Navy blue |
| 41 | " | 8-amino-1-hydroxynaphthalene-3,6-disulfonic acid (NH₂, SO₃H, HO, HO₃S) | " | 4-(ethylamino)benzene (NHC₂H₅)—SO₂C₂H₄OH | H₂NC₂H₄SO₂C₂H₄OH | Navy blue |
| 42 | " | " | 2-amino-4-(methylamino)benzenesulfonic acid (SO₃H, H₂N, NHCH₃) | 4-amino-benzene (NH₂)—SO₂C₂H₄OH | H₂NC₂H₄OC₂H₄—SO₂C₂H₄OH | Navy blue |

TABLE 5-continued

| 1 | 2 | 3 | 4 | 5 | 6 | 7 |
|---|---|---|---|---|---|---|
| 43 | 3-aminobenzene-SO₂C₂H₄OSO₃H | 1-amino-5-hydroxy-naphthalene-3,7(?)-disulfonic acid (NH₂, SO₃H, OH, HO₃S on naphthalene) | 4-amino-2-methyl-5-aminobenzenesulfonic acid (SO₃H, CH₃, NH₂, H₂N) | " | H₂NC₂H₄SO₂C₂H₄OH | Navy blue |
| 44 | 6-amino-naphthalene-2-SO₂C₂H₄OSO₃H | 8-amino-1-hydroxy-naphthalene-3,6-disulfonic acid | 2,4-diaminobenzene-SO₃H | 4-aminobenzene-SO₂C₂H₄OH (NH₂, SO₂C₂H₄OH) | H₂NC₃H₆SO₂C₂H₄OH | Navy blue |
| 45 | 2-methoxy-5-amino-benzene-SO₂C₂H₄OSO₃H | " | 4-amino-2-aminobenzene-SO₃H | " | " | Navy blue |
| 46 | 2-methoxy-5-amino-benzene-SO₂C₂H₄OSO₃H | " | 2-methoxy-4-amino-5-aminobenzene-SO₃H | " | H₂NC₂H₄SO₂C₂H₄OH | Navy blue |
| 47 | 2-methoxy-4-methyl-5-amino-benzene-SO₂C₂H₄OSO₃H | " | 4-amino-2-aminobenzene-SO₃H | " | H₂NC₂H₄OC₂H₂— SO₂C₂H₄OH | Navy blue |

TABLE 5-continued

| 1 | 2 | 3 | 4 | 5 | 6 | 7 |
|---|---|---|---|---|---|---|
| 48 | 3-amino-4-methyl-6-methoxy-phenyl with CH₃ and SO₂C₂H₄OSO₃H substituents | 8-amino-1-hydroxy-naphthalene-3,6-disulfonic acid (SO₃H, HO₃S, OH, NH₂) | 2,4-diaminobenzenesulfonic acid (SO₃H, H₂N, NH₂) | 2,4-dimethyl-5-amino-phenyl-SO₂C₂H₄OH (CH₃, CH₃, H₂N, SO₂C₂H₄OH) | H₂NC₂H₄SO₂C₂H₄OH | Navy blue |
| 49 | 4-amino-phenyl-SO₂C₂H₄OSO₃H (NH₂, SO₂C₂H₄OSO₃H) | " | " | 2-chloro-4-amino-phenyl-SO₂C₂H₄OH (Cl, NH₂, SO₂C₂H₄OH) | H₂NC₃H₆SO₂C₂H₄OH | Navy blue |
| 50 | " | " | " | 4-amino-phenyl-SO₂C₂H₄OH (NH₂, SO₂C₂H₄OH) | CH₃—HNC₂H₄OC₂H₄—SO₂C₂H₄OH | Navy blue |
| 51 | 4-amino-phenyl-SO₂C₂H₄OH (NH₂, SO₂C₂H₄OH) | " | " | 4-amino-phenyl-SO₂CH=CH₂ (NH₂, SO₂CH=CH₂) | H₂NC₂H₄SO₂C₂H₄OH | Navy blue |
| 52 | 4-amino-phenyl-SO₂C₂H₄OH (NH₂, SO₂C₂H₄OH) | 8-amino-1-hydroxy-naphthalene-3,6-disulfonic acid (SO₃H, HO₃S, OH, NH₂) | 2,4-diaminobenzenesulfonic acid (SO₃H, H₂N, NH₂) | 4-(N-butylamino)-phenyl-SO₂C₂H₄OH (NHC₄H₉, SO₂C₂H₄OH) | H₂NC₂H₄SO₂C₂H₄OH | Navy blue |

TABLE 5-continued
| 1 | 2 | 3 | 4 | 5 | 6 | 7 |
|---|---|---|---|---|---|---|
| 53 | 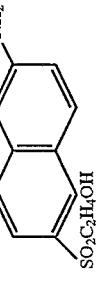 | " | " | 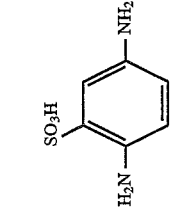 | H₂NC₃H₆SO₂C₂H₄OH | Navy blue |
| 54 | 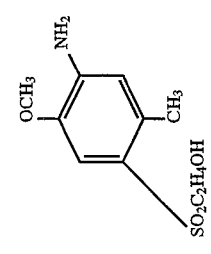 | " | 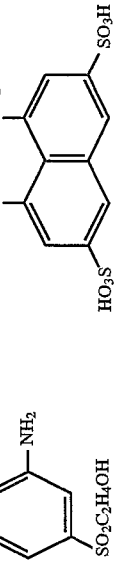 | " | H₂NC₂H₄SO₂C₂H₄OH | Navy blue |
| 55 | 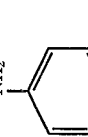 | " | 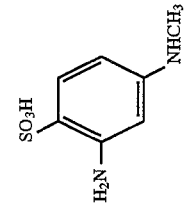 | " | H₂NC₂H₄OC₂H₄—SO₂CH=CH₂ | Navy blue |
| 56 | 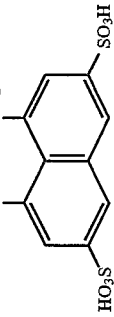 |  | 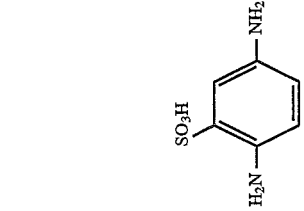 | 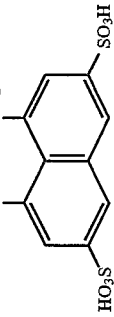 | H₂NC₂H₄SO₂C₂H₄OH | Navy blue |

EXAMPLE 13

The same procedure as in Example 5 was repeated, except that the coupling reactions of 1-amino-8-hydroxynaphthalene-3,6-disulfonic acid with the two diazo compounds were carried out in a reverse order, to obtain a bisazo compound represented by the following formula in the free acid form:

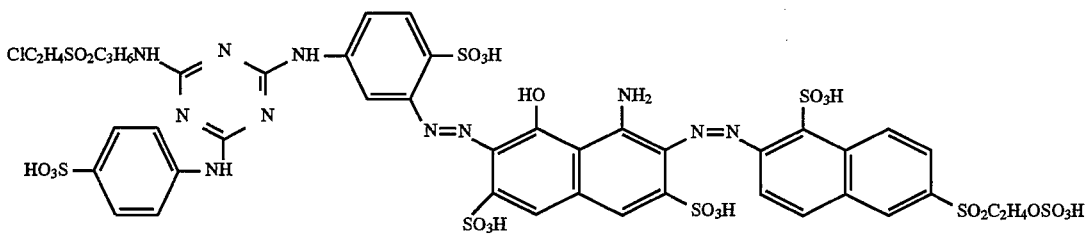

($\lambda$max = 618 nm, in aqueous medium).

EXAMPLE 14

The same procedure as in Example 13 was repeated, using the same compounds of columns 2–6 as used in Example 6, to obtain the corresponding bisazo compounds. When used for dyeing, the compounds gave navy blue-colored dyed products. Similar results were obtained when the above-mentioned synthesis was repeated while changing the order of primary, secondary and tertiary condensation reactions with cyanuric chloride. Further, similar results were obtained also when cyanuric chloride was replaced with cyanuric fluoride.

EXAMPLE 15

The same procedure as in Example 13 was repeated, except that the 2-aminonaphthalene-6-β-sulfatoethylsulfone-1-sulfonic acid, 1-amino-8-hydroxynaphthalene-3,6-disulfonic acid, 2,4-diaminobenzenesulfonic acid, 4-aminobenzenesulfonic acid and 3-(β-chloroethylsulfonyl)propylamine used in Example 13 were replaced with the compounds of columns 2, 3, 4, 5 and 6 of the following table, respectively, to obtain the corresponding bisazo compounds. When used for dyeing, the bisazo compounds gave dyed products of which hues were as shown in column 7 of the table. When the above-mentioned synthesis was repeated while changing the order of primary, secondary and tertiary condensation reactions with cyanuric chloride, the results obtained were similar to those obtained above. When the cyanuric chloride was replaced with cyanuric fluoride, the results were similar to those obtained above.

TABLE 6

| 1 | 2 | 3 | 4 | 5 | 6 | 7 |
|---|---|---|---|---|---|---|
| 1 | 4-aminophenyl-SO$_2$C$_2$H$_4$OSO$_3$H | 1-amino-8-hydroxynaphthalene-3,6-disulfonic acid | 2,4-diaminobenzenesulfonic acid (SO$_3$H, H$_2$N, NH$_2$) | H$_2$NC$_2$H$_4$SO$_2$NH$_2$ | H$_2$NC$_3$H$_6$SO$_2$C$_2$H$_4$Cl | Navy blue |
| 2 | 4-aminophenyl-SO$_2$CH=CH$_2$ | " | " | CH$_3$—HNC$_2$H$_5$ | H$_2$NC$_2$H$_4$SO$_2$CH=CH$_2$ | Navy blue |
| 3 | 2-methoxy-4-amino-5-methylphenyl-SO$_2$C$_2$H$_4$OSO$_3$H | " | " | NH$_3$ | H$_2$NC$_2$H$_4$OC$_2$H$_4$SO$_2$CH=CH$_2$ | Navy blue |
| 4 | 4-aminophenyl-SO$_2$C$_2$H$_4$OSO$_3$H | 1-amino-5-hydroxynaphthalene-8-sulfonic acid (NH$_2$, HO, SO$_3$H) | 2,4-diamino-5-methylbenzenesulfonic acid | 3-aminobenzenesulfonic acid | H$_2$NC$_2$H$_4$SO$_2$C$_2$H$_4$Cl | Navy blue |
| 5 | 4-aminophenyl-SO$_2$C$_2$H$_4$OSO$_3$H | 1-amino-8-hydroxynaphthalene-3,6-disulfonic acid | 2,4-diamino-phenol-sulfonic acid (SO$_3$H, H$_2$N, NH$_2$) | 4-methoxyaniline | H$_2$NC$_2$H$_4$OC$_2$H$_4$—SO$_2$CH=CH$_2$ | Navy blue |

TABLE 6-continued
| 1 | 2 | 3 | 4 | 5 | 6 | 7 |
|---|---|---|---|---|---|---|
| 6 | " | " | " | 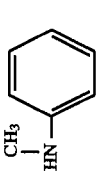 | " | Navy blue |
| 7 | " | " | " | 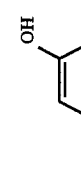 | " | Navy blue |
| 8 | " | " | " | 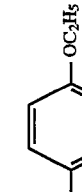 | " | Navy blue |
| 9 | " | " | " | 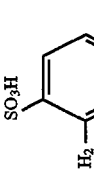 | $H_2NC_3H_6SO_2C_2H_4Cl$ | Navy blue |
| 10 | " | " | " | 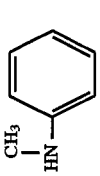 | " | Navy blue |
| 11 |  |  |  |  | $H_2NC_3H_6SO_2C_2H_4Cl$ | Navy blue |

TABLE 6-continued
| 1 | 2 | 3 | 4 | 5 | 6 | 7 |
|---|---|---|---|---|---|---|
| 12 | " | " | " | 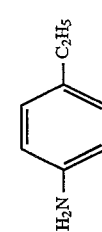 | $H_2NC_2H_4SO_2CH=CH_2$ | Navy blue |
| 13 | " | " | " | 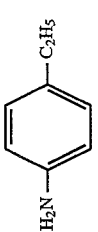 | " | Navy blue |
| 14 | " | " | " | 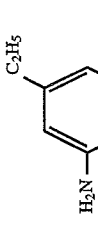 | " | Navy blue |

EXAMPLE 16

In a usual manner, cyanuric chloride (3.69 parts) and 2,4-diaminobenzenesulfonic acid (3.76 parts) were subjected to a condensation reaction with each other at pH 2–4 at a temperature of 0°–10° C., and then with ethylamine (0.91 part) at pH 6–10 at a temperature of 20°–40° C. with stirring. After diazotizing the condensate, the diazotized product was coupled with 1-amino-8-hydroxynaphthalene-3,6-disulfonic acid (6.39 parts) at pH 1–3.5 at a temperature of 0°–15° C., and further a diazotized product of 2-aminonaphthalene-6-β-sulfatoethylsulfone-1-sulfonic acid (8.23 parts) was coupled therewith at pH 4–8 at a temperature of 0°–20° C. Finally, the thus obtained coupled product was condensed with 1-aminobenzene-3-β-sulfatoethylsulfone (5.63 parts) at pH 2–5 at a temperature of 50°–80° C., and the thus condensed product was salted out to obtain a bisazo compound represented by the following formula in the free acid form:

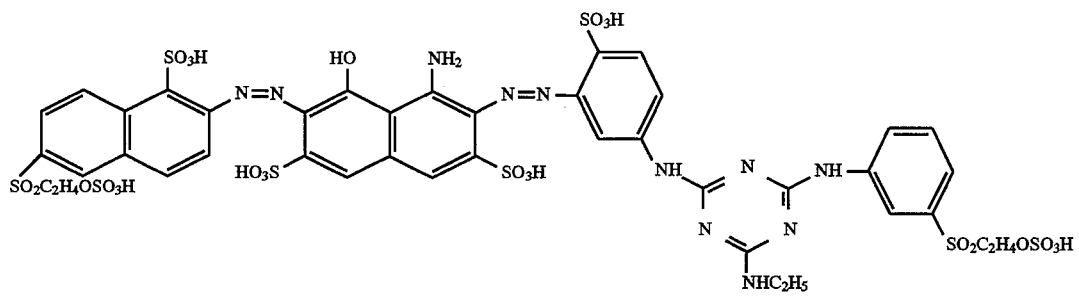

($\lambda$max = 608 nm, in aqueous medium).

EXAMPLE 17

The synthesis of Example 16 was repeated, except that 2-aminonaphthalene-6-β-sulfatoethylsulfone-1-sulfonic acid, 1-amino-8-hydroxynaphthalene-3,6-disulfonic acid, 2,4-diaminobenzenesulfonic acid, ethylamine and 1-aminobenzene-3-β-sulfatoethylsulfone were replaced with the compounds shown in column 2, column 3, column 4, column 5 and column 6 of the following table, respectively, to obtain the corresponding bisazo compounds. When used for dyeing, the bisazo compounds gave dyed products of which hues were as shown in column 7 of the table. When the above-mentioned synthesis was repeated while changing the order of primary and secondary condensation reactions with cyanuric chloride, the results obtained were similar to those obtained above. Further, similar results were obtained when the cyanuric chloride was replaced with cyanuric fluoride.

TABLE 7

| 1 | 2 | 3 | 4 | 5 | 6 | 7 |
|---|---|---|---|---|---|---|
| 1 | 2-amino-1-naphthol-SO3H / SO2C2H4OSO3H naphthalene | 1,8-dihydroxy / 4-amino-2,7-naphthalenedisulfonic acid type | 1,2-diamino-4-SO3H benzene | NH3 | 3-amino-phenyl-SO2C2H4OSO3H | Navy blue |
| 2 | " | " | " | CH3NH2 | " | Navy blue |
| 3 | " | " | " | morpholine (HN with O) | " | Navy blue |
| 4 | 2-amino-4-SO3H-phenyl-SO2C2H4OSO3H | " | " | HN(CH3)2 | " | Navy blue |
| 5 | 2-amino-1-naphthol-SO3H / SO2C2H4OSO3H | " | " | H2NC2H5 | " | Navy blue |
| 6 | 2-amino-4-SO3H-phenyl-SO2C2H4OSO3H | 1,5-dihydroxy / 4-amino-2,8-naphthalenedisulfonic acid type | 1,2-diamino-4-SO3H benzene | NH3 | 3-(N-ethylamino)phenyl-SO2C2H4OSO3H | Navy blue |

TABLE 7-continued

| 1 | 2 | 3 | 4 | 5 | 6 | 7 |
|---|---|---|---|---|---|---|
| 7 | (structure) | (structure) | (structure) | (structure) | " | Navy blue |
| 8 | (structure) | (structure) | (structure) | H₂NC₂H₄SO₂—C₂H₄OSO₃H | (structure) | Navy blue |
| 9 | " | " | " | H₂NC₂H₄SO₂—C₂H₄OSO₃H | (structure) | Navy blue |
| 10 | " | " | " | H₂NC₂H₄SO₂—C₂H₄OSO₃H | (structure) | Navy blue |
| 11 | (structure) | (structure) | (structure) | H₂NC₂H₄SO₂—C₂H₄OSO₃H | (structure) | Navy blue |
| 12 | " | " | " | H₂NC₂H₄OC₂H₄SO₂—C₂H₄OSO₃H | " | Navy blue |

TABLE 7-continued
| 1 | 2 | 3 | 4 | 5 | 6 | 7 |
|---|---|---|---|---|---|---|
| 13 | 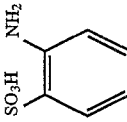 | " | " | H$_2$NC$_2$H$_4$SO$_2$—C$_2$H$_4$OSO$_3$H | " | Navy blue |
| 14 | " | " | " | H$_2$N—C$_2$H$_6$SO$_2$—C$_2$H$_4$Cl | " | Navy blue |
| 15 | " | " | " | H$_2$N—C$_2$H$_4$OC$_2$H$_4$—SO$_2$CH=CH$_2$ |  | Navy blue |
| 16 | 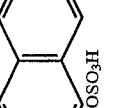 |  | 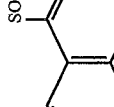 | H$_2$NC$_2$H$_4$SO$_2$—C$_2$H$_4$OSO$_3$H | 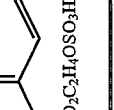 | Navy blue |
| 17 | 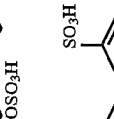 |  | | H$_2$NC$_2$H$_4$SO$_2$—C$_2$H$_4$OSO$_3$H | | Navy blue |

EXAMPLE 18

In a usual manner, cyanuric chloride (3.69 parts) and 1-aminobenzene-4-β-sulfatoethylsulfone (5.63 parts) were subjected to a condensation reaction with each other at pH 2–5 at a temperature of 5°–20° C. Then, an aqueous solution containing methylamine (0.63 part) was added and stirred at pH 6–10 at a temperature of 15°–40° C. to make progress a condensation reaction. Then, the product was further condensed with 2,4-diaminobenzenesulfonic acid (3.76 parts) at pH 2–5 at a temperature of 50°–80° C. After diazotizing the condensate, the diazotized product was coupled with 1-amino-8-hydroxynaphthalene-3,6-disulfonic acid (6.39 parts) at pH 0.5–3.5 at a temperature of 0°–15° C., and further a diazotized product of 2-aminonaphthalene-6-β-sulfatoethylsulfone-1-sulfonic acid (8.23 parts) was coupled therewith at pH 4–8 at a temperature of 0°–20° C. Finally, the thus obtained coupled product was salted out with potassium chloride to obtain a bisazo compound represented by the following formula in the free acid form:

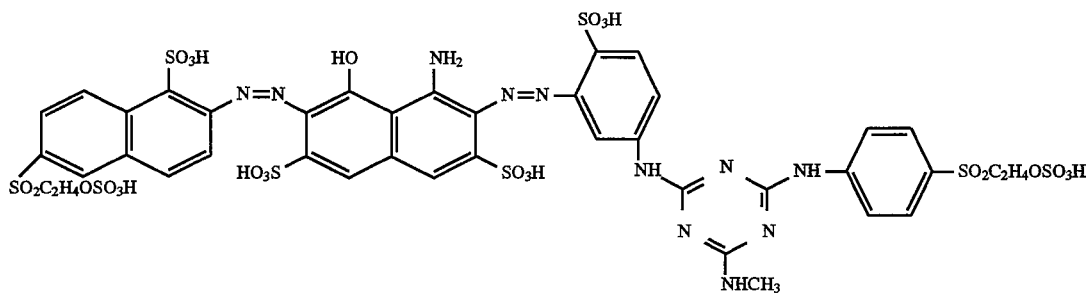

(λmax = 612 nm, in aqueous medium).

EXAMPLE 19

The synthesis of Example 18 was repeated, except that 2-aminonaphthalene-6-β-sulfatoethylsulfone-1-sulfonic acid, 1-amino-8-hydroxynaphthalene-3,6-disulfonic acid, 2,4-diaminobenzenesulfonic acid, methylamine and 1-aminobenzene-4-β-sulfatoethylsulfone were replaced with the compounds shown in column 2, column 3, column 4, column 5 and column 6 of the following table, respectively, to obtain the corresponding bisazo compounds. When used for dyeing, the bisazo compounds gave dyed products of which hues were as shown in column 7 of the table. When the above-mentioned synthesis was repeated while changing the order of primary and secondary condensation reactions with cyanuric chloride, the results obtained were similar to those obtained above. Further, similar results were obtained when the cyanuric chloride was replaced with cyanuric fluoride.

TABLE 8

| 1 | 2 | 3 | 4 | 5 | 6 | 7 |
|---|---|---|---|---|---|---|
| 1 | ![](2-amino-1,6-disulfo-5-(β-sulfatoethylsulfonyl)naphthalene) | ![](1-hydroxy-8-amino-3,6-disulfonaphthalene) | ![](2,4-diaminobenzenesulfonic acid) | $H_2NC_2H_5$ | ![](4-aminophenyl vinyl sulfone) | Navy blue |
| 2 | ![](2-amino-1-sulfo-5-(β-sulfatoethylsulfonyl)benzene) | " | " | $NH_3$ | benzene) | Navy blue |
| 3 | ![](2-amino-1-sulfo-6-(β-sulfatoethylsulfonyl)naphthalene) | " | " | " | ![](3-chloro-4-amino-(β-chloroethylsulfonyl)benzene) | Navy blue |
| 4 | ![](2-amino-1-sulfo-5-(β-sulfatoethylsulfonyl)naphthalene) | " | " | " | ![](4-amino-(β-sulfatoethylsulfonyl)benzene) | Navy blue |

EXAMPLE 20

The same procedure as in Example 16 was repeated, except that the coupling reactions of 1-amino-8-hydroxynaphthalene-3,6-disulfonic acid with the two diazo compounds were carried out in a reverse order, to obtain a bisazo compound represented by the following formula in the free acid form:

hydroxynaphthalene-3,6-disulfonic acid, 2,4-diaminobenzenesulfonic acid, ethylamine and 1-aminobenzene-3-β-sulfatoethylsulfone used in Example 20 were replaced with the compounds of columns 2, 3, 4, 5 and 6 of the following table, respectively, to obtain the corresponding bisazo compounds. When used for dyeing, the bisazo compounds gave dyed products of which hues were as shown in column 7 of the table. When the above-

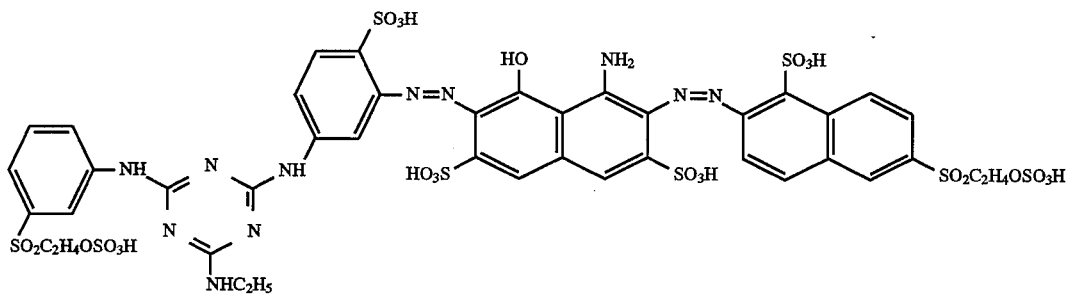

(λmax = 615 nm, in aqueous medium).

EXAMPLE 21

The same procedure as in Example 20 was repeated, using the same compounds of columns 2–6 as used in Example 17, to obtain the corresponding bisazo compounds. When used for dyeing, the compounds gave navy-colored dyed products.

EXAMPLE 22

The same procedure as in Example 20 was repeated, except that the 2-aminonaphthalene-6-β-sulfatoethylsulfone-1-sulfonic acid, 1-amino-8- mentioned synthesis was repeated while changing the order of primary and secondary condensation reactions with cyanuric chloride, the results obtained were similar to those obtained above. When the cyanuric chloride was replaced with cyanuric fluoride, the results were similar to those obtained above.

TABLE 9

| 1 | 2 | 3 | 4 | 5 | 6 | 7 |
|---|---|---|---|---|---|---|
| 1 |  4-NH₂-C₆H₄-SO₂C₂H₄OSO₃H | 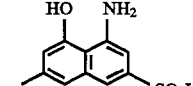 1-amino-8-hydroxynaphthalene-3,6-disulfonic acid | 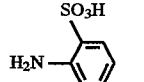 2,4-diaminobenzenesulfonic acid | NH₃ |  H₂N—C₆H₃(OCH₃)—SO₂C₂H₄OSO₃H | Navy blue |
| 2 | " | " | " | " |  H₂N—C₆H₄—SO₂C₂H₄OSO₃H | Navy blue |
| 3 | " | " | " | H₂NCH₃ | " | Navy blue |
| 4 |  3-NH₂-C₆H₄-SO₂C₂H₄OSO₃H | 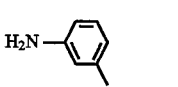 1-amino-8-hydroxynaphthalene-3,6-disulfonic acid |  2,4-diamino-5-methylbenzenesulfonic acid | HN(CH₃)₂ | 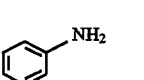 H₂N—C₆H₄—SO₂C₂H₄Cl | Navy blue |
| 5 | 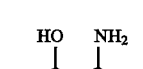 2-amino-4-(SO₂C₂H₄OSO₃H)-anisole | 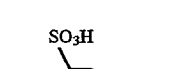 1-amino-8-hydroxynaphthalene-3,6-disulfonic acid |  2,4-diaminobenzenesulfonic acid | 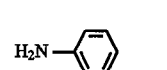 morpholine |  H₂N—C₆H₄—SO₂C₂H₄OCOCH₃ | Navy blue |

TABLE 9-continued

| 1 | 2 | 3 | 4 | 5 | 6 | 7 |
|---|---|---|---|---|---|---|
| 6 | 4-($SO_2C_2H_4OSO_3H$)aniline | 1-amino-8-hydroxynaphthalene-3,6-disulfonic acid (HO, $NH_2$, $SO_3H$, $SO_3H$) | 2,4-diaminobenzenesulfonic acid ($SO_3H$, $H_2N$-, -$NH_2$) | morpholine (HN, O) | 3-($SO_2C_2H_4OSO_3H$)aniline ($H_2N$-) | Navy blue |
| 7 | " | " | " | $H_2NC_2H_4SO_2$—$C_2H_4OSO_3H$ | " | Navy blue |
| 8 | " | " | " | $H_2NC_2H_4SO_2$—$C_2H_4OSO_3H$ | 4-($SO_2C_2H_4OSO_3H$)aniline ($H_2N$-) | Navy blue |
| 9 | " | " | " | $H_2NC_3H_6SO_2$—$C_2H_4OSO_3H$ | " | Navy blue |
| 10 | " | " | " | $H_2NC_3H_6SO_2$—$C_2H_4OSO_3H$ | 3-($SO_2C_2H_4OSO_3H$)aniline ($H_2N$-) | Navy blue |
| 11 | 4-($SO_2C_2H_4OSO_3H$)aniline | 1-amino-8-hydroxynaphthalene-3,6-disulfonic acid | 2,4-diaminobenzenesulfonic acid | $H_2NC_2H_4SO_2$—$C_2H_4OSO_3H$ | N-ethyl-3-($SO_2C_2H_4OSO_3H$)aniline ($C_2H_5$, HN-) | Navy blue |
| 12 | " | " | 2,4-diamino-5-methylbenzenesulfonic acid ($SO_3H$, $H_2N$-, $CH_3$, $NH_2$) | $H_2NC_2H_4SO_2$—$C_2H_4Cl$ | 4-methoxy-3-($SO_2C_2H_4OSO_3H$)aniline ($OCH_3$, $H_2N$-) | Navy blue |
| 13 | " | 1-amino-8-hydroxynaphthalene-3,5-disulfonic acid (HO, $NH_2$, $SO_3H$, $SO_3H$) | 2,4-diaminobenzenesulfonic acid | $H_2NC_2H_4SO_2$—$CH=CH_2$ | " | Navy blue |
| 14 | 2-methoxy-5-methyl-4-($SO_2C_2H_4OSO_3H$)aniline ($OCH_3$, $NH_2$, $CH_3$, $SO_2C_2H_4OSO_3H$) | " | 2-amino-4-(methylamino)benzenesulfonic acid ($SO_3H$, $H_2N$-, $NHCH_3$) | $H_2NC_3H_6SO_2$—$C_2H_4OSO_3H$ | " | Navy blue |
| 15 | 4-($SO_2C_2H_4OSO_3H$)aniline | 1-amino-8-hydroxynaphthalene-3,6-disulfonic acid | 2,4-diaminobenzenesulfonic acid | $H_2NC_2H_4SO_2$—$C_2H_4OSO_3H$ | 4-($SO_2C_2H_4OSO_3H$)aniline ($H_2N$-) | Navy blue |
| 16 | " | 1-amino-8-hydroxynaphthalene-3,6-disulfonic acid | " | " | 3-($SO_2C_2H_4OSO_3H$)aniline ($H_2N$-) | Navy blue |

EXAMPLE 23

The same procedure as in Example 18 was repeated, except that the coupling reactions of 1-amino-8-hydroxynaphthalene-3,6-disulfonic acid with the two diazo compounds were carried out in a reverse order, to obtain a bisazo compound represented by the following formula in the free acid form:

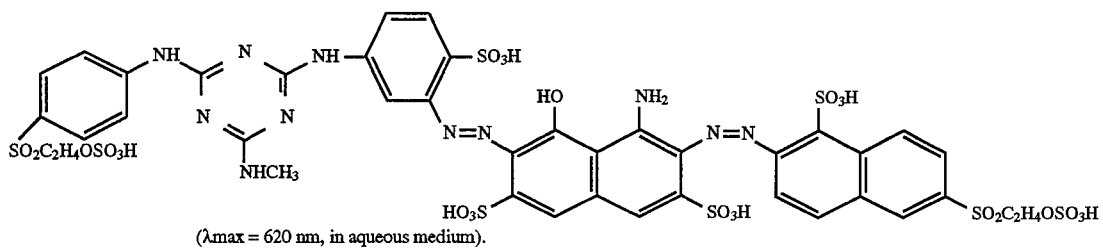

(λmax = 620 nm, in aqueous medium).

EXAMPLE 24

The same procedure as in Example 23 was repeated, using the same compounds of columns 2–6 as mentioned in Example 19, to obtain the corresponding bisazo compounds. When used for dyeing, the compounds gave navy-colored dyed products.

EXAMPLE 25

The same procedure as in Example 23 was repeated, except that 2-aminonaphthalene-6-β-sulfatoethylsulfone-1-sulfonic acid, 1-amino-8-hydroxynaphthalene-3,6-disulfonic acid, 2,4-diaminobenzenesulfonic acid, methylamine and 1-aminobenzene-4-β-sulfatoethylsulfone used in Example 23 were replaced with the compounds of columns 2, 3, 4, 5 and 6 of the following table, respectively, to obtain the corresponding bisazo compounds. When used for dyeing, the bisazo compounds gave dyed products of which hues were as shown in column 7 of the table. When the above-mentioned synthesis was repeated while changing the order of primary and secondary condensation reactions with cyanuric chloride, the results obtained were similar to those obtained above. When the cyanuric chloride was replaced with cyanuric fluoride, the results were similar to those obtained above.

the thus obtained coupled product was condensed with 1-aminobenzene-3-β-sulfatoethylsulfone (5.63 parts) at pH 2–5 at a temperature of 50°–80° C., and the condensate was salted out with potassium chloride to obtain a bisazo compound represented by the following formula in the free acid form:

TABLE 10

| 1 | 2 | 3 | 4 | 5 | 6 | 7 |
|---|---|---|---|---|---|---|
| 1 | NH₂-C₆H₄-SO₂C₂H₄OSO₃H | HO-naphthalene(NH₂)(SO₃H)₂ | SO₃H-C₆H₃(H₂N)-NH₂ | NH₃ | H₂N-C₆H₄-SO₂C₂H₄OSO₃H | Navy blue |
| 2 | OCH₃, NH₂, CH₃, SO₂C₂H₄OSO₃H (substituted benzene) | " | " | " | " | Navy blue |

EXAMPLE 26

In a usual manner, methanol (0.64 part) and cyanuric chloride (3.69 parts) were subjected to a condensation reaction with each other and then with 2,4-diaminobenzenesulfonic acid (3.76 parts). The condensate was diazotized and then the diazotized product was coupled with 1-amino-8-hydroxynaphthalene-3,6-disulfonic acid (6.39 parts) at pH 1–3.5 at a temperature of 0°–15° C., and further a diazotized product of 2-aminonaphthalene-6-β-sulfatoethylsulfone-1-sulfonic acid (8.23 parts) was coupled therewith at pH 3–8 at a temperature of 0°–30° C. Finally,

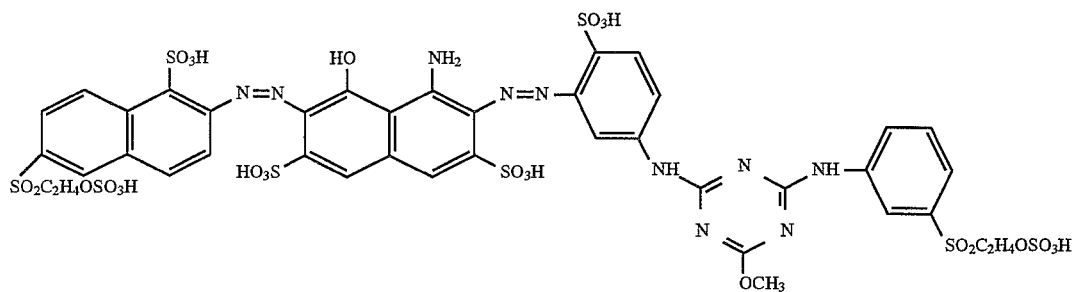

(λmax = 612 nm, in aqueous medium).

EXAMPLE 27

The synthesis of Example 26 was repeated, except that 2-aminonaphthalene-6-β-sulfatoethylsulfone-1-sulfonic acid, 1-amino-8-hydroxynaphthalene-3,6-disulfonic acid, 2,4-diaminobenzenesulfonic acid, methanol and 1-aminobenzene-3-β-sulfatoethylsulfone used in Example 26 were replaced with the compounds shown in column 2, column 3, column 4, column 5 and column 6 of the following table, respectively, to obtain the corresponding bisazo compounds. When used for dyeing, the bisazo compounds gave dyed products of which hues were as shown in column 7 of the table. Similar results were obtained when the cyanuric chloride was replaced with cyanuric fluoride.

TABLE 11

| 1 | 2 | 3 | 4 | 5 | 6 | 7 |
|---|---|---|---|---|---|---|
| 1 | 2-aminonaphthalene-6-β-sulfatoethylsulfone-1-sulfonic acid (SO₃H, NH₂, SO₂C₂H₄OSO₃H) | 1-amino-8-hydroxynaphthalene-3,6-disulfonic acid (HO, NH₂, SO₃H, SO₃H) | 2,4-diaminobenzenesulfonic acid (SO₃H, H₂N, NH₂) | CH₃OH | HN–C₆H₄–SO₂C₂H₄OSO₃H with C₂H₅ | Navy blue |
| 2 | " | " | " | C₂H₅OH | H₂N–C₆H₄–SO₂C₂H₄OSO₃H | Navy blue |
| 3 | SO₃H, NH₂, SO₂C₂H₄OSO₃H (benzene) | " | " | CH₃OH | " | Navy blue |
| 4 | " | " | " | " | HN–C₆H₄–SO₂C₂H₄OSO₃H with C₂H₅ | Navy blue |
| 5 | SO₃H, NH₂, SO₂C₂H₄OSO₃H (benzene) | HO, NH₂, SO₃H, SO₃H (naphthalene) | SO₃H, H₂N, NH₂ | C₂H₅OH | H₂N–C₆H₄–SO₂C₂H₄OSO₃H | Navy blue |
| 6 | SO₃H, SO₃H, NH₂, SO₂C₂H₄OSO₃H (naphthalene) | " | " | CH₃OH | H₂N–C₆H₄–SO₂CH=CH₂ | Navy blue |
| 7 | SO₃H, NH₂, SO₂C₂H₄OSO₃H (naphthalene) | " | " | " | H₂N–C₆H₃(OCH₃)(CH₃)–SO₂C₂H₄OSO₃H | Navy blue |

TABLE 11-continued

| 1 | 2 | 3 | 4 | 5 | 6 | 7 |
|---|---|---|---|---|---|---|
| 8 | 2-amino-naphthalene-1-SO₃H, 6-SO₂C₂H₄OSO₃H | 8-amino-1-hydroxy-naphthalene-3,6-disulfonic acid (HO, NH₂; SO₃H, SO₃H) | " | " | H₂N—C₆H₄—SO₂C₂H₄OSO₃H (para) | Navy blue |
| 9 | 2-amino-benzene-1-SO₃H, 4-SO₂C₂H₄OSO₃H | HO, NH₂ naphthalene with SO₃H, SO₃H | 2,4-diaminobenzene-SO₃H | CH₃OH | H₂N—C₆H₄—SO₂C₂H₄OSO₃H (meta) | Navy blue |
| 10 | 2-amino-benzene-1-SO₃H, 5-SO₂C₂H₄OSO₃H | " | " | " | H₂N—C₆H₃(OCH₃)—SO₂C₂H₄OSO₃H | Navy blue |
| 11 | " | " | " | " | H₂N—C₆H₂(OCH₃)(CH₃)—SO₂C₂H₄OSO₃H | Navy blue |
| 12 | " | " | " | " | H₂N—C₆H₃(OCH₃)—SO₂C₂H₄OSO₃H | Navy blue |
| 13 | 2-amino-naphthalene-1-SO₃H, 6-SO₂C₂H₄OSO₃H | HO, NH₂ naphthalene with SO₃H, SO₃H | 2,4-diaminobenzene-SO₃H | CH₃OH | H₂N—C₆H₃(OCH₃)—SO₂C₂H₄OSO₃H | Navy blue |
| 14 | " | " | " | " | H₂N—C₆H₃(OCH₃)—SO₂C₂H₄OSO₃H | Navy blue |
| 15 | 2-amino-naphthalene-1-SO₃H, 6-SO₂C₂H₄Cl | " | " | " | H₂N—C₆H₂(OCH₃)(CH₃)—SO₂C₂H₄OSO₃H | Navy blue |
| 16 | 2-amino-naphthalene-1-SO₃H, 6-SO₂C₂H₄Cl | HO, NH₂ naphthalene with SO₃H, SO₃H | 2,4-diaminobenzene-SO₃H | CH₃OH | H₂N—C₆H₃(OCH₃)—SO₂C₂H₄OSO₃H | Navy blue |
| 17 | " | 8-amino-1-hydroxy-naphthalene-3,6-disulfonic acid | 2-amino-naphthalene-1-SO₃H, 5-CH₂NH₂ | " | H₂N—C₆H₄—SO₂C₂H₄OSO₃H | Navy blue |
| 18 | 2-amino-naphthalene-1-SO₃H, 5-SO₂C₂H₄OSO₃H | HO, NH₂ naphthalene with SO₃H, SO₃H | 2,4-diaminobenzene-SO₃H | " | " | Navy blue |

TABLE 11-continued

| 1 | 2 | 3 | 4 | 5 | 6 | 7 |
|---|---|---|---|---|---|---|
| 19 | " | " | " | $C_2H_5OH$ | $C_2H_5$-HN-⟨⟩-$SO_2C_2H_4OSO_3H$ | Navy blue |
| 20 | 2-aminobenzene with $SO_3H$, $NH_2$, $SO_2CH=CH_2$ | 1-amino-8-hydroxynaphthalene-3,6-disulfonic acid (HO, $NH_2$, $SO_3H$, $SO_3H$) | 2,4-diaminobenzene ($SO_3H$, $H_2N$-, $NH_2$) | $CH_3CH_2OH$ | $H_2NC_2H_4SO_2CH=CH_2$ | Navy blue |
| 21 | 2-amino-6-(2-chloroethylsulfonyl)naphthalene-1-sulfonic acid ($SO_3H$, $NH_2$, $SO_2C_2H_4Cl$) | " | 2,4-diaminobenzene ($SO_3H$, $H_2N$-, $NH_2$) | $CH_3OH$ | $H_2NC_2H_4SO_2C_2H_4Cl$ | Navy blue |
| 22 | " | 1-amino-8-hydroxynaphthalene-3,6-disulfonic acid (HO, $NH_2$, $SO_3H$, $SO_3H$) | " | " | $H_2NC_2H_4OC_2H_4SO_2CH=CH_2$ | Navy blue |
| 23 | 2-aminobenzene ($SO_3H$, $NH_2$, $SO_2CH=CH_2$) | 1-amino-8-hydroxynaphthalene-3,6-disulfonic acid (HO, $NH_2$, $SO_3H$, $SO_3H$) | " | " | $H_2NC_2H_4OC_2H_4SO_2C_2H_4Cl$ | Navy blue |

EXAMPLE 28

In a usual manner, methanol (0.64 part) and cyanuric chloride (3.69 parts) were subjected to a condensation reaction with each other and then with 1-ethylaminobenzene-4-β-sulfatoethylsulfone (6.19 parts) and further with 2,4-diaminobenzenesulfonic acid (3.76 parts) at pH 2–5 at a temperature of 50°–80° C. The condensate was diazotized in a usual manner and then the diazotized product was coupled with 1-amino-8-hydroxynaphthalene-3,6-disulfonic acid (6.39 parts) at pH 1–3.5 at a temperature of 0°–15° C., and further a diazotized product of 2-aminobenzene-5-β-sulfatoethylsulfone-1-sulfonic acid (7.23 parts) was coupled therewith at pH 3–8 at a temperature of 0°–30° C. Finally, the thus obtained coupled product was salted out with potassium chloride to obtain a bisazo compound represented by the following formula in the free acid form:

EXAMPLE 29

The synthesis of Example 28 was repeated, except that 2-aminobenzene-5-β-sulfatoethylsulfone-1-sulfonic acid, 1-amino-8-hydroxynaphthalene-3,6-disulfonic acid, 2,4-diaminobenzenesulfonic acid, methanol and 1-ethylaminobenzene-4-β-sulfatoethylsulfone used in Example 28 were replaced with the compounds shown in column 2, column 3, column 4, column 5 and column 6 of the following table, respectively, to obtain the corresponding bisazo compounds. When used for dyeing, the bisazo compounds gave dyed products of which hues were as shown in column 7 of the table. Similar results were obtained when the cyanuric chloride was replaced with cyanuric fluoride.

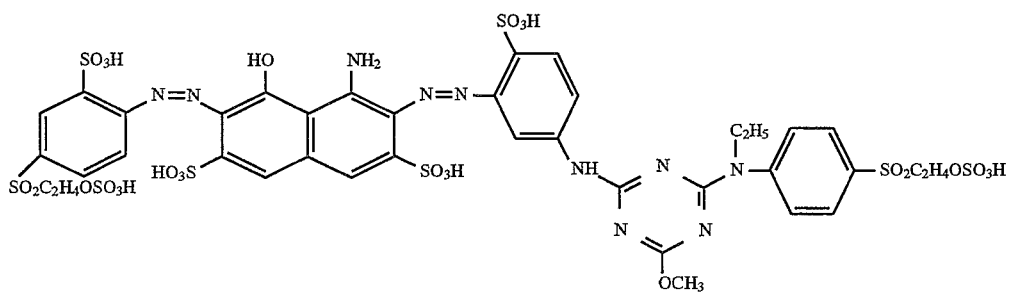

(λmax = 602 nm).

TABLE 12

| 1 | 2 | 3 | 4 | 5 | 6 | 7 |
|---|---|---|---|---|---|---|
| 1 | 2-amino-5-(β-sulfatoethylsulfonyl)benzenesulfonic acid | 1-hydroxy-8-amino-3,6-naphthalenedisulfonic acid | 2,4-diaminobenzenesulfonic acid | CH$_3$OH | 4-amino-(β-sulfatoethylsulfonyl)benzene (H$_2$N—C$_6$H$_4$—SO$_2$C$_2$H$_4$OSO$_3$H) | Navy blue |
| 2 | 2-amino-6-(β-sulfatoethylsulfonyl)naphthalene-1-sulfonic acid | " | " | " | " | Navy blue |
| 3 | " | " | 2,4-diamino-5-methylbenzenesulfonic acid | " | " | Navy blue |
| 4 | 2-amino-5-(β-sulfatoethylsulfonyl)benzenesulfonic acid | " | 2,4-diaminobenzenesulfonic acid | CH$_3$CH(OH)CH$_3$ | 3-amino-(β-sulfatoethylsulfonyl)benzene | Navy blue |
| 5 | 2-amino-5-(β-sulfatoethylsulfonyl)-1,7-naphthalenedisulfonic acid | 1-hydroxy-8-amino-3,6-naphthalenedisulfonic acid | 2,4-diaminobenzenesulfonic acid | CH$_3$(CH$_2$)$_3$OH | 3-amino-(β-sulfatoethylsulfonyl)benzene | Navy blue |
| 6 | 2-amino-5-(β-sulfatoethylsulfonyl)naphthalene-1-sulfonic acid | " | 2-amino-5-sulfo-4-methoxy-aniline | CH$_3$OH | N-ethyl-4-amino-(β-sulfatoethylsulfonyl)aniline | Navy blue |
| 7 | 2-amino-6-(β-sulfatoethylsulfonyl)naphthalene-1-sulfonic acid | 1-hydroxy-8-amino-3,5-naphthalenedisulfonic acid | 2,4-diaminobenzenesulfonic acid | CH$_3$CH$_2$OH | 2-methoxy-5-(β-sulfatoethylsulfonyl)aniline | Navy blue |
| 8 | 2-amino-6-(β-sulfatoethylsulfonyl)naphthalene-1-sulfonic acid | 1-hydroxy-8-amino-3,6-naphthalenedisulfonic acid | 2,4-diaminobenzenesulfonic acid | CH$_3$OH | N-ethyl-4-amino-(β-sulfatoethylsulfonyl)aniline | Navy blue |
| 9 | 2-amino-5-(β-sulfatoethylsulfonyl)naphthalene-1-sulfonic acid | " | " | " | H$_2$N—C$_6$H$_4$—SO$_2$C$_2$H$_4$OSO$_3$H | Navy blue |
| 10 | " | " | " | " | 4-amino-2-methoxy-5-(β-sulfatoethylsulfonyl)benzene | Navy blue |
| 11 | " | " | " | " | 2-methoxy-5-(vinylsulfonyl)aniline | Navy blue |

TABLE 12-continued

| 1 | 2 | 3 | 4 | 5 | 6 | 7 |
|---|---|---|---|---|---|---|
| 12 | 2-amino-6-(SO$_2$C$_2$H$_4$Cl)-naphthalene-1-sulfonic acid | 8-hydroxy-1-amino-3,6-disulfo-naphthalene | 2,4-diaminobenzenesulfonic acid | CH$_3$OH | 4-amino-3-sulfo-(SO$_2$C$_2$H$_4$OSO$_3$H)-benzene | Navy blue |
| 13 | 2-amino-6-(SO$_2$C$_2$H$_4$OSO$_3$H)-naphthalene-1-sulfonic acid | " | " | " | H$_2$NC$_2$H$_4$SO$_2$CH=CH$_2$ | Navy blue |
| 14 | 2-amino-5-(SO$_2$C$_2$H$_4$OSO$_3$H)-naphthalene-1-sulfonic acid | " | " | (CH$_3$)$_2$CHOH | H$_2$NC$_2$H$_4$SO$_2$C$_2$H$_4$Cl | Navy blue |
| 15 | " | " | " | CH$_3$OH | H$_2$NC$_3$H$_6$SO$_2$CH=CH$_2$ | Navy blue |
| 16 | 2-amino-(SO$_3$H)-(SO$_2$C$_2$H$_4$OSO$_3$H)-benzene | 8-hydroxy-1-amino-3,5-disulfo-naphthalene | 2,5-diamino-4-methyl-benzenesulfonic acid | " | H$_2$NC$_2$H$_4$SO$_2$CH=CH$_2$ | Navy blue |
| 17 | 2-amino-6-(SO$_2$C$_2$H$_4$OSO$_3$H)-naphthalene-1-sulfonic acid | 8-hydroxy-1-amino-3,6-disulfo-naphthalene | 2,4-diaminobenzenesulfonic acid | CH$_3$OH | H$_2$NC$_2$H$_4$SO$_2$C$_2$H$_4$OSO$_3$H | Navy blue |
| 18 | " | " | " | " | H$_2$NC$_3$H$_6$SO$_2$C$_2$H$_4$OSO$_3$H | Navy blue |
| 19 | 2-amino-(SO$_3$H)-(SO$_2$C$_2$H$_4$OSO$_3$H)-benzene | " | " | " | H$_2$NC$_2$H$_4$SO$_2$C$_2$H$_4$OSO$_3$H | Navy blue |
| 20 | " | " | " | C$_2$H$_5$OH | CH$_3$HN—C$_2$H$_4$SO$_2$C$_2$H$_4$OPO$_3$H$_2$ | Navy blue |
| 21 | 2-amino-5-(SO$_2$C$_2$H$_4$OSO$_3$H)-naphthalene-1-sulfonic acid | " | " | CH$_3$OH | H$_2$NC$_2$H$_4$SO$_2$C$_2$H$_4$OCOCH$_3$ | Navy blue |
| 22 | 2-amino-6-(SO$_2$C$_2$H$_4$OSO$_3$H)-naphthalene-1-sulfonic acid | 8-hydroxy-1-amino-3,6-disulfo-naphthalene | 2,4-diaminobenzenesulfonic acid | phenol (HO-C$_6$H$_5$) | H$_2$NC$_2$H$_4$SO$_2$CH=CH$_2$ | Navy blue |
| 23 | " | " | " | 3-methoxyphenol | " | Navy blue |
| 24 | " | " | " | 2-methylphenol | H$_2$NC$_2$H$_4$OC$_2$H$_4$—SO$_2$CH=CH$_2$ | Navy blue |

TABLE 12-continued

| 1 | 2 | 3 | 4 | 5 | 6 | 7 |
|---|---|---|---|---|---|---|
| 25 | 2-amino-1-sulfo-5-(β-sulfatoethylsulfonyl)naphthalene (SO₃H, NH₂, SO₂C₂H₄OSO₃H on naphthalene) | " | " | HO—C₆H₄—SO₃H | H₂NC₂H₄OC₂H₄—SO₂CH=CH₂ | Navy blue |
| 26 | 2-amino-1-sulfo-4-(β-sulfatoethylsulfonyl)benzene (SO₃H, NH₂, SO₂C₂H₄OSO₃H on benzene) | " | " | HO—C₆H₄—Cl | H₂NC₃H₆SO₂C₂H₄Cl | Navy blue |
| 27 | 2-amino-1-sulfo-4-(β-sulfatoethylsulfonyl)benzene | 1-amino-8-hydroxynaphthalene-3,6-disulfonic acid (HO, NH₂, SO₃H, SO₃H) | 2,4-diamino-1-sulfobenzene (SO₃H, H₂N, NH₂) | HO—C₆H₄—CH₃ | H₂NC₂H₄OC₂H₄—SO₂CH=CH₂ | Navy blue |
| 28 | " | " | " | HO—C₆H₃(CH₃)—SO₃H | H₂NC₂H₄OC₂H₄—SO₂CH=CH₂ | Navy blue |
| 29 | " | 1-amino-8-hydroxynaphthalene-3,5-disulfonic acid (HO, NH₂, SO₃H, SO₃H) | " | HO—C₆H₄—CH₃ | H₂NC₂H₄OC₂H₄—SO₂CH=CH₂ | Navy blue |
| 30 | 2-amino-1-sulfo-6-(β-sulfatoethylsulfonyl)naphthalene (SO₃H, NH₂, SO₂C₂H₄OSO₃H) | " | 4,6-diamino-1-sulfo-3-methylbenzene (SO₃H, H₂N, CH₃, NH₂) | HO—C₆H₄—SO₃H | H₂NC₂H₄OC₂H₄—SO₂CH=CH₂ | Navy blue |
| 31 | " | " | " | " | H₂NC₂H₄SO₂C₂H₄Cl | Navy blue |

EXAMPLE 30

In a usual manner, methanol (0.64 part) and cyanuric chloride (3.69 parts) were subjected to a condensation reaction with each other and then with 2,4-diaminobenzenesulfonic acid (3.76 parts) and further with β-(β-hydroxyethylsulfonyl)ethylamine (3.06 parts) at pH 6–10 at a temperature of 50°–90° C. The condensate was diazotized in a usual manner and then the diazotized product was coupled with 1-amino-8-hydroxynaphthalene-3,6-disulfonic acid (6.39 parts) at pH 1–3.5 at a temperature of 0°–15° C., and further a diazotized product of 2-aminonaphthalene-6-β-sulfatoethylsulfone-1-sulfonic acid (8.23 parts) was coupled therewith at pH 3–8 at a temperature of 0°–30° C. Finally, the thus obtained coupled product was converted to a sulfuric ester in a usual manner and salted out to obtain a bisazo compound represented by the following formula in the free acid form:

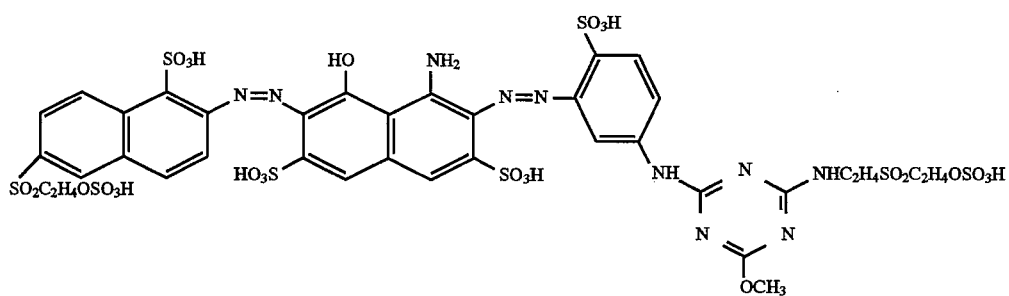

(λmax = 609 nm, in aqueous medium).

EXAMPLE 31

The synthesis of Example 30 was repeated, except that 2-aminonaphthalene-6-β-sulfatoethylsulfone-1-sulfonic acid, 1-amino-8-hydroxynaphthalene-3,6-disulfonic acid, 2,4-diaminobenzenesulfonic acid, methanol and β-(β-hydroxyethylsulfonyl)ethylamine used in Example 30 were replaced with the compounds shown in column 2, column 3, column 4, column 5 and column 6 of the following table, respectively, to obtain the corresponding bisazo compounds. When used for dyeing, the bisazo compounds gave dyed products of which hues were as shown in column 7 of the table. Similar results were obtained when the secondary and tertiary condensation reactions with cyanuric chloride were carried out while changing the order of reaction. Further, similar results were obtained also when the cyanuric chloride was replaced with cyanuric fluoride.

TABLE 13

| 1 | 2 | 3 | 4 | 5 | 6 | 7 |
|---|---|---|---|---|---|---|
| 1 | 2-amino-1-sulfo-4-(β-sulfatoethylsulfonyl)benzene (SO₃H, NH₂, SO₂C₂H₄OSO₃H on benzene) | 1-hydroxy-8-amino-3,6-disulfonaphthalene (HO, NH₂, SO₃H, SO₃H on naphthalene) | 1,3-diamino-4-sulfobenzene (SO₃H, H₂N, NH₂ on benzene) | CH₃OH | H₂NC₂H₄SO₂C₂H₄OH | Navy blue |
| 2 | 1-sulfo-2-amino-5-(β-sulfatoethylsulfonyl)naphthalene (SO₃H, NH₂, SO₂C₂H₄OSO₃H) | " | " | " | " | Navy blue |
| 3 | 1-sulfo-2-amino-6-(β-sulfatoethylsulfonyl)naphthalene (SO₃H, NH₂, SO₂C₂H₄OSO₃H) | " | " | CH₃CH₂OH | " | Navy blue |
| 4 | " | " | " | CH₃OH | $\underset{H_2NCH_3CHSO_2C_2H_4OH}{\overset{CH_3}{|}}$ | Navy blue |
| 5 | (as row 1) | (as row 1) | SO₃H, H₂N, NHCH₃ on benzene | CH₃OH | $\underset{H_2NCH_2CHSO_2C_2H_4OH}{\overset{CONH_2}{|}}$ | Navy blue |
| 6 | 1-sulfo-2-amino-6-(β-sulfatoethylsulfonyl)naphthalene | " | SO₃H, H₂N, NH₂ on benzene | " | H₂NC₂H₄OC₂H₄SO₂C₂H₄OH | Navy blue |
| 7 | (row 1 compound) | " | " | CH₃CH₂OH | $\underset{H_2NC_2H_4N-C_2H_4SO_2C_2H_4OH}{\overset{CH_3}{|}}$ | Navy blue |
| 8 | 1-sulfo-2-amino-5-(β-sulfatoethylsulfonyl)naphthalene | HO, NH₂, SO₃H, SO₃H on naphthalene | SO₃H, H₂N, NH₂ on benzene | CH₃CH₂OH | $\underset{HNC_2H_4NHC_2H_4SO_2C_2H_4OH}{\overset{CH_3}{|}}$ | Navy blue |
| 9 | (row 1 compound) | HO, NH₂, SO₃H, SO₃H | SO₃H, H₂N, NH₂ | CH₃CH(OH)CH₃ | H₂NC₂H₄SO₂C₂H₄OH | Navy blue |
| 10 | " | " | " | CH₃OH | " | Navy blue |
| 11 | 1-sulfo-2-amino-6-(β-sulfatoethylsulfonyl)naphthalene (SO₃H, NH₂, SO₂C₂H₄OSO₃H) | " | " | " | " | Navy blue |

TABLE 13-continued

| 1 | 2 | 3 | 4 | 5 | 6 | 7 |
|---|---|---|---|---|---|---|
| 12 | " | " | " |  | " | Navy blue |
| 13 | 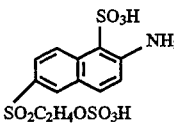 | 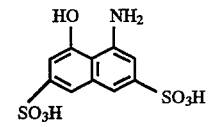 | 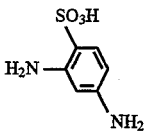 | 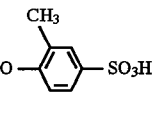 | H$_2$NC$_2$H$_4$SO$_2$C$_2$H$_4$OH | Navy blue |
| 14 | " | " | " | 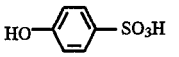 | " | Navy blue |
| 15 | " | " | " |  | H$_2$NC$_3$H$_6$SO$_2$C$_2$H$_4$OH | Navy blue |
| 16 | 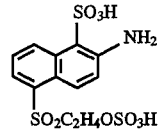 | " | " | " | " | Navy blue |
| 17 | 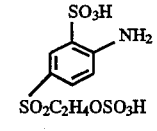 | " | " | " | H$_2$NC$_2$H$_4$SO$_2$C$_2$H$_4$OH | Navy blue |
| 18 | 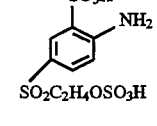 | 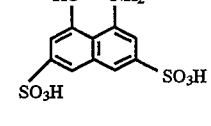 | 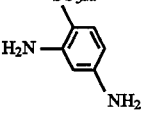 | 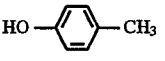 | H$_2$NC$_2$H$_4$SO$_2$C$_2$H$_4$OH | Navy blue |
| 19 | " | " | " |  | " | Navy blue |
| 20 | " | " | " |  | " | Navy blue |
| 21 | " | " | " |  | " | Navy blue |
| 22 | " | " | " | 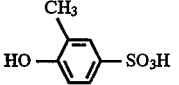 | H$_2$NC$_3$H$_6$SO$_2$C$_2$H$_4$OH | Navy blue |
| 23 | 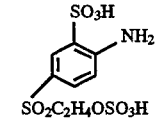 | 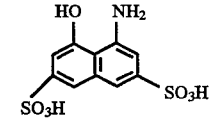 | 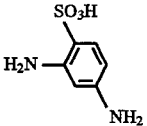 | 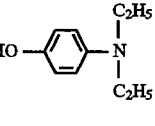 | H$_2$NC$_3$H$_6$SO$_2$C$_2$H$_4$OH | Navy blue |
| 24 | " | 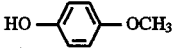 | " | 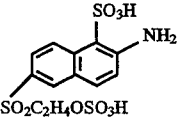 | H$_2$NC$_2$H$_4$SO$_2$C$_2$H$_4$OH | Navy blue |
| 25 |  | " | " |  | H$_2$NC$_2$H$_4$OC$_2$H$_4$—SO$_2$C$_2$H$_4$OH | Navy blue |

TABLE 13-continued

| 1 | 2 | 3 | 4 | 5 | 6 | 7 |
|---|---|---|---|---|---|---|
| 26 | " | " | " |  CH₃ / HO— | $H_2NC_3H_6SO_2C_2H_4OH$ | Navy blue |

EXAMPLE 32

Each bisazo compound obtained in Examples 1–31 (each 0.1, 0.3 and 0.6 part) was dissolved in water (200 parts), and sodium sulfate (10 parts) and cotton (10 parts) were added thereto. The bath was heated to 60° C., and then sodium carbonate (4 parts) was added thereto. Dyeing was continued for 1 hour at that temperature. Thereafter, the cotton taken out was washed with water, soaped, washed with water and then dried to obtain each dyed product of a navy blue color superior in fastness properties with a superior build-up property.

EXAMPLE 33

Using each bisazo compound described in Examples 1–31, each color paste having the following composition was prepared.

| Bisazo compound | 5 Parts |
| Urea | 5 Parts |
| Sodium alginate (5%) stock paste | 50 Parts |
| Hot water | 25 Parts |
| Sodium hydrogencarbonate | 2 Parts |
| Water | 13 Parts |

Mercerized cotton broad cloth was printed with the color paste of the above composition, pre-dried, steamed at 100° C. for 5 minutes, washed with hot water, soaped, again washed with hot water, and then dried to obtain a product printed in a navy blue color superior in various fastness properties.

What is claimed is:

1. An amino compound represented by the following formula (XIV) or a salt thereof:

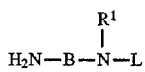

$$H_2N-B-N-L \quad \text{(XIV)} \qquad R^1$$

wherein $R^1$ is hydrogen or unsubstituted or substituted alkyl;

B is a group represented by the following formula (1) or (2):

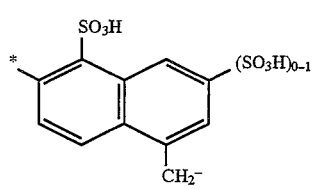

(1)

(2)

wherein the mark * means a bond linking to the amino group, and $R^2$ is hydrogen, methyl or methoxy; and L is a triazinyl group represented by any one of the following formulas (IV) or (V):

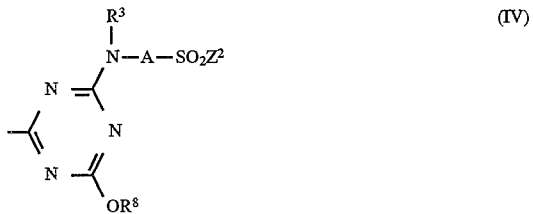

(IV)

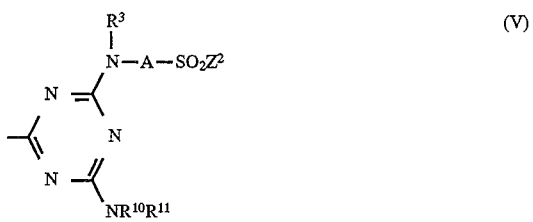

(V)

wherein $R^3$ is hydrogen or unsubstituted or substituted alkyl;

$R^8$ is straight or branched alkyl unsubstituted or substituted with one or two substituents selected from alkoxy, sulfo, carboxy, alkyl carboxylate, hydroxy, cyano, sulfato, halogeno, phenyl, substituted phenyl, carbamoyl and sulfamoyl, or phenyl unsubstituted or substituted with one or two substituents selected from alkyl, substituted alkyl, alkoxy, substituted alkoxy, hydroxy, sulfo, cyano, carboxy, alkyl carboxylate, sulfamoyl, carbamoyl, substituted amino and halogeno;

$R^{10}$ is hydrogen or straight or branched alkyl unsubstituted or substituted with one or two substituents selected from hydroxy, halogeno, alkoxy, cyano, sulfo, sulfato, carboxy, alkyl carboxylate, carbamoyl, sulfamoyl, amino and dimethyl amino;

$R^{11}$ is hydrogen, straight or branched alkyl unsubstituted or substituted with one or two substituents selected from hydroxy, halogeno, alkoxy, cyano, sulfo, sulfato, carboxy, alkyl carboxylate, carbamoyl, sulfamoyl, amino and substituted amino, or phenyl unsubstituted or substituted with one or two substituents selected from sulfo, alkyl, alkoxy, hydroxy, halogeno, cyano, carboxy, alkyl carboxylate, carbamoyl, sulfamoyl, amino, substituted amino, —$SO_2CH_2CH_2OH$ and $SO_2Z^3$, in which $Z^3$ is —CH=$CH_2$ or —$CH_2CH_2Z'$ in which $Z'$ is a group capable of being split by the action of an alkali; or $R^{10}$ and $R^{11}$ conjointly form a heterocyclic ring which may contain nitrogen, oxygen or sulfur as a ring atom;

$Z^2$ is —CH=$CH_2$ or —$CH_2CH_2Z'$ in which $Z'$ is as defined above; and

A is a divalent aliphatic group represented by the following formula (3), (4) or (5):

$$-CH_2-W- \quad (3)$$

$$-(CH_2)_m-O-(CH_2)_n- \quad (4)$$

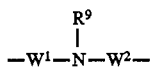

in which W is straight or branched chain $C_1$–$C_6$ alkylene unsubstituted or substituted by chloro, bromo, fluoro, hydroxy, sulfato, cyano, $C_1$–$C_4$ alkylcarbonyloxy, $C_1$–$C_5$ alkoxycarbonyl, carboxy or carbamoyl; $W^1$ and $W^2$ independently of one another are each straight or branched chain $C_2$–$C_6$ alkylene; $R^9$ is hydrogen, unsubstituted lower alkyl or phenyl; and m and n independently of one another are each an integer of 2 to 6.

2. A compound according to claim 1 or a salt thereof, wherein $R^1$ is hydrogen or methyl.

3. A compound according to claim 1 or a salt thereof, wherein $R^3$ is hydrogen, methyl or ethyl.

4. A compound according to claim 1 or a salt thereof, wherein B is a group represented by the following formula in the free acid form:

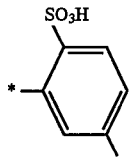

wherein the mark * is as defined in claim 1.

5. A compound according to claim 1 or a salt thereof, wherein L is represented by the formula (III) in which $R^5$ is hydrogen, or L is represented by the formula (V) in which $R^{10}$ is hydrogen.

6. A compound according to claim 1 or a salt thereof, wherein L is represented by the formula (II) in which $R^7$ is methyl or ethyl, or L is represented by the formula (IV) in which $R^8$ is phenyl unsubstituted or substituted by methyl, methoxy or sulfo.

7. A compound according to claim 1 or a salt thereof, wherein A is a group represented by the following formula (6), (7) or (8):

—CH$_2$CH$_2$— (6)

—CH$_2$CH$_2$CH$_2$— (7)

—CH$_2$CH$_2$OCH$_2$CH$_2$—. (8)

8. A compound according to claim 1 or a salt thereof, wherein $Z^2$ and $Z^3$ independently of one another are each vinyl, β-sulfatoethyl or β-chloroethyl.

* * * * *